United States Patent [19]
Krawchuk et al.

[11] Patent Number: 5,960,437
[45] Date of Patent: Sep. 28, 1999

[54] SYSTEM AND METHOD FOR STORING AND MANAGING INFORMATION

[76] Inventors: Kenneth V. Krawchuk, 117 W. Ave., Elkins Park, Pa. 19117; Barton B. Smith, 20 Princeton Ave., Ridley Park, Pa. 19078

[21] Appl. No.: 08/726,704

[22] Filed: Oct. 7, 1996

Related U.S. Application Data

[62] Division of application No. 08/422,912, Apr. 17, 1995, Pat. No. 5,564,119, which is a division of application No. 07/376,123, Jul. 6, 1989, Pat. No. 5,418,942.

[51] Int. Cl.$^6$ .................................................. G06F 17/30
[52] U.S. Cl. ........................................... 707/102; 707/513
[58] Field of Search ................................... 707/100, 102, 707/513

[56] References Cited

U.S. PATENT DOCUMENTS

| | | | |
|---|---|---|---|
| 4,315,315 | 2/1982 | Kossinkoff | 395/701 |
| 4,318,184 | 3/1982 | Millett | 707/1 |
| 4,366,551 | 12/1982 | Holtz | 707/1 |
| 4,479,196 | 10/1984 | Ferrer et al. | 707/100 |
| 4,491,037 | 1/1985 | Kitakami | 707/2 |
| 4,555,771 | 11/1985 | Hayashi | 707/1 |
| 4,571,679 | 2/1986 | Russell | 395/183.01 |
| 4,611,298 | 9/1986 | Schuldz | 707/1 |
| 4,631,664 | 12/1986 | Bachman | 707/100 |
| 4,644,496 | 2/1987 | Andrews | 395/800.13 |
| 4,656,603 | 4/1987 | Dunn | 364/488 |
| 4,674,066 | 6/1987 | Kaccra | 707/5 |
| 4,679,139 | 7/1987 | Durbin | 707/1 |
| 4,703,435 | 10/1987 | Darringer et al. | 364/489 |
| 4,774,661 | 9/1988 | Kumpati | 707/3 |
| 4,901,221 | 2/1990 | Kodosky et al. | 345/348 |
| 5,101,340 | 3/1992 | Nonaka et al. | 395/701 |
| 5,187,788 | 2/1993 | Malmelstein | 395/703 |
| 5,206,950 | 4/1993 | Geary et al. | 707/100 |

FOREIGN PATENT DOCUMENTS

| | | |
|---|---|---|
| 0316957 | 5/1989 | European Pat. Off. . |

OTHER PUBLICATIONS

Fawcett, Bradley K The Z8000 Microprocessor 1982, Prentice Hall pp. 119–120.

N. Yankelovich et al "Intermedia: The Concept and the Construction of a Seamless Information" IEEE Computer, pp. 81–96, Jan. 1988.

N Yankelovich et al "Connections in Context: The Intermedia System" IEEE Sys. Sci. 1988 Ann. Hawaii Int'l Conf. v.2, pp. 715–724, 1988.

J. Conklin "Hypertext: An Introduction and Survey" IEEE Computer, pp. 17–40, Sep. 1987.

N. Yankelovich et al "Reading and Writing the Electronic Book" IEEE Computer, pp, 15–30 Oct. 1985.

Primary Examiner—Thomas G. Black
Assistant Examiner—Jack M. Choules
Attorney, Agent, or Firm—William H. Eilberg

[57] ABSTRACT

This invention is an information storage system which provides a self-contained environment for database management. Data are stored in the system not as conventional entries in memory locations, but instead as a group of connections between database sets. Procedures are also encoded as database set connections, and not in conventional form. Data and procedure cannot exist independently, in the present invention; instead, they are grouped together, into constructs called Contexts. Because the connections themselves are the data, the system is substantially independent of the particular hardware on which the system is implemented. The environment includes an editor which uses an icon-based syntax to create and manipulate data and procedure structures according to the invention. The present invention greatly reduces the time required to develop and maintain a database management system or other computer program. The system is not limited by the size of data variables. Also, a change in a data value, in one location, automatically changes that value throughout the system. Programs designed with the environment of the present invention are easier to code than conventional programs, and are generally self-documenting.

6 Claims, 52 Drawing Sheets

| PARENT'S NAME | SEX | CHILD 1 NAME | CHILD 1 SEX | CHILD 2 NAME | CHILD 2 SEX |
|---|---|---|---|---|---|

FIG 2

| JOHN SMITH | MALE | ADA | FEMALE | KAREEM AB | MALE |
|---|---|---|---|---|---|
| MARY SMITH | FEMALE | ADA | FEMALE | KAREEM AB | MALE |

FIG. 3

| JOHN SMITH | M | ADA | F | KAREEM ABDUL | M |
|---|---|---|---|---|---|
| JOHN SMITH | M | RALPH | M | | |
| MARY SMITH | F | ADA | F | KAREEM ABDUL | M |
| MARY SMITH | F | RALPH | M | | |

FIG. 4

DATA DEFINITION
BEFORE EXECUTION

DATA VALUE
BEFORE EXECUTION

DATA DEFINITION
AFTER EXECUTION

DATA VALUE
AFTER EXECUTION

| PARENT'S NAME | REQUEST KIND | h |

FIG. 17

| PRINT LINE | VALIDATE INPUTS | COPY TAPE |

FIG. 18

| SYSLIB1 | MY DIRECTORY | THE OLD INVENTORY SYSTEM |

FIG. 19

| EMPNUM | OR... | THE NUMBER OF THE EMPLOYEE WHO WILL BE THE FIRST ONE MONITORED IF A SUSPICIOUS ACT IS NOTICED |

FIG. 20

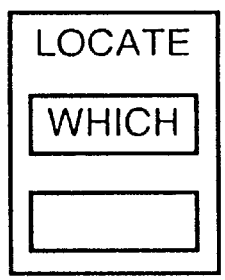
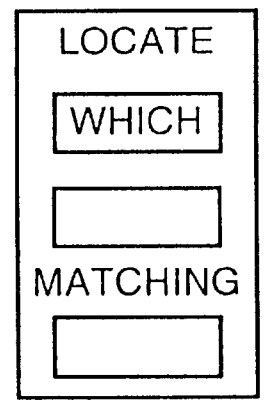
FIG. 38(A)  FIG. 38(B)
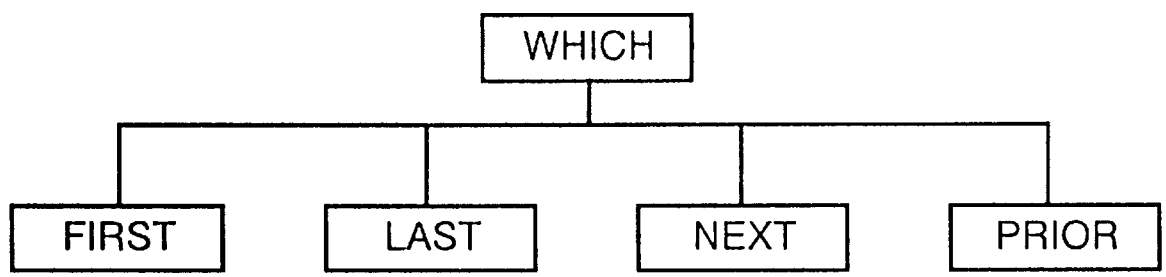
FIG. 39
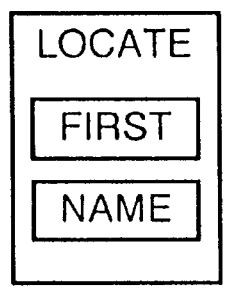
FIG. 40

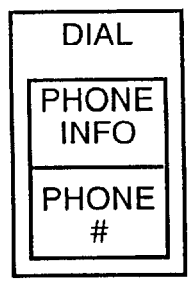 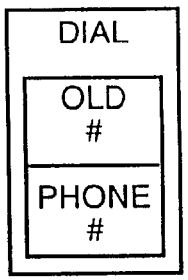 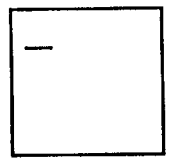 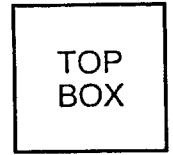
FIG. 55(A)　　FIG. 55(B)　　　　FIG. 56　　　　FIG. 57
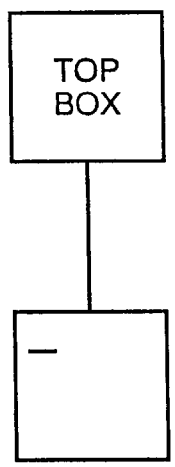 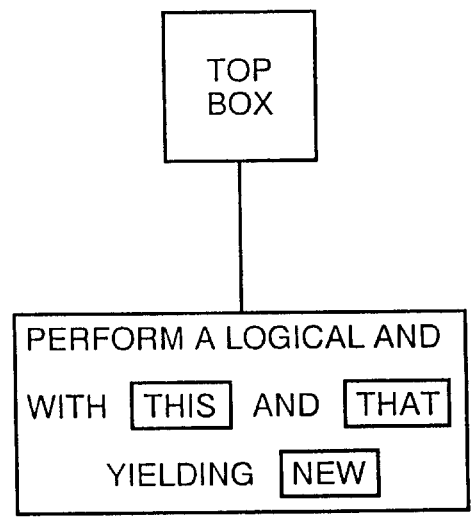
FIG. 58　　　　　　　　　　FIG. 59

[MAINTAIN] [NAME] AND [NUMBER] IN LIST]
  [THE ARGUMENTS]
    [GIVEN]
      [ENTRY]
        [NAME]
          MANY [CHARACTER]
            [A]
            [B]
            [C]
            . . .
            [X]
            [Y]
            [Z]
        [NUMBER]
          MANY [DIGIT]
            [0]
            [1]
            [2]
            . . .
            [7]
            [8]
            [9]
    [MAINTAIN]
      [ADD NEW ENTRY]
      [CHANGE NAME FOR THIS ENTRY]
      . . .
      [CLEAR WHOLE LIST]
  [PHONE LIST]
    MANY [ENTRY]
      . . .

FIG. 77

SYSTEM AND METHOD FOR STORING AND MANAGING INFORMATION

This is a division of prior application Ser. No. 08/422,912, filed on Apr. 17, 1995, now U.S. Pat. No. 5,564,119, which itself is a division of application Ser. No. 07/376,123, filed on Jul. 6, 1989, now U.S. Pat. No. 5,418,942.

BACKGROUND OF THE INVENTION

This invention relates to the field of automated information storage and retrieval, and provides an integrated programming environment which enables data structures to be easily built, maintained, and used.

There are many disadvantages associated with conventional database management systems. Data values are typically limited in size by the size of arrays and storage locations. If a data value is too large, it may be truncated; if it is too small, space is wasted. Increasing the size of data values, or adding data values to a data record, within a large program, can be a major project.

Database management systems are programmed with particular hardware in mind, and many hardware-related decisions must be made in the definition of data. One of the purposes of the present invention is to reduce this hardware-dependence.

In the present invention, data are stored in a manner which does not depend on the particular hardware implementation. The system of the present invention does require a relatively few hardware dependent modules (such as a program to send information to and from a monitor), but in its underlying structure, it is substantially machine-independent. Data can be added and removed, without regard to the size of individual data fields. Thus, the present invention eliminates the need for much of the program maintenance that is needed with conventional programs.

The present invention also helps the user in designing and coding a large database management system. With the integrated environment of the invention, the user can see the structure of data and procedure, and can, in effect, program in a very high-level language. By nature, the language of the present invention tends to be self-documenting, making it easier to maintain and debug programs written with the present invention. Thus, the invention substantially reduces the costs and time required for developing and maintaining large programs.

SUMMARY OF THE INVENTION

In its most basic aspect, the present invention is an information storage system in which data are stored as database set connections, and not as conventional data. It is another basic feature of the present invention that, to every set of data, there must be associated at least one defined procedure for operating on the data.

According to the present invention, data are stored in the form of "trees", which connect a network of nodes, or "boxes", in various ways. It is the connections between the boxes that represent actual data, not the contents of the boxes themselves. Thus, in implementing the system of the present invention, each box is associated with an internal "pointer" which points to another box, to which the previous box is connected. In one simple example, one may have a box entitled "Name", and a set of connections between that box and a set of boxes each representing a different character. As long as the system knows which boxes are connected, how many connections exist, and the order of the connections, the data comprising the "name" are fully defined by the set of connections between boxes. Thus, the representation of data is essentially independent of the hardware used, and the data are inherently expandable by adding to the database set connections. Also, the connections need not be made between boxes; a "box" is used as a convenient icon in the preferred embodiment, but other icons can be used.

In the system of the present invention, boxes are connected to other boxes, which in turn are connected to further boxes. Because the structures used in the present invention are therefore inherently recursive, the system of the present invention can be described as "fractal". The term "fractal" is used as an analogy, in describing the information storage scheme of the present invention.

The same scheme is used to encode procedural instructions. Data and procedure can thus be represented by their own "trees". For each data structure, there must be an accompanying procedure structure, and vice versa. Data and procedure structures are grouped together into compound structures called Contexts. Contexts are analogous to conventional subroutines and co-routines, and permit the stored data to be used and manipulated.

The present invention also comprises an integrated environment for program design and execution. A primary feature of this environment is an editor program which enables the user to create boxes (or other icons) and connections, for both procedure and data. The programs generated in this environment are generally self-documenting, and are thus easy to design and maintain. All of the procedures possible with the program of the present invention are built of several basic "primitive" commands and procedures.

The "boxes" discussed above can be represented internally, within a computer memory, by discrete units called Bricks. Each Brick is essentially a memory location containing a set of pointers, each pointer pointing to some Brick. It is therefore a fundamental principle of the invention that all data and procedure is represented as a collection of pointers.

It is therefore an object of the present invention to provide an information storage and retrieval system.

It is another object to provide a database management system in which data are stored in a manner which is hardware-independent.

It is another object to provide a database management system in which the sizes of the data elements are not limited.

It is another object to provide an integrated programming environment for a database management system.

It is another object to provide a programming environment which greatly facilitates the design, development, and maintenance of large programs.

It is another object to provide a data storage system in which all data are stored in the form of connections, or "pointers", and not as conventional data.

It is another object to provide a system as described above, in which procedural instructions are also stored in the form of connections or "pointers".

Other objects and advantages of the present invention will be apparent to those skilled in the art, from a reading of the following brief description of the drawings, the detailed description of the invention, and the appended claims.

BRIEF DESCRIPTION OF THE DRAWINGS

FIG. 2 is a diagram representing a sample record in a sequential file.

FIG. 3 is a diagram representing another sample record in a sequential file, and having truncated and missing values.

FIG. 4 is a diagram representing another sample record in a sequential file, but without missing or truncated data.

FIG. 17 contains examples of data boxes.

FIG. 18 contains examples of procedure boxes.

FIG. 19 contains examples of directory boxes.

FIG. 20 contains examples of two different box name styles.

FIG. 38 is a diagram showing the two forms of the Locate Context.

FIG. 39 is a diagram showing the Data Chart for the Argument Box for the Locate Context shown in FIG. 38.

FIG. 40 is a diagram showing the usage of the Locate Context to find the first occurrence of a data value.

FIG. 55 illustrates two Context Argument Boxes, to show how the system resolves ambiguities in Box names.

FIG. 56 illustrates the editor screen after the first Create Command, in a sample editing session.

FIG. 57 shows the editor screen after first Commit Command, in a sample editing session.

FIG. 58 shows the editor screen after a second Create Command, in a sample editing session.

FIG. 59 shows the editor screen after creating the Context described in the sample editing session.

FIG. 64 shows the structure of the procedure structure for a Context which performs a logical AND.

FIG. 77 is a diagram showing a lexical representation of part of the Data Structure of FIG. 65.

DETAILED DESCRIPTION OF THE INVENTION

1. Introduction

The present invention is a software product which replaces virtually all of the tools commonly used to support program development and execution. The invention is entirely self-contained. It serves as a multitasking operating system, language compiler, database management system, linker, debugger, source code editor, file directory structure, screen handler, program documentation aid, and design tool. In the environment of the present invention, these components are tightly integrated into a single unit utilizing a single syntax.

In order to achieve this high degree of integration, the present invention employs a recursive structure to define programs and data rather than employing bits and bytes. This recursive structure is analogous to the geometric construction known as a "fractal". A fractal shape is drawn by replicating a simple curve many times over according to an algorithm. The drawings which result from this process often form intricate patterns which can closely resemble landscapes, clouds, snowflakes, stellar constellations, and other apparently random patterns. These techniques can also be successfully applied in the construction of information systems.

Figure 1A:
FIG. 1 is a diagram showing several successive stages of the growth of a fractal shape.
Figure 1B:
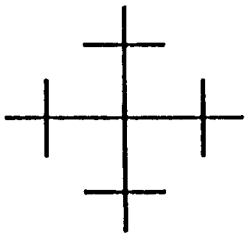
Figure 1C:
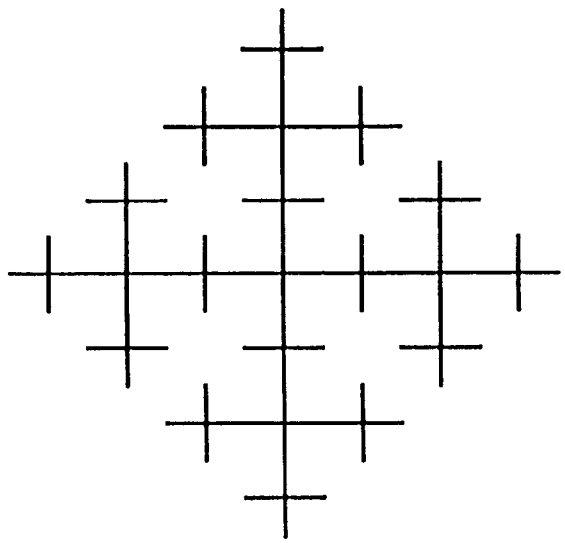

A simple fractal shape can be constructed with little difficulty. Only a curve and an algorithm are necessary for the construction process. For example, a curve which can be used to draw a sample fractal shape is a "+"-shaped line. The algorithm applied to this curve is to replace all straight lines with another "+"-shaped line. The diagrams in FIG. 1 show a few iterations of the algorithm.

In an analogous manner, the present invention uses a recursive, or "fractal" technique for intricate representations of data structures. But rather than blindly replicating a curve according to a simple algorithm to produce a fractal shape, the invention selectively replicates linkages between database sets. The presence or absence of a certain part of the fractal shape represents the presence or absence of a particular data value. The present invention provides the analog of an algorithm and a fractal curve to model complex databases and systems. One such model of a database and system is the invention itself; excluding hardware device drivers, the present invention is written entirely in the language of the present invention.

The key concept of the present invention is its sameness. Because the invention is based on a single fractal "curve", all aspects of the environment of the invention become virtually identical. To match the underlying fractal nature of the present invention, a traditional lexical software environment with word-based syntax has been abandoned in favor of a graphic software environment with icon-based syntax. The present invention employs a compact, simple syntax, utilizing only eight pre-defined primitives built from four graphic symbols to completely describe any database relation, data value, program, directory structure, subroutine, or multitasking operation. This specific implementation of the environment of the present invention is only one of the many possible implementations of a fractal information system.

The environment of the present invention spans virtually all aspects of program development and database management, as well as some of the less-thought-of areas of data processing. As a working definition, the term "environment" refers to the collection of the following software components:

Multi-tasking operating system;
Stored database;
Executable procedures;
Database schema language;
Database schema language editor;
Database query language;
Database query language editor;
Procedural language;
Procedural language editor;
Screen generator;
System prototype generator;
Database maintenance utilities;
Source code maintenance utilities;
Hierarchical directory structure;
Symbolic Debugger;
Computer Aided Software Engineering (CASE);

and the following hardware components:

The "fetch/execute" procedure-execution hardware;
Physical storage media, such as a 32-bit×256 K-byte core memory;
Hard-wired Arithmetic/logical operations, such as "Multiply" or "AND";

and the following system development components:

Structured analysis;
Structured design;
Data encapsulation;

Object oriented;

System development methodology;

Self-documentation.

and the following general design goals:

Simplicity;

Fast to learn;

Consistency;

Easy to change;

Infinitely expandable in all aspects.

Since any hardware components can be simulated by software components, the term "software component" may include all hardware components. Also, a new form of hardware can be tailored to match the fractal environment.

The present invention significantly reduces the cost of developing and maintaining information systems. Such systems have been developed with the present invention, and the result is substantial savings in the area of time efficiency, design efficiency, and maintenance efficiency.

The most striking benefit of the environment of the present invention is the reduced amount of time required to bring an application on-line. Systems implemented in the present invention required a maximum of one-fourth ($\frac{1}{4}$) to a minimum of one-thirtieth ($\frac{1}{30}$) of the time required by the traditional programming approach, with the average application requiring approximately one-tenth ($\frac{1}{10}$) of the usual time.

Another benefit of the environment of the present invention is in enhanced design efficiency. Although most programmers routinely perform some level of design activity before beginning coding, only a few design the entire system. Some perform no design at all. Coding in the present invention, however, is the virtual equivalent of designing with state-of-the-art design tools, but with the added value of total system integration stemming from the fractal viewpoint. This yields better, more straightforward, easily maintainable designs.

The environment of the present invention also provides for the on-line maintenance of all data and programs. Because of the simple internal structures of the present invention, adding or removing peripheral devices or additional disk or memory can be performed online while other programs in the system are still executing. This simple Reduced Instruction Set Software (RISS) architecture also limits the number of things that can go wrong in a system. Except for hardware failures, there are virtually no error conditions possible within the environment of the present invention. This simplifies coding and greatly reduces overall maintenance efforts.

Unlike programming tools of the prior art, the present invention is completely hardware-independent. The separation of the underlying machine from the data structures is a complete one in that no hardware-related decisions are involved in the definition of data. This one fact greatly reduces maintenance needs over the long term. Because all data values in the present invention are of variable length and infinitely expandable, data values can be built of as many digits or characters (or whatever) that they need to be. This reduces the maintenance effort because many problems will never appear. For example, truncating data values or overflowing arrays simply cannot happen. Having to expand fields to accommodate larger numbers need never be performed. A byte can have as many bits as needed, irrespective of the underlying hardware. Additionally, due to the complete lack of duplication of data in the present invention, changing a data value in one place instantly changes all occurrences of that value, systemwide and simultaneously. Thus, most of the maintenance problems inherent in traditional systems have no counterpart in the present invention.

In the present specification, particular terms of importance to the present invention are capitalized.

2. Fractal Database Theory

To understand the fractal information system of the present invention, it is helpful to describe and compare the methods of storing information in sequential, relational, and fractal environments, respectively. The following examples describe a generalized implementation of the data structure required to represent the information "parent's name", "parent's sex", "children's names" and "children's sex".

2.1 Sequential Information Systems

The first type of information system to be reviewed is the sequential information system. A sequential information system holds all data in lists. To access a particular entry in a list, either the list is scanned sequentially, or some form of indexing is employed.

A sequential information system is modeled very closely on the underlying hardware devices, such as core memory, tape drives and disk files. The reason for this approach is that historically, storage was at a premium. The high cost of hardware prohibited any unnecessary overhead. Thus, virtually all of the information that was kept in storage was the actual data value. This philosophy of data storage persists in many (if not most) sequential file systems today. For example, no information is generally included with a data record which associates any single record with any other record. This association is usually performed by the physical sequencing of the data records themselves. This lack of explicit control information is one of the primary indicators of a sequential system.

For example, implementing the sample data structure "parent's name", "parent's sex", "children's names" and "children's sex" can be accomplished in a sequential information system with the universally-implemented fixed-length record. A fixed-length record usually includes space for only a finite number of fields due to hardware or software limitations. To keep the examples simple, assume that the hardware can accommodate a record length of only a few dozen bytes, rather than the usual, less-restrictive 32,767 bytes.

FIG. 2 is a pictorial representation of a sample record format representing the information "parent's name", "parent's sex", "children's names" and "children's sex" in a sequential file. In this flat file structure, no interrecord information is retained to connect two records, except for the record sequencing itself. This sequence is usually enforced by the storage media.

Many difficulties arise with the use of sequential files. For example, information on a given child could possibly appear more than once within the information storage system. Also, because of the fixed format, a name can be truncated or a third child could be omitted. FIG. 3 illustrates these points for the case of John and Mary Smith and their three children Ada, Kareem Abdul, and Ralph. Notice that in FIG. 3, Kareem Abdul's name is truncated and Ralph's was omitted entirely. Conversely, the spaces which follow most of the names represents unused, wasted space.

There are various methods available to circumvent some of these problems, but such methods are generally rather inefficient. A few of these tuning measures are listed below:

Field sized can be fine-tuned to minimize truncation of names. However, this requires an extensive analysis effort and the analysis must be periodically reviewed.

The codes "M" and "F" can be introduced to signify Male and Female, respectively, to reclaim additional space.

But the encoding/decoding of any sort of code involves processing overhead as well as adding complexity.

A second record could be added to show the existence of more than two children, but only at the expense of 1) duplicating the parent's name on the new record; and 2) incurring the processing overhead required to handle the multiple-record case.

Once the above procedures are performed, the result begins to appear less like real information and more like common programming practices. FIG. 4 shows both the tuning of field sizes and the addition of a second record which includes the missing child's name.

Still another level of tuning can be introduced. Rather than duplicating the parent's name or child's name, a code can be used instead of the name, such as an individual identity number or some other value. Regardless of the encoding of this key information, one of the drawbacks of a sequential information system is that some piece of programmer-maintained data must be duplicated to serve as that control information, whether it is a name, a social security number, or whatever. This duplication of data now introduces an additional problem: when a name or code is changed, all occurrences on all records must be changed as well. The overhead incurred in altering every occurrence of a given value is not trivial.

Placing the burden on the programmer to process the above-described implied control information increases the complexity of any program. In other words, whenever a module is written which matches up two records, the programmer is, in effect, writing a relational database handler to extract and utilize the control information hidden in the records or in their sequencing. This means that the control information which links two records together is represented as executable code rather than as stored data. This requires that the actual linking be performed again each time the program is executed, which is clearly a waste of hardware resources.

Thus, sequential information systems are inefficient in the storage and extraction of information. Although the inefficiencies can be minimized somewhat, they remain formidable.

2.2 Relational Information Systems

The second type of information system to be discussed is the relational information system. In a relational information system, data is still stored in lists, as in the sequential information system. However, rather than storing all of the information in one large list and its related record-matching programs, the information is scattered in several smaller lists. These small lists are joined, not by their relative sequence or by record-matching programs, but by control information introduced by the relational information system itself.

Figure 5:
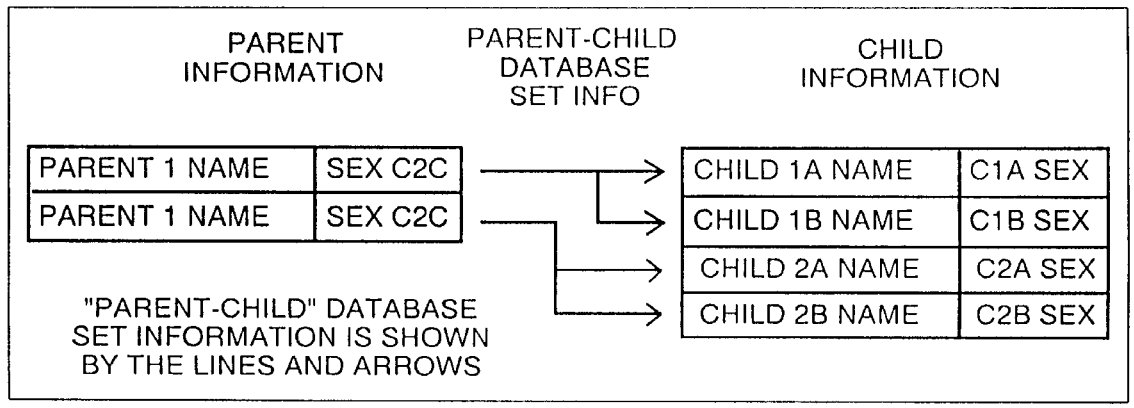
FIG. 5 is a diagram representing a sample record in a relational database file.

The sample data structure of parents and children discussed above is represented in a somewhat different manner by a relational information system than by a sequential system. The primary difference is that in the relational system, the children's names and sexes are stored independent of the parent's names and sexes. The relational system adds the necessary control information which can link parents to children, namely, a "Parent-Child" database set. Generally, these relationships can be shown as illustrated in FIG. 5.

Storing the child information in separate lists eliminates much of the chance for duplication that occurs within a sequential information system. Nevertheless, duplication still exists, but now on a different level. A given name (such as "John Smith") or a given sex (such as "Female") could possibly appear more than once within the smaller lists. On yet another level, the individual text characters which comprise a given name or sex are continually being duplicated in that they can occur multiple times within a list or across many lists. (This implies that converting a database from EBCDIC to ASCII is, by design, a byte-by-byte effort). Also, the possibility for truncation still exists.

Figure 6:
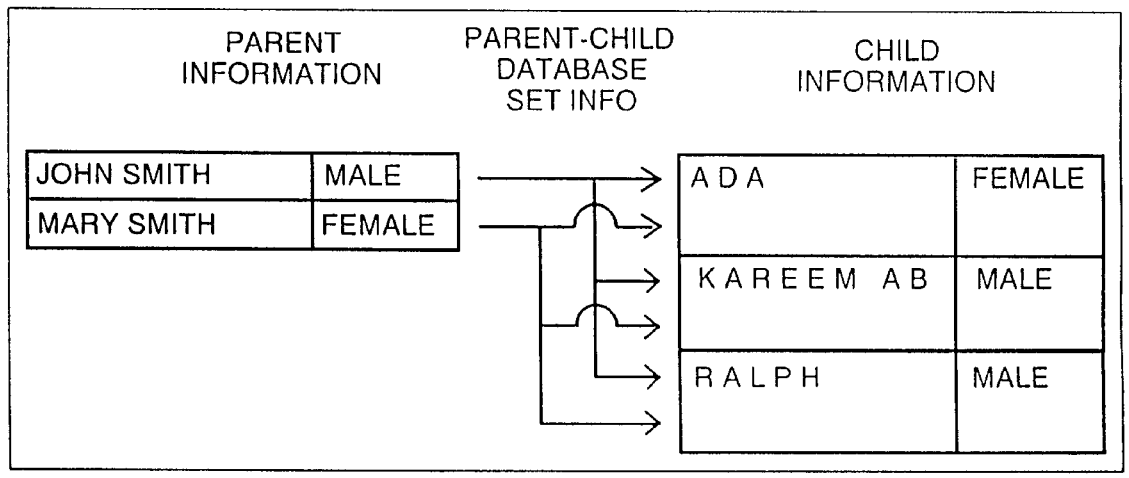
FIG. 6 is a diagram representing a sample record in a relational database file, showing truncation of some of the data.

FIG. 6 shows the result of some of these deficiencies for the case of John and Mary Smith and their three children Ada, Kareem Abdul, and Ralph. Note that all of the problems encountered in sequential information systems are evident here as well. For example, Kareem Abdul's name is still subject to possible truncation; note also that the spaces which follow each of the names still represent unused, wasted space. To circumvent or minimize these problems, the same tactics which were used in the sequential information system can be used here as well. Codes can be introduced and space apportionment can be tuned, but only with the attendant cost of increased effort and complexity.

Despite these shortcomings, the relational information system has many advantages over the sequential system, including reduced duplication with the resultant improvement in processing efficiency. However, duplication of information still occurs. Control information must still be implied by the programmer when the code is required to "walk" through two or more database sets to collect all of the needed data. Requiring each program to walk these sets introduces a maintenance problem: should the database set connections change, any program which traverses those sets must also be changed, requiring a non-trivial conversion effort. Thus, relational information systems are inefficient in the storage, maintenance, and extraction of information, but not as inefficient as sequential information systems. Although the inefficiencies can be minimized somewhat, they still remain formidable.

2.3 Fractal Information Systems

The third type of information system, and the one used in the present invention, is a fractal information system. This type of information system is discussed below.

2.3.1 Selecting the Fractal "Curve"

To understand the structure of a fractal information system, consider the differences between the sequential and relational systems. In a sequential information system, data is stored in one big list. There are no links between records except for media-induced links (i.e., the fact that the information is kept as adjacent ASCII bytes) and programmer-induced links (i.e., the fact that a program performs record matching). A relational system links various smaller lists together, replacing some of the media- and programmer-induced links with system-induced links (i.e., belonging to the "Parent-Child" database set). However, the relational system does not replace all of the links. Hardware dependencies still remain.

A fractal system continues this replacement of media- and programmer-induced links with system-induced links until all media- and programmer-induced links are gone. With the removal of the media-induced links, all hardware dependencies are removed as well. With the removal of the programmer-induced links, programs become simpler to write and maintain.

An example of this kind of link replacement can be performed with "parent's name" from the sample data structure. In the sequential and relational systems, the characters in the parent's name are linked together by the storage media, that is, the characters reside in adjacent bytes. In a fractal information system, this media-induced link is replaced with a system-induced link. Specifically, a "Name- Letter" data-base set is introduced. This replaces the media-induced adjacency of the ASCII characters in the parent's name with system-induced links instead. Just as a parent can have certain children, a parent's name can have certain letters. If system-induced links can be used to connect a parent to the children of that parent, they also can be used to connect a name to the letters of that name.

Thus, in a fractal environment, the name is not a collection of adjacent ASCII bytes. Rather, each byte in the name is stored a member of the "Name-Letter" database set. For the parent "John Smith", for example, the first member in that "Name-Letter" set is "J", the second member is "o", the third, "h", and so on. Note that the letter "h" participates twice in the "Name-Letter" database set for "John Smith": initially as the third member in the set representing the name "John Smith", then again as the last member.

The ability to link each individual letter to a character string implies certain changes in the manner of storing data. The most significant change is that each letter must be stored separately in the information system so that it can be linked separately. Thus, each letter becomes the only value in its respective list. In this way, a given letter (that is, its single-letter list) can be linked as a member of many different "Name-Letter" sets to form many different parent's names. But the actual letter itself need only appear once within the entire information system, specifically, as the only member in its list.

A unique ability of a fractal system is based in the concept of a single-letter list. Since a given letter is stored in only one list within the entire information system, the letter can be changed to any other letter at any time; simply change that single value in that list. Because it is the only copy of the letter within the entire system, the change would apply to all usages within all sets instantaneously, simultaneously, and systemwide.

Despite the fact that a particular letter is not often changed, the ability to do so reflects a powerful aspect of fractal systems. Any database set connection can be altered in this manner. This feature drastically simplifies the maintenance overhead of changing all occurrences of a given value, as well as simplifying the general problem of sharing data on-line.

Introduction of the "Name-Letter" database set has a major duplication-limiting effect on the storage of the characters. This is shown in the relationship between the name "John Smith" and the letter "h" which is used twice in the name. For example, for each usage of the letter "h", the "h" list is linked as a member of the "Name-Letter" database set. Remember that the letter "h" is not an ASCII character; it is the only value that is stored in the "h" list. This "h" list is connected as a member of the "John Smith" "Name-Letter" database set two separate times. Even though there is only one "h" which occurs in the "h" list, it is linked into the "John Smith" name twice rather than being duplicated in the name. That single copy of the letter "h" may be linked elsewhere, participating in many other sets throughout the information system. Just as two parents can share the same child, two or more names can share the same letter "h". That letter "h" is stored in one and only one list within the entire information system rather than being duplicated in other lists with other letters. Names which need this letter must link on to it via the "Name-Letter" database set. Thus, with the introduction of the "Name-Letter" database set, a media-induced link is replaced with a system-induced link.

However, there is another externally-induced link which still exists, but a much subtler one. An example of this subtle link is the link between the "h" list and the letter "h" itself.

It is important to note that the letter "h" is unique within its list, being the only member. One may therefore replace the link between the list and its letter with a database set connection, namely a "Letter-h" database set. Thus, the "Letter-h" database set can be linked instead of the actual letter "h". This implies that the actual encoding of the letter "h" need not physically exist; it can be replaced with a database link instead. Thus, a fractal system can utilize any letter in the name without resorting to any hardware-related information (such as the ASCII code of the letter). The ASCII value of each letter is replaced internally with a database set.

Thus, in order to represent the value for the name "John Smith", the name can be linked to its letters via the "Name-Letter" database set, which in turn can be linked to its specific value through the "Letter-J" set, the "Letter-o" set, the "Letter-h" set etc. The actual letter "h" is no longer needed because the presence of the letter "h" in a name can be established simply by knowing that this particular letter in the "Name-Letter" set is a member of the "Letter-h" database set. Because it is in the "Letter-h" set, it must be the letter "h" and nothing else. Since the value can be determined from the set name, no actual encoding of the letter "h" is required to physically exist. It is enough to know that this member is of the "Letter-h" database set to know that it is indeed "h".

Thus, the lowest-level piece of information can be represented, not as an ASCII byte stored away in some list, but rather as a database set connection. It is thus a basic principle of the present invention that any information system can be represented solely by database connections. When all control information has been isolated in an information system, no explicit data values remain; only the control information of the database set connections remain.

Therefore, the database connection is the pattern, analogous to the fractal curve, which determines the "shape" of the environment of the present invention. The fractal "shapes" of the present invention are formed exclusively of database connections. These database connections connect other database connections with the connecting being performed by database connections.

Because any data can be expressed as only database connections, it is possible to construct a network of such connections which represent definitions of data and, by extension, definitions of executable programs. Thus, total hardware independence is achieved in a fractal environment. Any data can be represented as a series of database connections instead of a series of bits, bytes, or registers. Data is completely independent of the underlying machine environment, irrespective of the number of bits in a counter or the number of characters in a name.

To improve processing efficiency, hardware memory can be devised which is specifically designed to hold a representation of the database set connections. Hardware processor logic can access this "fractal" memory device, following the directions contained in the pattern (program) therein in order to change the pattern (data) therein.

Thus, fractal information systems do not use any lists at all. The list-induced duplication contained within the sequential and relational information systems is eliminated completely. All control information is moved out of the executable program and into the information system. This implies that changes to the data structure require no changes to the executable program.

2.3.2 Fractal Control Primitives

Having defined the structure of the data in a fractal database, the next step is to define those procedural elements which operate on that database.

Because, in a fractal environment, an information system can be built out of database connections, the process of choosing primitive procedure functions is greatly simplified. Because all data is represented exclusively as database connections, accessing all data in a fractal database is accomplished exclusively through database commands.

By using database commands, letters and numbers are manipulated as members of database sets rather than as binary encodings or arrays. Because a database set can be designed such that it can always hold another member, this database viewpoint provides for the infinite expandability of any data value. This permits the handling of both character and numeric values of any length. For example, there can be virtually an infinite number of members of a set, sets of sets, sets of sets of sets, etc. limited only by the amount of hardware available.

Within a fractal environment, procedural commands fall into two broad categories: database control commands and procedure control commands. These are explained below.

2.3.2.1 Database Control Commands

Database control commands are the most primitive functions which can act upon the contents of a database. In a fractal environment, there are only a limited number of functions which can be performed on the database due to the exclusive use of database connections for data definition. Since every connection in a fractal information system is, by definition, a database set, only a small group of database control commands need to exist. Specifically, these control commands are the basic database set operations. In general, the basic database set operations which can be performed on database sets are: locating, accessing, adding, changing or deleting data. Any other database operations can be constructed from these operations. However, even as many as these five are not absolutely required.

The following is an explanation of each of the above-mentioned data-base set operations.

2.3.2.1.1 Locating Data

Locating data means to find a certain entry in a database. Locating data can be positional, as in locating the first, last, next, or previous entry, or locating data can be direct, as in locating the entry which corresponds to a certain value. In either case, the located data value is made ready for accessing, i.e., it becomes the "current" value. Locating a value is a necessary prerequisite to pinpoint the target location in the database before any other database commands can be used.

2.3.2.1.2 Accessing Data

Accessing data means to extract the current value from a located entry. Since the only accessing that can be done to the database is via database commands, that is, through locating, adding, changing, or deleting, the term "accessing" is implicit in the other database commands, and, therefore, meaningless as an independent entity. This function can be omitted.

2.3.2.1.3 Adding Data

Adding data means to precede or follow the current entry with a new entry. The added entry becomes the current entry. Since "follow" means the same as "locate next" plus "precede", only "precede" is needed to add data; "follow" can be omitted. The precede function serves as the inverse of the delete function; it is required to increase the size of a fractal in formation system.

2.3.2.1.4 Deleting Data

Deleting data means to remove the entry from the database. The entry following the deleted entry becomes the new current entry. This function serves as the inverse of the precede function; it is required to shrink a fractal database.

2.3.2.1.5 Changing Data

Changing data means to replace the current entry with a new entry. Since "change" can be performed by "delete" followed by "precede", "change" does not need to exist explicitly. This function can be omitted.

One may include "change" instead of "delete" since deleting is the same as changing to a null value. It turns out that in the actual environment of the present invention, it makes no real difference; either one can be implemented. Additionally, the change can be made with no impact on any pre-existing data or procedures. With no reason to prefer "delete" to "change", the final decision can be deferred until hardware design. The remainder of this description assumes the existence of "delete".

In summary, only three database set operations, not five, are required to be defined as procedural primitives to perform all possible actions on a fractal database. These three database set operations are Locate, Precede, and Delete.

2.3.2.2 Procedure Control Commands

Procedure control commands are those commands which are required to automate the interaction between a human or machine and a database. If automated database accessing were not needed, no program control commands would need to exist; the human could directly access whatever data was required by using the database set commands alone.

Automating database accessing can be easily accomplished. There are only five situations which require any control. Hence, there are only five commands.

The first command, Invoke, initiates the execution of a program. The second, Iterate, gives the ability to step through all occurrences of a value, (such as looping through all characters in a name). The third command, Enumerate, controls choosing a course of action based on a data value (such as processing only female children). The fourth and fifth commands, Accept Argument and Return Argument, control the passing of data into and out of a given Procedure. These commands are more properly classified as pre-defined Procedures, and are therefore described later.

No actions, other than those described above, are needed to control an executing program. The first three of the above functions are described below.

2.3.2.2.1 Invoke Command

This command is used to initiate the execution of a procedure. Once Invoked, a process continues until completed. The Invoke command does not affect the issuing procedure, that is, the invoked procedure continues its execution independent of the issuing procedure.

2.3.2.2.2 Iteration Command

Iteration is the decision of when to abort the repeated executions of a function, depending on some database condition. For example, when copying a name, the function being done is to copy the next character. The database condition which aborts the character copy is the "end of set" condition which is found at the end of the name. Another term for Iteration is abort on condition; the character copy is aborted at the end of the set.

2.3.2.2.3 Enumeration Command

Enumeration chooses the path to take when multiple choices are available. For example, different processing choices are associated with early, on-time, and late employees. Depending on a database condition, only one of the three choices is processed for a given employee. Another term for Enumeration is "execute only one choice and abort". A late employee is only subjected to late processing; early and on-time processing are bypassed.

Iteration and Enumeration are closely related, but in a logically inverted sense. Where Enumeration performs a process (based on a true database condition) before aborting, Iteration performs no process (based on a true database condition) before aborting. Conversely, where Enumeration performs no process (based on a false database condition) before aborting, Iteration performs a process (based on a false database condition) before aborting.

Together, the eight commands described or mentioned above, namely, Locate, Precede, Delete, Invoke, Iterate, Enumerate, Accept Argument, and Return Argument form the complete set of program control commands necessary to manipulate data in a fractal environment. All other data processing operations, whether implemented in hardware (such as multiply) or in software (such as inventory control systems) can be built from these eight primitives. Of course, implementing a fractal system on nonfractal hardware introduces additional device-specific primitives which are associated with that particular device. Fractal hardware, however, requires only these eight procedural primitives.

2.4 Application of the Theory

The following discussion provides an informal model of a programming environment utilizing fractal concepts.

2.4.1 Fractal Data Descriptions

The central concept of a fractal environment is that any data can be represented solely by database set connections. The representation of these connections can take on many forms. The traditional "control card" approach can be implemented, or the latest formatted screen generator can be adapted to model the database connections. Rather than using a wordbased or field-based syntax, a graphic-based approach can be chosen to represent the database connections.

Figure 7:
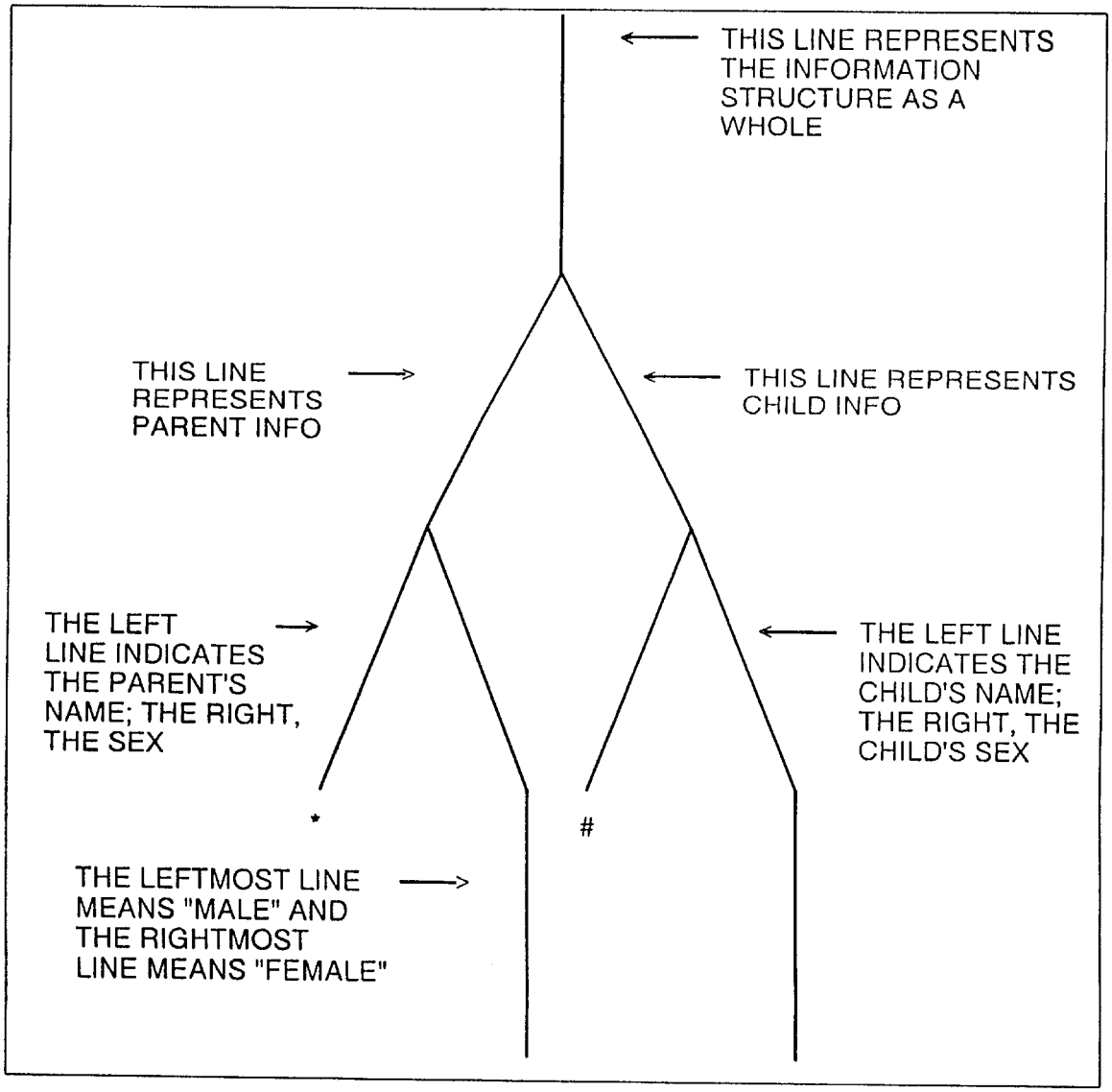
FIG. 7 is a diagram representing a sample data structure in a fractal database.

Since there is only one possible element in a fractal environment, only one icon is needed to represent information structures. To keep the drawings simple, the presence of a database connection is graphically represented by a single vertical line. Another icon can be chosen, but a line is more straightforward. Since database connections simply connect to other database connections, these lines would only connect to other lines. For example, the icons for the sample data structure "parent's name", "parent's sex", "children's names" and "children's sex" could appear as shown in FIG. 7.

To keep the example simple, the representation for Mr. Smith and only one child, Ada, is shown. Also, to make this diagram more readable, two substitutions have occurred, marked by "*" and "#":

The "*" means that there are ten lines descending from this line. Each of those individual lines represent one of the characters in the Parent's Name, "John Smith".

The "#" indicates that there are three lines descending from this one line, one for each letter in the Child's Name "Ada".

FIG. 7 is an example of how to picture a data value (in this case for John Smith the Male and his Female daughter Ada) using a single type of icon with some comments written alongside of the icons. Note that it is the database connections which define the entire value.

Since the lines all look alike, the comments and icons together are necessary to give the human a complete understanding of the data value. Internally, of course, there is no ambiguity; each line represents a different database connection. Thus, it is necessary for the programmer's sake to include the comments along with the icons.

Including the comments along with the line can be effected in two ways. One cumbersome way is to make each line unique such that its uniqueness identifies the comment. While this approach is adequate for the internal hardware, a programmer requires a more practical solution to retain the simplicity of the fractal approach.

Figure 8:
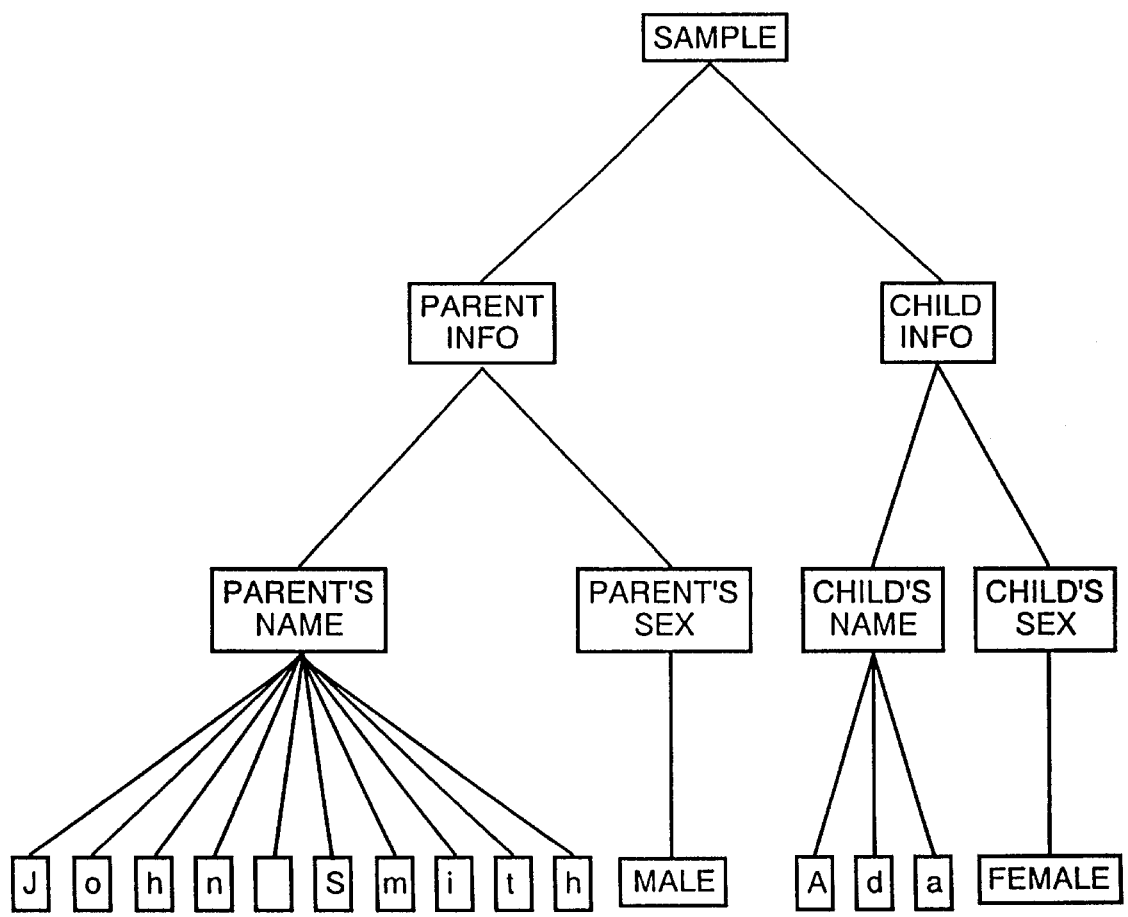
FIG. 8 is a diagram showing another representation of the sample data structure of FIG. 7.

A less cumbersome way to associate comments with icons is to enclose the comments in a rectangle, hooking them on to the bottom of their respective lines, such as in the example shown in FIG. 8. FIG. 8 shows that the Sample contains two pieces: the Parent's Information and the Child's Information. Furthermore, it shows that the Parent's Information is comprised of the Parent's Name and Sex and the Child's Information is comprised of the Child's Name and Sex. Finally, the example shows the members which comprise the set that defines the Parent's Name, namely, the characters "J", "o", "h", "n", " ", "S", "m", "i", "t", and "h", and, for the Child's Name, the characters "A", "d", and "a".

In the example of FIG. 8, the fractal nature of the structure is clear. The fractal "curve" being replicated is the database set connection, represented by a near-vertical line with a box at the bottom; the algorithm which, by repetition, builds the fractal shape is the question, "What are the components of this data element?".

In the following description, brackets are used to indicate that the text contained within the brackets is contained within a rectangle. Thus, the rectangle with the word "Sample" within it is represented as [Sample] when used within a paragraph.

Iterations of the algorithm which creates the "fractal" structure of FIG. 8 cause the data structure called [Sample], in FIG. 8, to be divided into two components, namely [Parent Info] and [Child Info]. Using the same algorithm on [Parent Info] and [Child Info], [Parent Info] breaks down into [Name] and [Sex]; [Child Info] breaks down in the same way. Applying the algorithm to [Name] shows that [Name] is composed ten characters. [Sex] can be either [Male] or [Female].

Applying the algorithm again to each letter reveals that there are no two meaningful components in the letter [J]. Because there is no further information about the letter beyond the [J], the construction of the fractal representation can halt at this point. [Male] and [Female] are not subject to further reduction either. Fractal construction can halt here, as well.

Note that all of the information represented in FIG. 8 is shown not by binary encodings, abbreviations, or ASCII bytes, but strictly through database connections.

Although there is some text associated with each database set connection (i.e., with each line), this text is not required to be present to represent the structure. When implemented on real machines, the set connections do not require the human-readable names; they can be assigned unique binary (trinary, decimal, or whatever) values which are of significance to the host hardware. As long as the hardware has a means of differentiating between lines, the text associated with the line is purely a comment, for the human programmer's convenience. Because of this fact, anything, from text to graphics to spreadsheets, can be used to name the connection.

2.4.2 Fractal Procedure Descriptions

The system of the present invention uses the fractal analogy to define not only data structures, but procedure structures also.

In traditional procedure control systems, control is transferred among procedure components in many differing ways: by performing a subroutine call, by adding an increment to a memory pointer to locate the next instruction, by replacing that memory pointer with a new pointer, by generating a software interrupt or monitor call, or by another obscure, hardware-specific method.

In a fractal procedure, there is only one way to transfer control between procedures, namely, through a defined database set connection. Just as a data element can be broken down into several components, a given process or procedure can be broken down into several subprocesses which, when taken together, comprise the given process.

Figure 9:
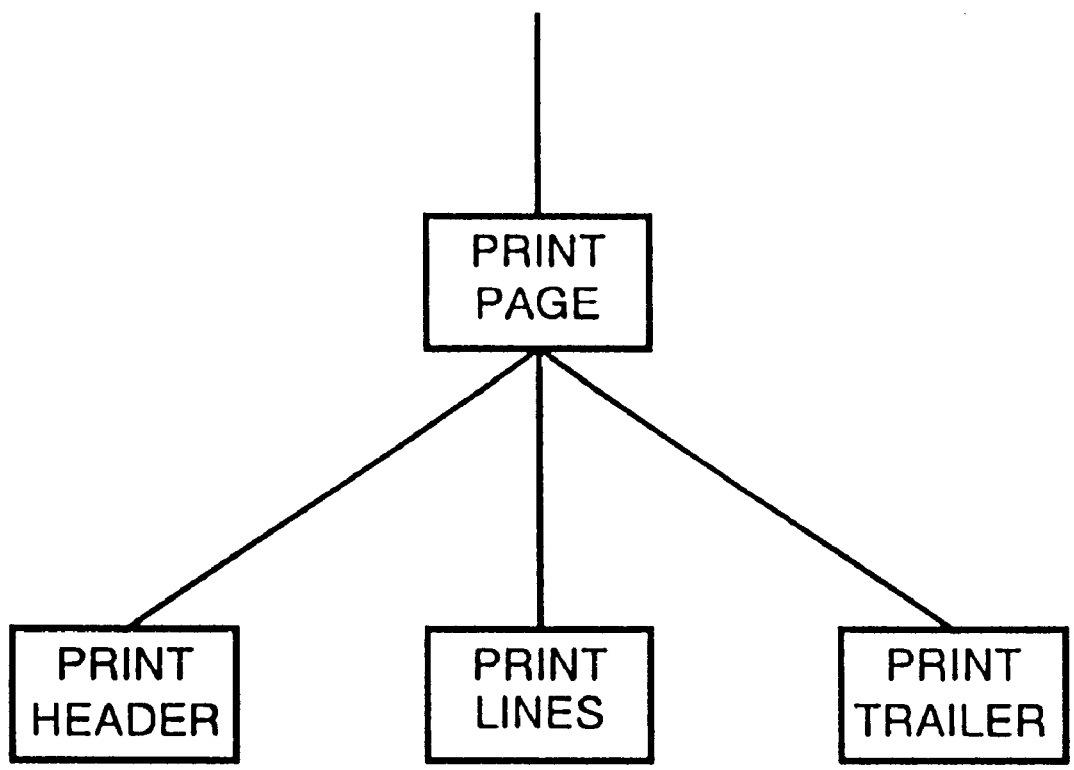
FIG. 9 is a diagram showing a sample procedure description for use with a fractal database.

For example, the process "Print Page" can be divided into three subprocesses: "Print Header", "Print Lines", and "Print Trailer". By extrapolating from the form of a fractal data definition, the fractal description of this procedure can be constructed as shown in FIG. 9.

Note the similarity of form between a data definition and a procedure definition. This similarity is brought about by applying the same algorithm to procedure which was applied to data. When defining data, the algorithm applied is "What are the components of this data element?". When defining procedure, the algorithm is slightly modified to become "What are the components of this procedure element?" Because of this similarity, two procedural subprocesses which are components of a given process can be represented in the same manner as two data subfields which are components of a given field.

Executing a fractal procedure is accomplished by "walking" the lines in hierarchical sequence. The execution sequence for the example presented in FIG. 9 can be paraphrased as follows: [Print Page] is performed by invoking [Print Header] first, [Print Lines] next, and [Print Trailer] last. The sample does not show that [Print Header] has subordinates which, when taken together, print the header. Likewise for [Print Lines] and [Print Trailer]; all subordinates are traversed.

2.4.3 Integrating Procedure and Data

With the definition of both data and procedure descriptions completed, the next step is to define their integration.

In a traditional programming environment, a program is composed of four parts: a name (to identify the program), a process (to translate inputs into outputs), a local data area (to hold any intermediate results while translating inputs into outputs) and an interface to the program (a definition of its inputs and outputs). In other words, a name indicates a specific process which is accompanied by its data area, consuming inputs and producing outputs.

In a fractal environment, too, this definition is still a valid one. The combination of a name, a data area, a process, and its interface is called a Context. A Context is the named integration of a procedure with t h e data that it acts upon, accepting inputs and returning outputs. A Context is invoked by its Context Name either by a human or by another Context. When invoked, the named Context performs the Context process on the Context Arguments (transforming the Context input into Context output), using the Context Data to hold any intermediate results.

From a traditional point of view, the structure which most closely approximates a Context is a procedure block or a subroutine. A Context is similar to these structures in many ways: it can perform a discrete function, it can accept and return arguments, it can possess data values which are (or are not) retained across successive invocations, etc. A Context differs from a subroutine in that it is more independent than a subroutine; a Context is more like a stand-alone subsystem than a subroutine.

The most significant feature of Contexts is their ability to completely encapsulate the data associated with them. Encapsulation means that the data within a Context can only be accessed by invoking a process which is directly associated with that data (i.e., the Context procedure). Conversely, data cannot exist without the process required to service it. Data requires procedure and procedure requires data; one is meaningless without the other.

The latter statement implies that the traditional concept of a "file", that is, data without process, has no counterpart in the "fractal" environment of the present invention. If any data are to be stored, there must be some process to accompany those data which "knows" how the data can be accessed or manipulated. For example, if a Context encapsulates a list of children, the appropriate process must accompany that list to perform actions on the members of the list, such as adding, changing, or deleting children.

Thus, a Context is the named association of two fractal "shapes": the first "shape" is the fractal data structure, and the second shape is the fractal procedure structure which services that data structure. A Context is invoked by either a human or by another Context. A Context can accept inputs, return outputs, invoke other Contexts, and can access only those data associated with it.

2.4.4 Directories

The following is a description of the concept of Directories, which are the named locations of stored Contexts.

In a fractal environment, data and their associated procedure are joined together into Contexts. Because a Context is a combination of two fractal "shapes", the Context itself is a fractal "shape", capable of being represented solely as a database connection. Because it is a collection of database set connections, each Context can be treated in the same manner as any other data structure. Thus, a data structure can be built which groups Contexts together into meaningful subgroups. These subgroups are referred to as Directories.

A Directory is actually a Context which has no arguments; it exists to serve as a repository for other Contexts. Related Contexts can be associated with one another by being grouped within a Directory. For example, FIG. 10 diagrams the fractal shape of some possible Directories with some associated Contexts.

Figure 10:
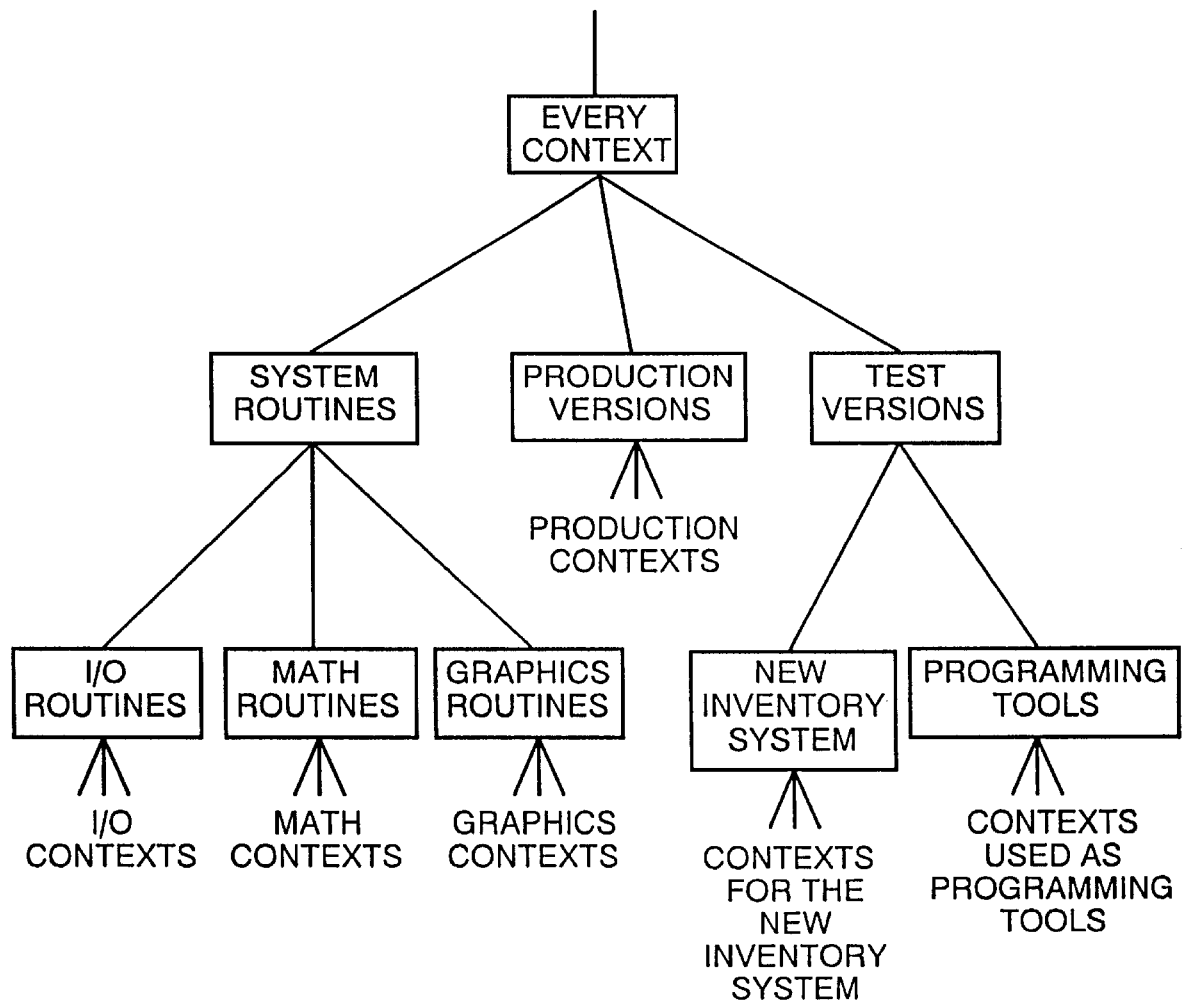
FIG. 10 is a diagram showing a sample directory structure in a fractal database environment.

FIG. 10 shows how Contexts can be grouped together into various Directories. Directories can be introduced into the structure at any level, at any time, and to any depth.

There are a few difference between fractal-based Directories and the directory structures provided with PC-DOS, Honeywell GCOS, VM minidisks, etc. Fractal Directories can contain any other fractal "curves", such as other Directories or Contexts. Fragments of various structures can be grouped into Directories, such as segments of incomplete coding or other random items. Another significant difference is that a given Context or Directory can appear in more than one Directory, if necessary.

Directories are the glue which pulls the entire fractal environment together into a single, integrated whole. For example, tracing upward through any hierarchy of database set connections leads upward from the data or procedure database connections, up above the Context, up to the Directory. Tracing upward further through all directories, the ultimate database connection is reached: the Top Box. The Top Box is the root database set connection. From this one connection, everything in the entire fractal environment can be located, including any and all Directories, Context procedures, and Context data. All other database connections are either directly or indirectly associated with the Top Box.

All Directories are subdirectories of the Top Box, either directly as a subdirectory of the Top Directory, or as a subdirectory of some other subdirectory. All Contexts in a fractal environment are connected to at least one Directory. Subsequently, all data and procedure values are connected to their Contexts. Thus, Directory, Context, Procedure, and Data are all joined together into one single integrated fractal "shape", beginning at the Top directory and continuing uninterrupted down to the lowest-level data values.

2.4.5 Definitions versus Values

For a complete understanding of a fractal environment, one must understand the relationship between definitions and their values. The following section describes the differences between definitions and values, and describes them for both data and procedure structures.

2.4.5.1 Data Definitions versus Data Values

In a traditional programming environment, data receive values by means of some sort of an assignment, such as in the statement "Move 1 to Digit". Such an assignment implies two facts: first, that there is a chunk of storage defined by the name "Digit", and second, that there exists a value of "1" which is to be associated with "Digit".

In a fractal environment, too, there is a distinction between a data definition and its value. However, this distinction is a much subtler one. When a value is associated with a definition (via the Precede database command), that association is performed by a database set connection, rather than moving the value "1" from one location to another. Instead of being copied, the value "1" is only linked with "Digit" to serve as its value.

Figure 11:
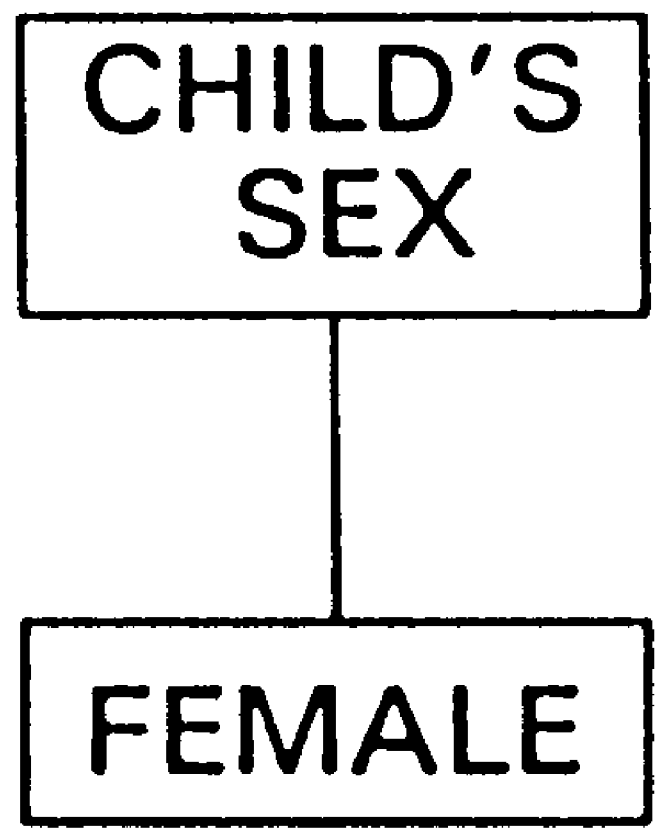
FIG. 11 is a diagram illustrating the portion of a sample data structure which shows that a child's sex is female.

FIG. 11 replicates a portion of the sample data structure from FIG. 8, specifically, the portion which describes the child's sex as female.

While FIG. 11 clearly states what the value of [Child's Sex] is, it does not state what all of the possible values for [Child's Sex] might be. The value is there; the definition is not.

The information which is missing here is the complete definition of [Child's Sex]. Just as the statement "Move 1 to Digit" implies something about the definition of "Digit", so too does [Female] imply something about the complete definition of [Child's Sex], namely, that [Female] is one of its possible values, and that they are both the same data type. A complete definition would include all possible values.

This is the primary distinction between the definition of data and the value of that data. The definition describes all possible values for the data, while the value of the data only selects one specific choice from among all of the possible choices.

Applying this rule to the definition of [Child's Sex], all possible values consist of only three choices: [Female], [Male], or no value (i.e., null). Since the null value means that there is no connection to any other line, this choice is not included when drawing a structure. Thus, a fractal representation of the definition of [Child's Sex] can be drawn as shown in FIG. 12.

Figure 12:
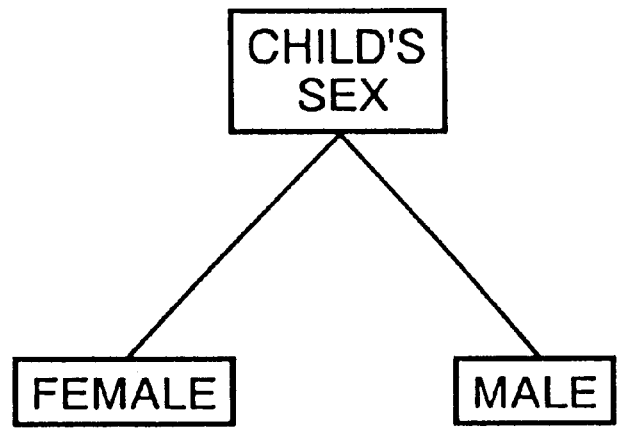
FIG. 12 is a diagram illustrating all possible values for [Child's Sex], in the example of FIG. 11.

This style of notation introduces a minor inconsistency between the interpretation of a data definition and the interpretation of a data value: since the data value in FIG. 8 states that [Child's Name] is composed of [A] and [d] and [a], then by analogy, FIG. 12 states that [Child's Sex] is composed of [Female] and [Male], rather than [Female] or [Male]. Clearly, this does not portray the intended meaning.

To avoid ambiguity and circumvent this inconsistency, the relative meaning of a database set connection must be perceived differently.

Note that the inconsistency occurs only at the lowest level of a data structure. On any higher levels in the structure shown in FIG. 8, (for example, with [Child Info]), the inconsistency does not exist; [Child Info] does indeed consist of both [Child's Name] and [Child's Sex].

Thus, only at the lowest levels of a fractal shape does this inconsistency occur. Therefore, only at the edge of the fractal shape is there a differing interpretation of the meaning of a database set connection.

An example of this re-interpretation can be seen with [Child's Sex]. Because [Child's Sex] is at the lowest level of the fractal "shape", the "shape" is interpreted to mean that [Child's Sex] can be [Female] or [Male] rather than [Female] and [Male]. This alteration of interpretation is valid for the lowest-level data only.

For the sake of visual clarity, for the convenience of the human operator, the lowest level data can be represented differently in order to highlight this change in interpretation, even though the database set connection that it represents is in no way different from any other one in the entire environment. One possible representation of that reinterpretation is shown in FIG. 13.

Figure 13:
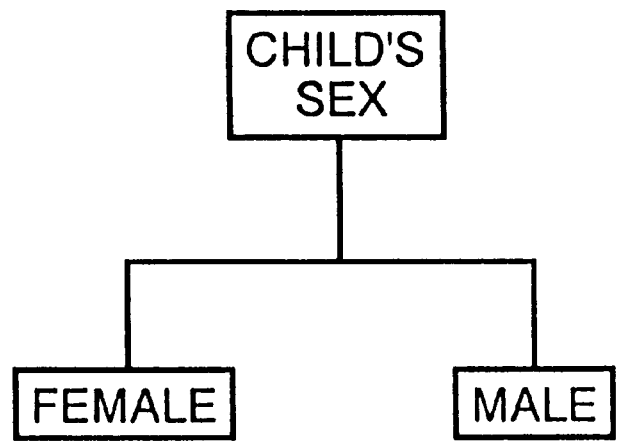
FIG. 13 is a diagram showing the representation of all possible values of a piece of data.

FIG. 13 shows the possible values for [Child's Sex], namely, [Male], [Female], and nothing else.

It is important to note that no change has been made to the existing fractal "shape"; no "second shape" is being added to describe the different interpretation. Instead, for the definition of data, the edges of the fractal "shape" are treated as the set of possible values rather than as a definition.

The relationship between a data definition and its value can be visualized as the value being a twin of the definition. Thus, a value can be associated with each definition at all levels of the structure. Initially, a data definition has no data values; they are added by the Precede command. When added, only those values are added which are required to provide concatenation with the highest level within the data structure. Conversely, if no value exists for a given definition, then no values exist for any subordinate definitions of that definition.

An example of the side-by-side nature of a definition and its value is seen when assigning a value to the definition of [Child's Sex]. To assign a current value to [Child's Sex], a Precede command is executed to Precede [Child's Sex] with [Female]. The execution associates the value of [Female] with [Child's Sex]. FIG. 14 shows both the definition and the value of [Child's Sex] before and after the command is executed.

Figure 14A:
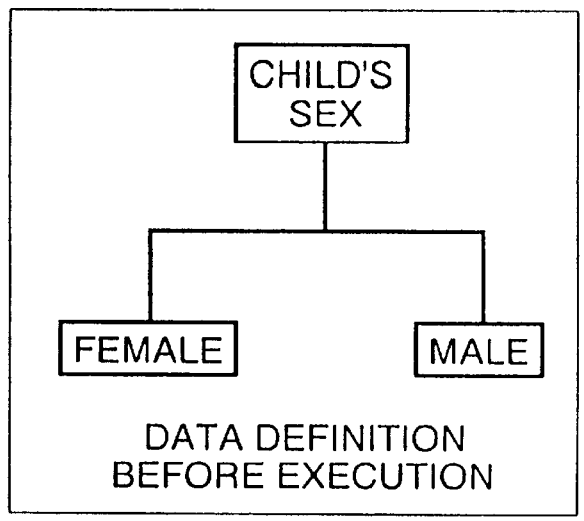
FIG. 14 is a diagram showing a data definition and data value, both before and after execution of an assignment of a value to a data definition.
Figure 14B:
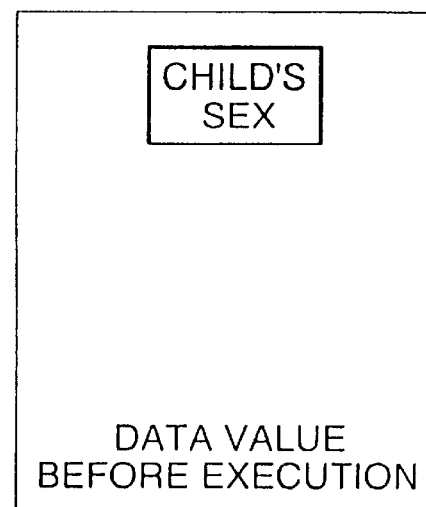
Figure 14C:
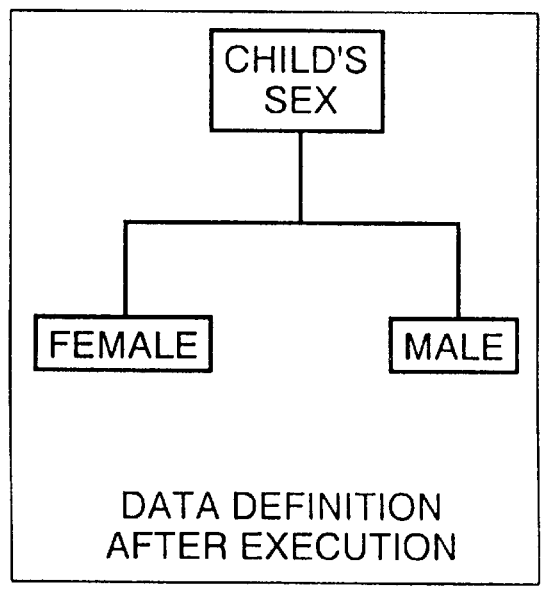
Figure 14D:
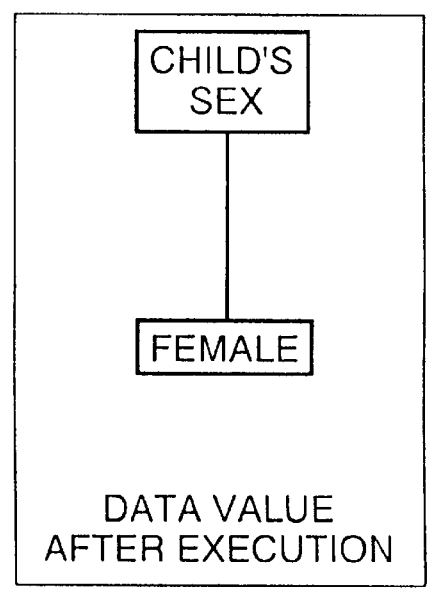
Figure 15A:
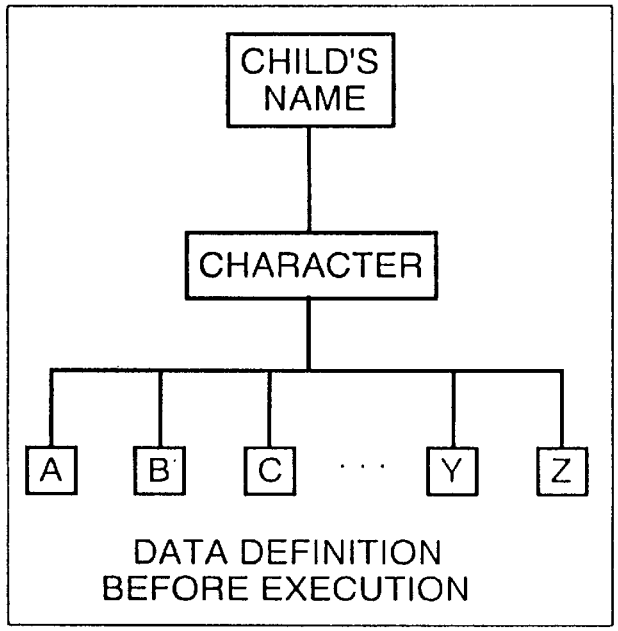
FIG. 15 is a diagram showing a data definition and data value, both before and after executing the command "Precede [Child's Name] with [A]".
Figure 15B:
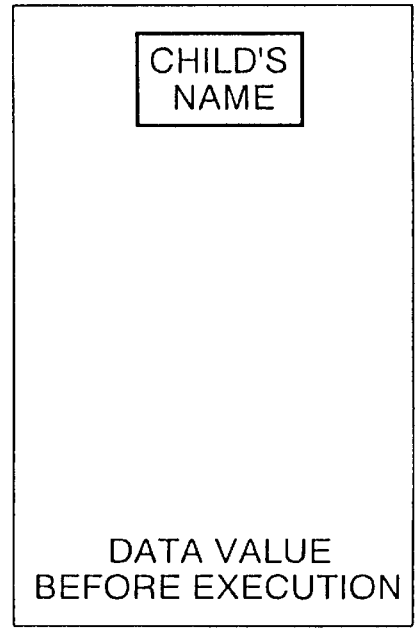
Figure 15C:
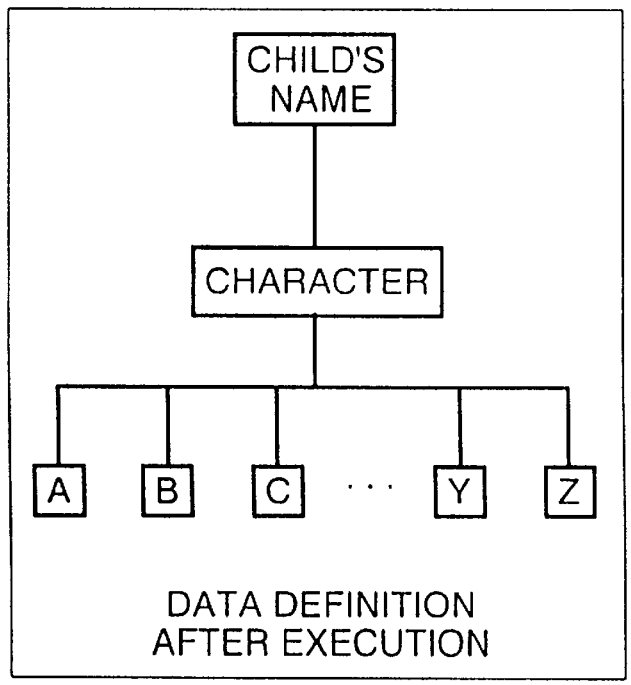
Figure 15D:
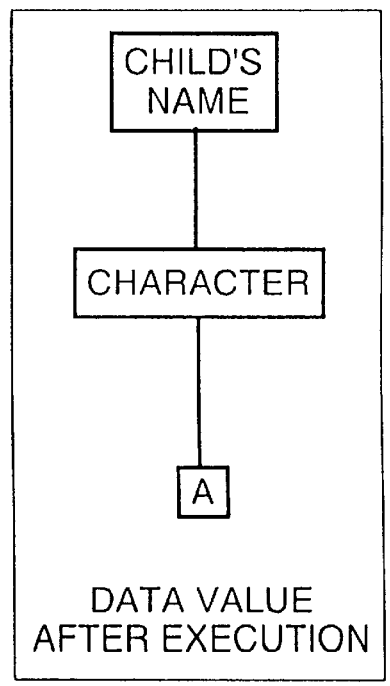

The example in FIG. 14(b) shows that before the procedure execution, no value is associated with [Child's Sex]. After execution, FIG. 14(d) shows that the value [Female] has now been associated with [Child's Sex]. Note that [Female] is not duplicated here; both structures are associated with the same [Female]. This association of a value with its definition is performed by a database set connection, as are all associations in a fractal environment. Thus, in the case of a data definition with a single value, the minor inconsistency is bypassed.

Having defined the one-to-one relationship, the next step is to define the case of the one-to-many relationship, such as with a child's name that consists of many letters.

To understand the multiple value case, begin with a single value case as shown in FIG. 15. The figure shows both the definition and the value for [Child's Name] as they appear before and after the "Precede [Child's Name] with [A]" command is issued.

FIG. 15 shows how the first letter of the name is associated with [Child's Name]. Subsequent letters can be easily added in the same manner; the new values are added to the structure via the Precede command, as described above.

To associate [Child's Name] with the data values [A], [d], and [a], simply issue the Precede command three times: once for [A], once for [d], and once for [a]. The result is that all three letters are associated as values of [Character], with [Character] being associated as a value of [Child's Name].

A rendering of the internalization of multiple values can be done, but is not necessary at this time. An informal presentation of the redrawing of FIG. 15 appears in FIG. 16. The figure shows the structure before and after the three Precede commands.

Figure 16A:
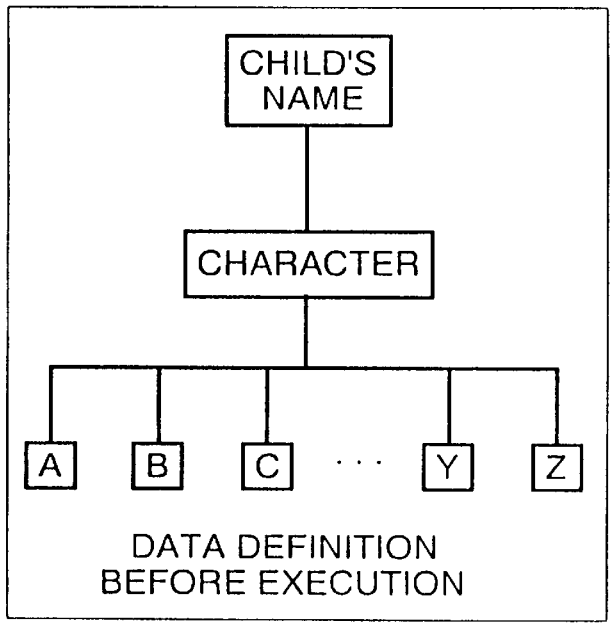
FIG. 16 is a diagram showing a data definition and data value, both before and after execution of three Precede commands.
Figure 16B:
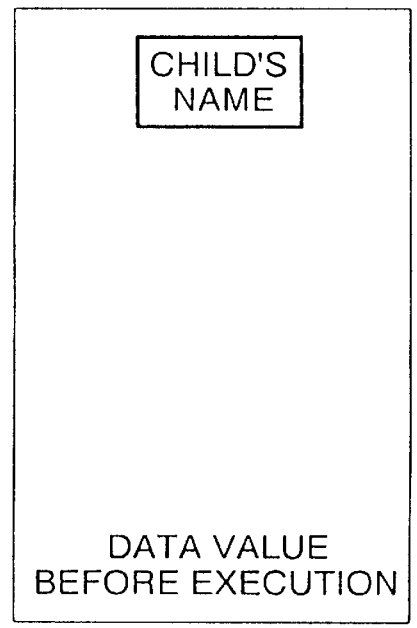
Figure 16C:
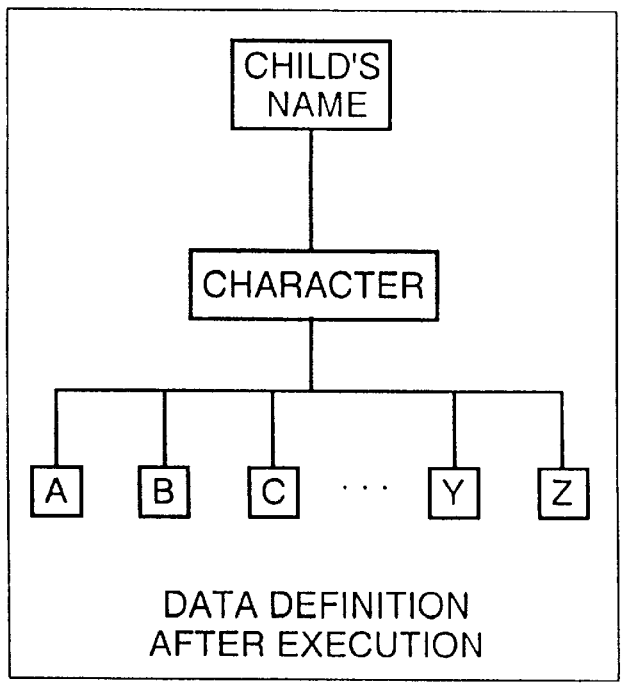
Figure 16D:
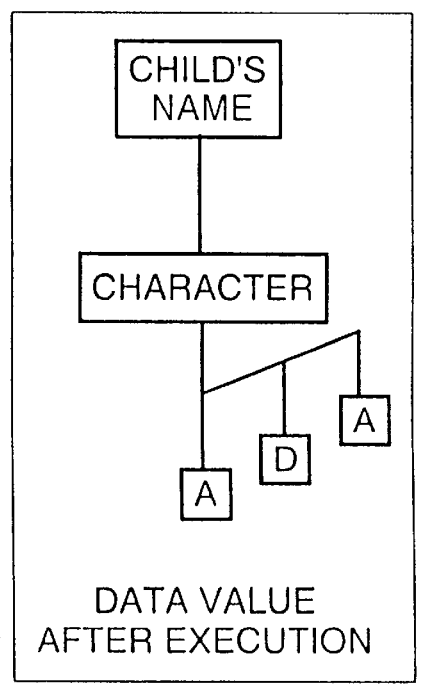

The structure in FIG. 16(d) shows the association of the three added data values by using a "third dimension" perspective. Discussion of a more-formal presentation of one-to-many relationships is given later.

Because of the fractal nature of the date structure, multiple occurrences of any data value can occur at any point in the structure. All are connected via the single icon, the database set connection.

2.4.5.2 Procedure Definition versus Procedure Value

It is also necessary to discuss the distinction between the definition of a procedure and the value of a procedure. All examples of procedure structures thus far have been examples of the definition of a procedure. As with data definitions, procedure definitions can have a value as well. The purpose of a procedure value is to mark the currently-executing Line in the procedure definition. The value of a procedure is analogous to a pointer which indicates which line of a subroutine is currently being executed. The procedure value exists only during execution of the procedure, and is not seen by the programmer. The procedure value is used internally by the system. Note, however, that a given procedure may have many values, i.e. the procedure may be "called" several times simultaneously in a multitasking environment. When the execution of a procedure is begun, a value is associated with that procedure. Associated with that value are all internal database connections which are required to control and monitor that execution. As each subordinate is invoked, this procedure value moves from the current procedure definition to the first subordinate of that procedure. Execution proceeds in hierarchical order until the value returns to the starting point; then the execution ceases and the value is deleted. Multiple executions of the same definitions can proceed simultaneously.

2.4.5.3 Directory Definition versus Directory Value

Since directories are executable, the value associated with them behave in the same manner as any procedure value.

In summary, the relationships among the main components of a fractal environment are as follows: Directories are made up of procedure structures, that is, executable Contexts; Contexts are composed of data and the procedure which acts on that data. Directories, procedure and data are composed of database set connections alone. The definitions and values of three components, data structures, procedure structures, and Directories, are constructed completely from database set connections alone. Taken together, these components can entirely define any data or procedure in a fractal environment.

3. Syntax of the Present Invention

This section includes a detailed explanation of the syntax used in the present invention.

3.1 General Syntax Overview

As described above, any data, procedure, or directory can be described as a fractal "shape" constructed of database set connections alone. Any portion of this fractal "shape" is called a Chart. A Chart is used to depict any data, process, or directory using only the single fractal "curve", the database set connection.

The environment of the present invention uses a graphic representation to show the presence of these database set connections rather than using a language-based representation. The graphic used to represent a database set connection is a near-vertical bar (called a Line) with comments enclosed in a rectangle (called a Box) at the base of the Line. Strictly speaking, the Box and the Line are part of a single unit; the Box serves only as a comment to the programmer as to the purpose of the Line. However, the relationships are easier to visualize and manipulate if the Box and Line are considered as independent units.

All Charts are constructed from the two elements, namely Boxes and Lines. Boxes are used to describe an element, while Lines show the connections between elements. Comments enclosed within the Box serve to document the purpose of each connection.

In summary, Boxes and Lines (i.e., the elements of a Chart) are interconnected to form Data, Procedure, and Directory Structures. The environment of the present invention serves as the operating system which uses these structures as replacements for traditional programs and files. A more detailed discussion of Boxes and Lines is given below.

3.1.1 Boxes

As stated above, one of the two elements of any Chart is the Box. Boxes exist only to hold programmer-defined comments. Boxes fall into three categories: Data Boxes, Procedural Boxes, and Directory Boxes. All three kinds of Boxes are identical; the differing types only refer to their differing application.

Every Box has a Name. The Name is some identifying pattern which differentiates this Box from all other Boxes in the environment. A Name can be text, numeric, binary, graphic, or any other identifying pattern.

In a programming environment, though, a few naming conventions can be established. The form of the Name in a Box can depend on whether it is a Data, Procedure, or Directory Box. Data Boxes usually contain a short noun phrase which exemplifies the data being represented. Procedural Boxes contain a short imperative phrase which describes the action being performed. Directory Boxes serve merely to provide meaningful names for the collection of Contexts and Directories which they represent. Some examples of Data Boxes are shown in FIG. 17. Examples of Procedural Boxes are shown in FIG. 18. Examples of Directory Boxes are shown in FIG. 19.

Note that there is no significant difference between a Data Box, a Procedure Box, or a Directory Box, except for the form of the Name which appears inside. Even this minor distinction is just a suggestion, not a requirement. The text in the Boxes does not need to follow any rules. The text is only a comment, not used by the system, for identifying a particular box to the programmer. It can contain any characters, symbols, graphics, Boxes, screen maps, video image, or whatever identifying patterns are desired. It may be a short, bland reminder, or an essay of infinite length. FIG. 20 shows two different styles of Box Names for data identifying a number.

Throughout this specification, when a Box Name appears in a paragraph of text, it is written within brackets to show that it is a Box Name. For example, the first Box in FIG. 20 is rendered as "[EMPNUM]", and the second one as "[The number of the employee who will be the first one monitored if a suspicious act is noticed.]".

Internal to the environment of the present invention, Box Names are not used. Instead, the environment assigns to every Box a unique internal name. Whenever a Box is accessed, the internal name is used exclusively. Only when a Box is being requested by its Box Name, as a human operator would do, is the Box Name used. Thus, the external Box Name can be changed at will; the internal name always remains the same.

A level of security can be achieved with a structure where all Box Names have been removed. Without the Box Names to guide the human, the effort required to make sense of a structure would be enormous. Other security features are described later.

Since the environment of the present invention does not require unique (or any) Box Names, duplicate Box Names can be used. A detailed explanation of the Box Name search rules will be given later.

3.1.2 Lines

The Lines are used to indicate the actual database set connections between Boxes. For Data Boxes and Directory Boxes, the Lines represent the association of the various components of a Data Structure. While this is true of Procedure Boxes as well, the Lines also determine the sequence of execution.

Lines always join two Boxes together. The Lines are drawn vertically, or nearly vertically, in the examples given herein. But horizontal or other connections between Boxes can be used as well. The orientation is not critical, but the implementation discussed herein assumes the use of near-vertical Lines.

Relative to a Line, a Box can be either an Owner Box or a Child Box. The difference between an Owner and a Child can be summarized as follows:

The Box at the top of a Line is referred to as the Owner of the Box at the bottom of that Line.

The Box at the bottom of a Line is referred to as the Child of the Box at the top of the Line.

When an Owner Box is joined to a Child Box with a Line, the Owner is "associated" with the Child. An Owner Box can associate with any number of Child Boxes. A Child Box can be owned by any number of Owner Boxes. A Box can be its own Owner Box, and, as such, one of its own Child Boxes as well. Recursive structures are readily implemented with fractal notation.

The use of Lines to connect Boxes in a fractal environment can be contrasted with some concepts from a traditional environment. The relationship between two Boxes joined by a Line can be described in one of three ways:

The relationship between a Data Box and its Child Boxes can be envisioned as being identical to the relationship between a record and its fields.

The relationship between a Procedure Box and its Child Boxes can be envisioned as being identical to the relationship between a calling program and its subroutine.

The relationship between a Directory Box and its Child Boxes can be envisioned as being identical to the relationship between a hierarchical directory and its subdirectory or the directory's contents.

When the sequence of Boxes in a Chart is significant, the Lines of a Chart are traversed in hierarchical sequence, that is, top to bottom, left to right.

3.2 Data Charting Notations

Having defined the two elements of a Chart, structures can be defined which use these Elements. The following discussion describes the method of joining Boxes and Lines to form Data Charts, also referred to as Data Structures.

From a theoretical point of view, there is only one kind of Line: the database set connection. However, in order to bring visual clarity to the purpose and usage of Lines in a Data Structure, the formal syntax of the present invention includes three different presentations of Lines. These three kinds of Lines are called Synchronous Lines, Asynchronous Lines, and Enumeration Lines. Their purpose and usage are described in the following sections.

3.2.1 Synchronous Lines

Figure 21:
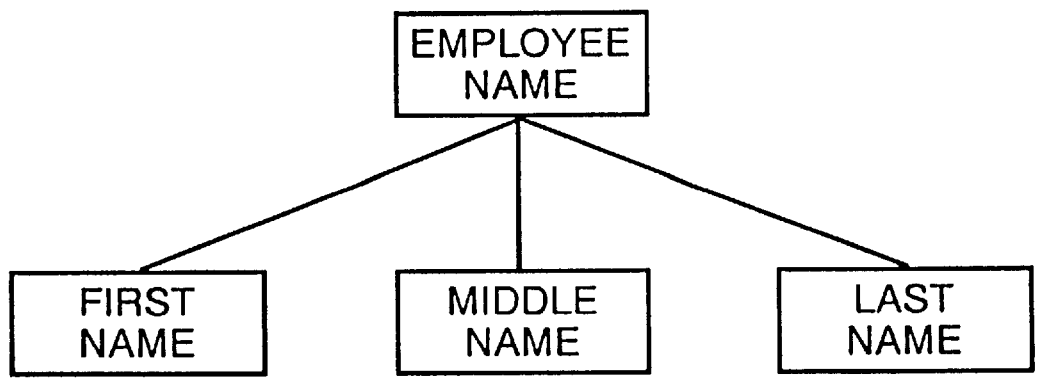
FIG. 21 is a diagram showing an example of a Synchronous Line.

The first kind of Data Line is a Synchronous Line. This Line is used to denote a direct one-to-one relationship between an Owner Data Box and its Child. FIG. 21 shows an example of a Synchronous Line.

The example states that an [Employee Name] consists of three parts: one [First Name], one [Middle Name], and one [Last Name]. It does not state what a [First Name], [Middle Name], or [Last Name] might be; since they have no Child Boxes, those Boxes are undefined (i.e., their Child Box is the Null Box).

3.2.2 Asynchronous Lines

Figure 22:
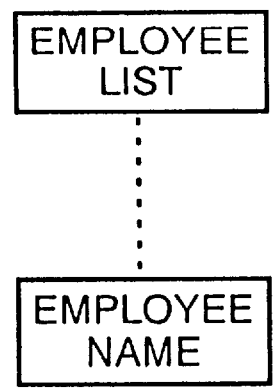
FIG. 22 is a diagram showing an example of an Asynchronous Line.

The second possible representation of a Line is called an Asynchronous Line. This Line is used to denote a traditional database set connection, an array, or any one-to-many relationship. The syntax consists of a dashed line rather than the solid line used for the Synchronous Line. A sample of an Asynchronous Line is given in FIG. 22. An Asynchronous Line can be viewed as a set of many Lines, each connected to a separate box, such that the Boxes are in a particular order.

This example shows that an [Employee List] consists of zero or more [Employee Name]s. If a solid, Synchronous Line was used instead, FIG. 22 would then show that an [Employee List] contains only one [Employee Name]. Note that no size is specified; the list of [Employee Name]s is potentially infinite in length. Thus, one can view the box [Employee Name] as a set of many Boxes, arranged in a particular order, and each connected to [Employee List], its Owner Box.

3.2.3 Enumerations

Figure 23:
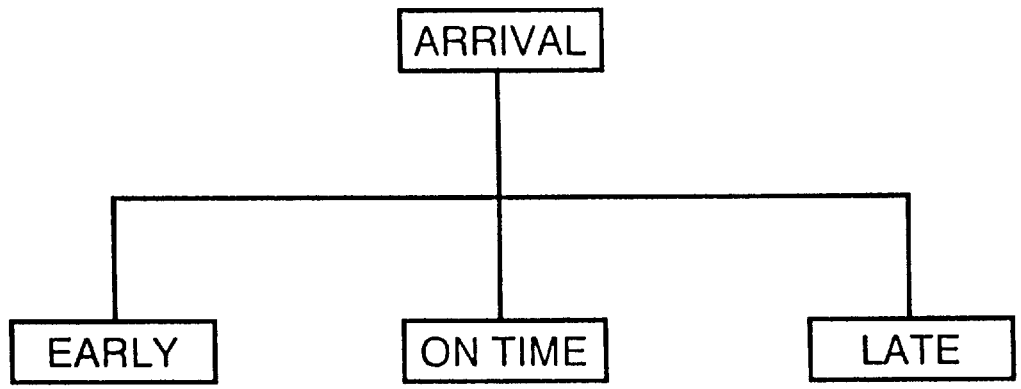
FIG. 23 is a diagram showing an example of an Enumerative Line.

The third type of Line is the Enumeration Line. This Line is used to show where a choice of values for a Data Box exists. For example, FIG. 23 shows the various values available for [Arrival].

This example shows that there are three types of [Arrival]: either [Early], [On Time], or [Late].

The Enumerative Line indicates the bottom level of a Data Structure. For Data Structures, they always (and only) associate the lowest-level Child Data Boxes (called Enumerants) with their Owner Boxes (called an Enumeration). The connections define the only possible non-null Data Values which can be assigned to the Enumeration. For example, if a Data Value is to be assigned to [Arrival], that Value must be one of the three defined Enumerants or remain undefined.

3.3 Procedure Charting Notations

The above discussion presented Boxes and Lines as components of Data Structures. The following discussion presents Boxes and Lines as components of Procedure Structures. As with Data Structures, some alterations in the Chart format have been introduced for the sake of visual clarity. There are four kinds of Procedural notations: Synchronous Lines, Asynchronous Lines, Iteration, and Enumeration selection.

3.3.1 Synchronous Lines

The first kind of Procedure notation is the Synchronous Line. This Line denotes a direct, synchronous transfer of execution control to a Procedure Box (the Child Box) from another Procedure Box (the Owner Box). The syntax for this kind of Line is a solid line between the two Boxes. The Owner Procedure Box invokes the Child Procedure Box below it; when the Child has completed executing, control is returned to the Owner Box. The relationship between an Owner Box and its Child Box is identical to the relationship between a calling program and its subroutine.

Figure 24:
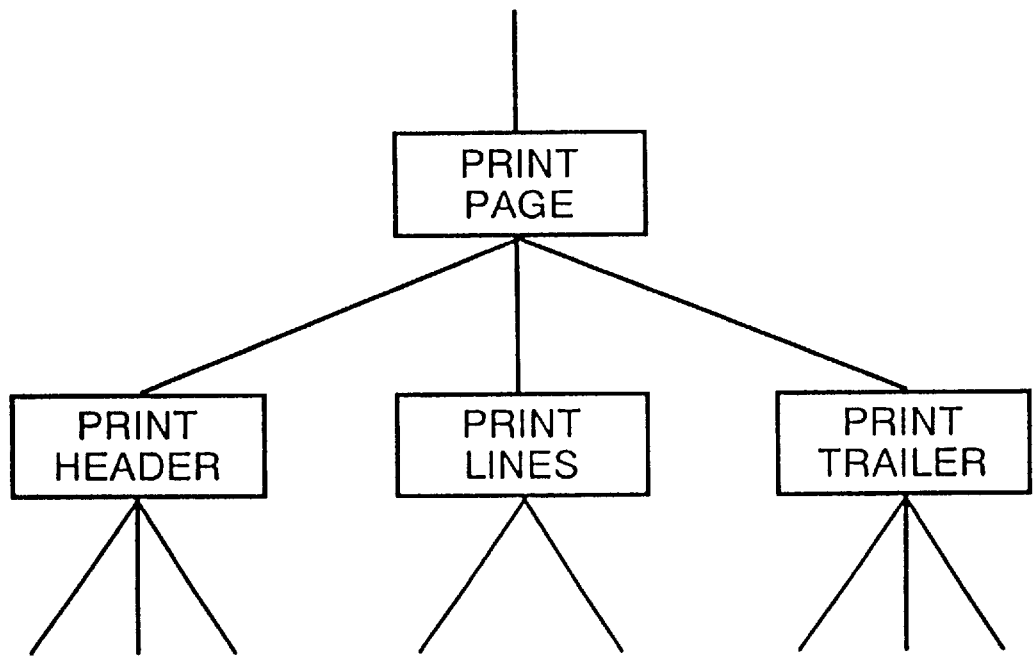
FIG. 24 is a diagram showing sample Synchronous Procedure Lines.

An example of the usage of the Synchronous Line from a procedural point of view is shown in FIG. 24.

The sample procedure structure shows that [Print Page] consists of three subroutines: [Print Header], [Print Lines], and [Print Trailer]. The execution of [Print Page] involves the execution of [Print Header] first, then [Print Lines] next, and finally [Print Trailer]. Note that each of these three subroutines also have their own Child Boxes (not shown) which are executed as a part of performing their respective functions.

3.3.2 Asynchronous Lines

The second kind of Procedure notation is called the Asynchronous Line. This Line is used to denote the asynchronous invocation of a Child Box, that is, the Child Box is invoked as an independent task which does not return control to the Owner Box. Conversely, the Owner does not wait for the Child to return control, but rather, the Owner continues execution as if the Child had already returned control.

Figure 25:
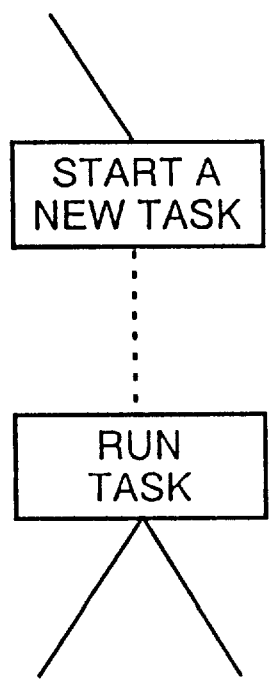
FIG. 25 is a diagram showing a sample Asynchronous Procedure Line.

An example of an Asynchronous Line is given in FIG. 25. In this example, [Start a New Task] initiates the execution of [Run Task], then returns control to the Box which called [Start a New Task]. The Procedure named [Run Task] continues executing independently of the initiating Procedure.

The only difference between the Synchronous and the Asynchronous Lines is that with the Synchronous Line, the Owner Box waits for the Child Box to return control; with the Asynchronous Lines, the Owner Box continues execution immediately without waiting for the Child Box to return control.

Despite the difference in appearance and function from the Synchronous Line, there is still only one type of database set connection at work. Internally, the Asynchronous Line is not represented differently from a Synchronous Line; instead it is a translation of a Procedure Structure. This translation is described in more detail later.

3.3.3 Enumerations

The third kind of Procedure notation is the Enumeration Line. This Line is used to allow selection of an individual Procedure Box from many choices. The criterion for this selection is based on the Value of a Data Box. For example, if a Procedure Box picks an action based on a worker's arrival status, the Chart would appear as shown in FIG. 26.

Note that the notation "Arrival" along one of the lines matches the Data Enumeration Box named [Arrival] in the Data Structure in FIG. 23, while the notations "Early", "On Time", and "Late" match the names of the Enumerants of [Arrival].

Figure 26:
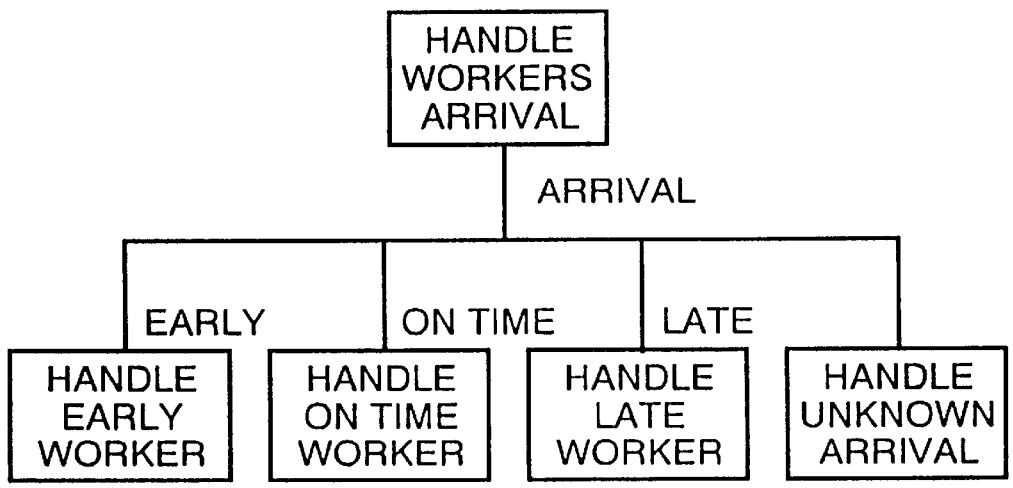
FIG. 26 is a diagram showing sample Enumerative Procedure Lines.

When the Chart in FIG. 26 is executed, the determination of which Child Box to execute depends on the current Value associated with [Arrival]. If no Value is associated with [Arrival], or if the Value associated with [Arrival] is undefined or anything other than [Early], [On Time], or [Late], then the unlabeled Child Box [Handle Unknown Arrival] is invoked.

Despite the difference in appearance and function between an Enumeration Line and a Synchronous Line, there is still only one type of database set connection at work. Internally, the Enumeration Line is not represented differently from a Synchronous Line, rather it is a translation of a Procedure Structure. This structure is discussed in more detail later.

3.3.4 Iteration

Figure 27:
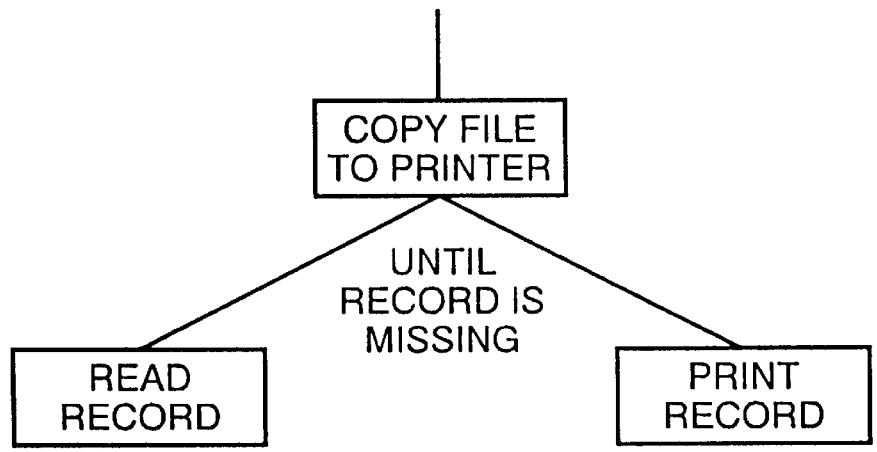
FIG. 27 is a diagram illustrating the syntax for a sample iterative procedure.

The fourth kind of Procedural notation is called Iteration. Iteration allows an Owner Box to invoke repeatedly its Child Boxes. The syntax for Iteration includes notation providing a condition for termination. For example, a file-printing Procedure Structure might appear as shown in FIG. 27.

Note that the position of the Iteration notation is critical. The evaluation of the condition occurs at the point where the notation is located. In this example, the condition is evaluated after [Read Record], but before [Print Record]. Thus, [Print Record] is not invoked if a [Missing] [Record] is returned by [Read Record]. Here, it is assumed that [Record] and [Missing] are Data Boxes which have been defined elsewhere. Note also that, in the termination condition "Until Record Is Missing", the terms "Record" and "Missing" will be interpreted by the system to indicate previously defined Data Structures having these names.

Despite the difference in appearance and function between an Iteration and a Synchronous Line or an Enumeration, there is still only one type of database set connection at work. Internally, Iteration is not represented differently from any other Procedure Structure; instead, it represents the translation of a Procedure Structure. This structure is discussed in more detail later.

3.4 Context Charting Notation

Having defined Data and Procedure Charts and their composition, the integration of data with procedure is the next step. The following paragraphs present the syntax for the Context, the named integration of Data and Procedure Structures.

Data Charts and Procedure Charts are not independent entities in the environment of the present invention. Instead, they are tightly bound into a single unit which is referred to as a Context. A Context is an executable structure which is similar to a subroutine in many ways. For example:

a Context can be called from other Contexts, possibly returning control to the calling Context after completion;

a Context contains local data which cannot be directly accessed from outside that Context;

argument passing is supported between the calling and the called Context in much the same manner as subroutine arguments;

a Context has a name, just as a subroutine would; this name appears in the top Procedure Box of the Context.

Briefly stated, a Context consists of those Procedure Structures which service the Data Structures contained within the Context. A Context is the "Keeper of the Data" in that no Context can access the data which is contained within another Context. All interaction between Contexts is channeled through a rigidly defined interface which passes arguments into or out from a Context.

The following sections describe the use of Contexts in the environment. Specifically, they cover the naming of Contexts, the passing of arguments into and out from a Context, and the checking of the data types of any Context arguments.

3.4.1 Context Names

Every Context has a Context name. A Context name does more than merely identify the Context; the name also identifies the Context's Arguments. All data is passed into and out from a Context by means of Argument Boxes. Argument Boxes are entered directly into the Context Box Name, just as any other character in the Name. Some examples of Context Box Names are shown in FIG. 28.

Figure 28:
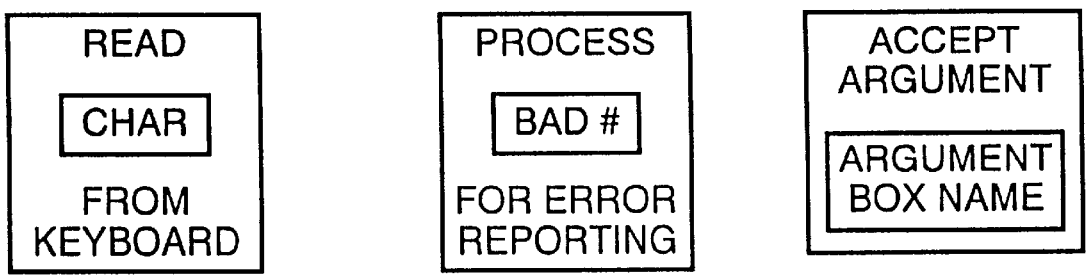
FIG. 28 shows several sample Context Box names.

FIG. 28 shows three sample Context Boxes. The first one represents a subroutine which returns a character stored in [Char]. The second uses [Bad #] as an input for error reporting. The third Context accepts an argument whose Value becomes associated with [Argument Box Name].

The examples in FIG. 28 present the form of a Context Box Name. However, the presentation of a Context Box Name can vary slightly depending on the point of view.

There are two ways of viewing any Context. One way is from the calling side; the other, from the called side.

Figure 29:
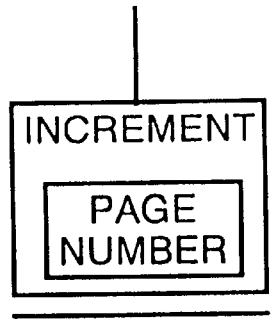
FIG. 29 shows a sample Context Name from the calling side.
Figure 31:
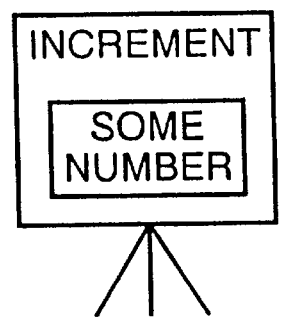
FIG. 31 shows a sample Context name, from the called side.

FIG. 29 shows the calling side of a Context which increments a page number, while FIG. 31 shows the called side of the same Context.

Figure 30:
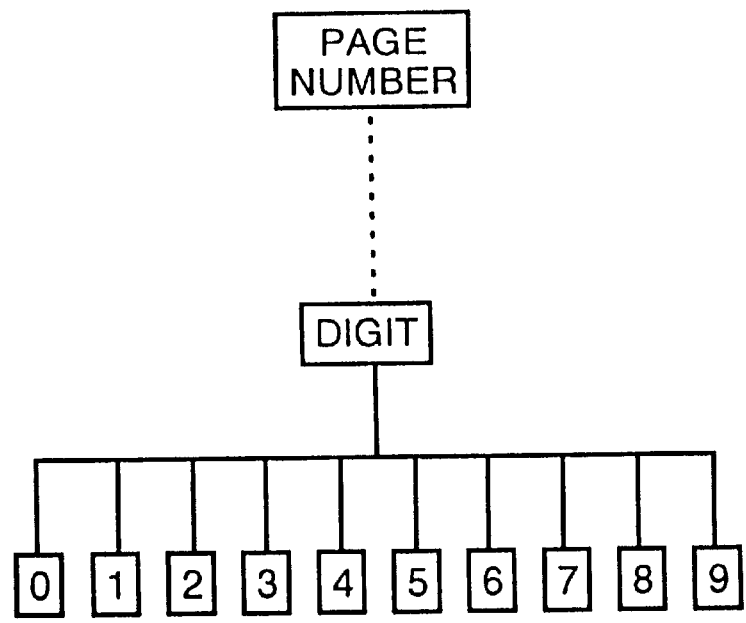
FIG. 30 is a diagram showing a sample Context Argument Data Type.

In the example shown in FIG. 29, the Box named [Page Number] is the Argument Box of the Context, indicating the data value to be incremented. As with all of the calling Context's data, it must be defined as a part of the Data Structure of the calling Context. The Data Structure for [Page Number] is shown in FIG. 30.

Remember that there is a difference in the presentation of the Context name which depends on the point of view. FIG. 29 showed the Context Name from the calling point of view. From the called Context's point of view, the Context Box Name appears as shown in FIG. 31.

Beneath this Context Box are the individual Boxes which actually perform the increment. Note that the name given to the Argument Box within the Context need not be the same as the name supplied by the caller. It must, however, be of the same data type which, in this case, would be the data type that consists of many Digits. More information relating to data types will be given below.

3.4.2 Context Arguments

The Argument Boxes can be used to pass data Values into a Context or return values out from a Context. Many Argument Boxes (either Data, Procedure, or Directory Boxes) can appear within the name of a Context. A Context with multiple Argument Boxes would appear as shown in the example in FIG. 32.

Figure 33A:
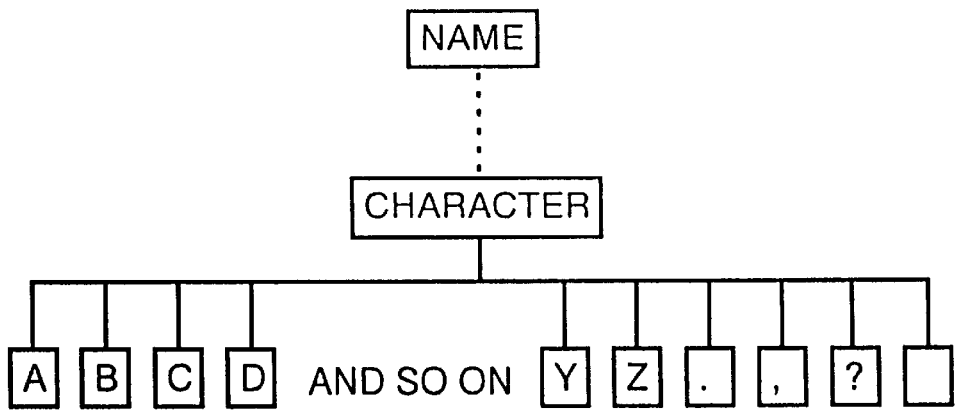
FIG. 33 is a Chart showing the data structure for the sample Context of FIG. 32.
Figure 33B:
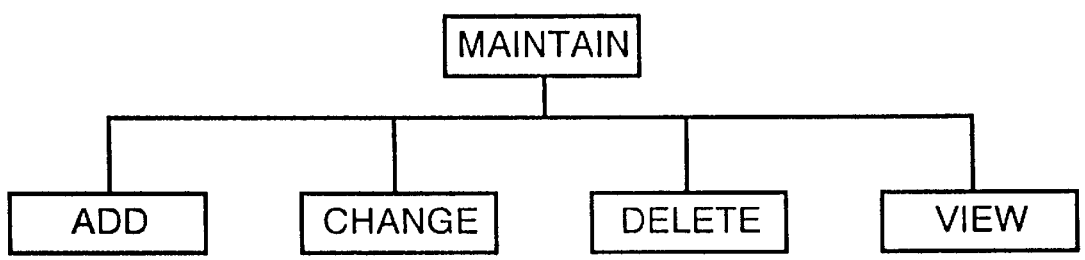

The two Argument Boxes, [Maintain] and [Name], must be defined as a part of the Context's Data Structure. The Data Charts for the Boxes [Maintain] and [Name] are given in FIG. 33.

Having defined the Context and its Argument Boxes, it becomes possible to view the Context from the calling side. Suppose another Context wishes to add a new name to the list. Assuming that the calling Context has defined [A New Name] as being composed of many [Character]s (i.e., of the same data type). Then the calling Procedure Structure could contain the Box shown in FIG. 34.

Figure 34:
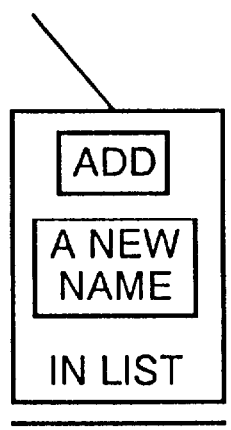
FIG. 34 is a Chart illustrating the calling of a Context.

The Values associated with the Argument Boxes listed in the Context name are transferred into the Context; the called Context processes the request while the calling Context waits for completion of the [Add] request. Note that the [Add] request of FIG. 34 is the same [Add] which appears in the Data Chart for [Maintain], shown in FIG. 33.

Many Contexts can invoke the same Context. Since the environment of the present invention is a multitasking environment, provisions are made for simultaneous access. Should a Context be busy processing a prior request, the next request is queued onto the Context to wait until the Context is available to process the queued request.

It is the responsibility of the called Context to decide whether to preserve any data from one invocation to the next, or to delete all data after each completion of its function.

Figure 32:
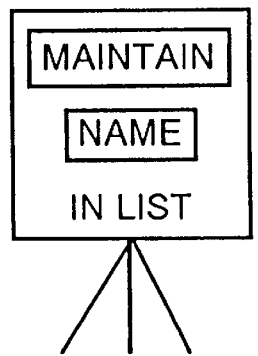
FIG. 32 shows another sample Context.

As with all other Box Names within this document, whenever a Context Box Name is used in a sentence, brackets are used to denote both the Context Name and the Argument Boxes. For example, the Context Box in FIG. 32 is written as "[[Maintain] [Name] In List]". It is possible to adopt other notations, within the scope of the invention.

3.4.3 Context Argument Data Types

Data types are rigorously enforced across the Context interface. The data type of a Box is defined as the arrangement and names of the Boxes which are subordinate to that Box. The data types of the Argument Boxes in the calling Context must match the data types of the Argument Boxes in the called Context.

To determine if two Boxes have the same data types, apply the following tests:

1. Two Boxes are the same type if one of the Boxes is the sole Child Box of the other via a Synchronous Line.
2. An Enumeration and its Enumerants are always the same data type.
3. Two Boxes are the same type if they are both the same type as some third Box, that is, the transitivity rule of equality applies.

These rules are simple in practice. As examples, FIG. 35 shows two similar Data Structures.

Figure 35:
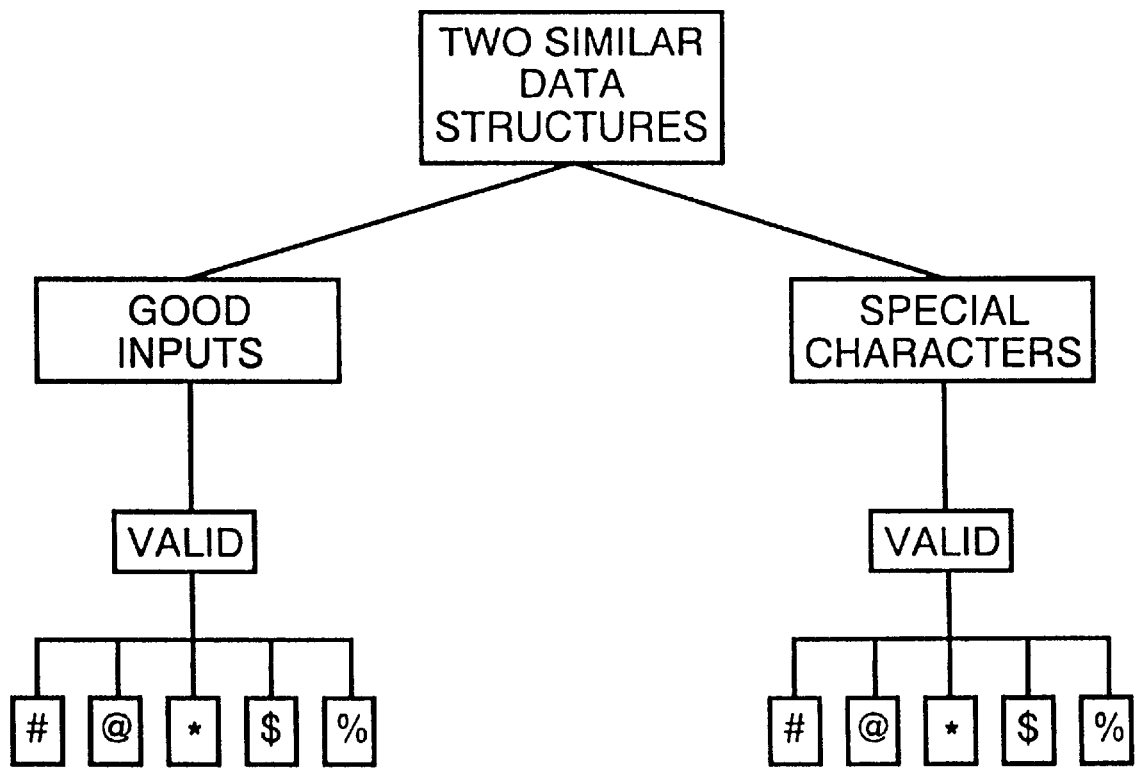
FIG. 35 is a Chart showing two similar data structures.

In FIG. 35, each of the data type rules is exemplified. For example:

by rule #1, [Valid] is the same data type as [Good Inputs] because one is the sole Child Box of the other via Synchronous Line;

by rule #2, [Valid] and [#] are the same data type; so are [@], [*], [$], and [%], as well;

by rule #3, [Good Inputs] and [Valid] are both the same data type; [Special Characters] and [Valid] are both the same data type; by extension, [Good Inputs] and [Special Characters] are the same data types, too;

by any rule, [Two Similar Data Structures] is not the same data type as any other Box in the example.

According to the data type rules, the data types of an Owner Box and a Child Box are the same if the Child Box is the only Child of the Owner and if they are connected by a Synchronous Line. If an infinite number of Boxes were created, each as the sole Child Box of the preceding Child Box, all of these Boxes would all be the same data type.

One major benefit of the fractal definition of data types is that a given Data Box can participate in several different Enumerations at the same time. For example, note that all of the Enumerants of [Valid] also happen to be Enumerants of [Character] (from an earlier example). While this does not mean that [Valid] is the same data type as [Character], it does mean that [#] of [Good Inputs] has the same data type as [#] of [Special Characters].

In summary, whenever a Context Box is referenced, the data type of the Argument Box which is supplied in the interface must match the data type which was defined for the Argument Box in the top Box of the Context.

3.5 Directory Charting Notation

With the definition of the syntax for Contexts complete, the next step is to define a mechanism to interconnect Contexts. In the environment of the present invention, Directory Boxes are used to group related Context Boxes together for any reason.

Figure 36:
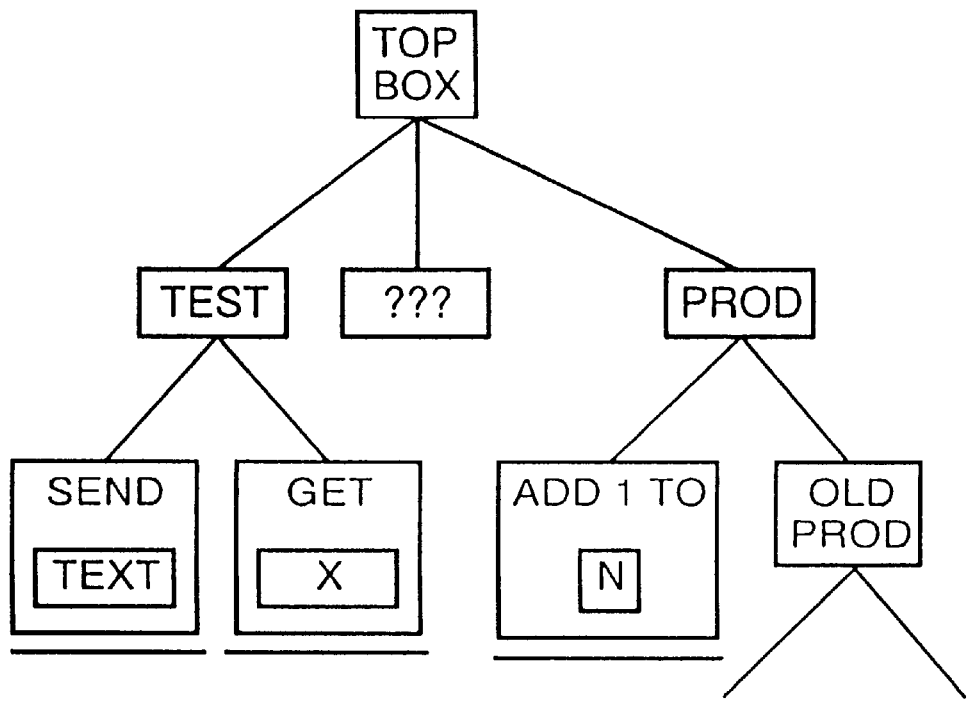
FIG. 36 is a Chart showing sample Directory Boxes with associated Contexts.

An example of the usage of Directory Boxes is given in FIG. 36. This example shows that under the top Directory Box [Top Box] there are three subdirectories: [Test], [???], and [Prod]. Under the Directory Box named [Test], there are two Context Boxes: [Send [Text]] and [Get [X]]. Under the Directory Box [???], there are no Context or Directory Boxes. Under the Directory Box [Prod], there are two members: a Context Box [Add 1 to [N]] and a Directory Box [Old Prod]. The Directory Box named [Old Prod] also contains subdirectories or Contexts which are not shown in the example.

The Directory Boxes form the highest level of the hierarchy of all Boxes. For example, tracing upward through any hierarchy of Data or Procedure Boxes leads first to a Context Box, then to the Directory Box which holds that Context.

Tracing upward further through all Directory Boxes, the ultimate goal is reached: [Top Box]. This Box is the root Directory Box, the single Box to which all other Boxes are connected.

One handy feature of Directory Boxes is that they can be executed, just as any Procedure Structure, because [Top Box] is actually a Context Box without any Argument Boxes. Thus, Directories can serve as a command language. Should a Directory Box be executed, the effective result would be to execute each of the Directory's Child Contexts. This is useful as a programming technique when starting the execution of a group of standalone Contexts or with a series of often-repeated Contexts.

3.6. Pre-defined Boxes

In order to provide full programming capabilities within the environment of the present invention, some Data Boxes, Directory Boxes, and Contexts are pre-defined. These Pre-defined Boxes form the base on which the entire environment is built. There are three kinds of pre-defined Boxes: Pre-defined Data Boxes, Pre-defined Procedure Boxes, and Pre-defined Directory Boxes.

3.6.1 Pre-defined Data Boxes

There are only two types of pre-defined Data Boxes: the Null Box, named [ ], and Device-specific Boxes. All other Data Boxes are built from these.

3.6.1.1 The Null Box

One of the Pre-defined Boxes is the Null Box. The Null Box is not actually a Box at all, but rather, it represents the absence of a Box.

The Null Box can be employed in several ways. Replacing a Box with a Null Box is equivalent to deleting that Box. The Null Box is returned after a Locate Next as an end-of-set condition. It is also returned for every Locate command that fails to locate data. Being no Box at all, the Null Box has no data type at all. Being typeless, it can be used to match any type at all. The Null Box does not have any Child Boxes. It is automatically included as the first Enumerant of any Enumeration to represent the "undefined" Value for the Enumeration.

Figure 37A:
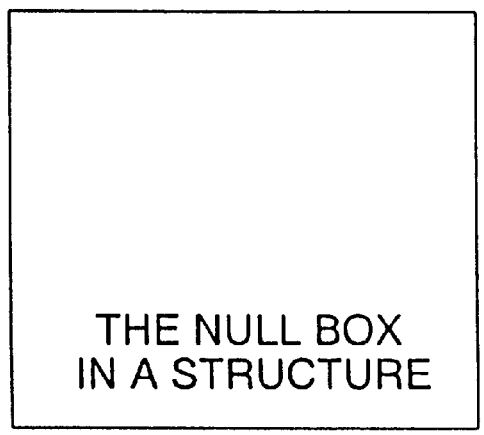
FIG. 37 is a diagram of the Null Box, in two possible scenarios.
Figure 37B:
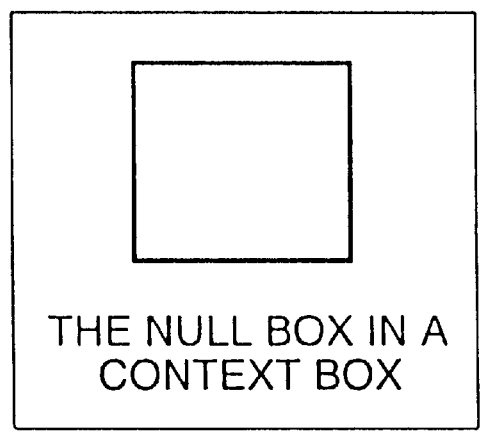

The Null Box is represented in one of two ways. When used as a part of any Structure, the Null Box and the Line above it are not drawn. When used as an Argument Box in a Context Box, it appears as an empty Box. The appearance of the Null Box is shown in FIG. 37.

Note that as a Child Box in a Data, Procedure, or Directory Structure, the Null Box is not displayed. Within a Context Box, however, the Null Box is displayed as an empty Box to indicate that no Box is being passed as an Argument Box.

3.6.1.2 Device-Specific Data Boxes

No Pre-defined Data Boxes exist in the environment of the present invention except the Null Box, [ ]. However, when any external devices are integrated into that environment, the new device implies the existence of certain Data Boxes associated with that device. For example, integrating a keyboard into the environment implies the integration of the set of keyboard characters as Data Boxes.

New Pre-defined Data Boxes must be introduced whenever an external device, such as a terminal or tape drive, is connected to the environment of the present invention. For example, the letter "A" cannot exist in a Data Structure until some device is connected which can supply some A's. Also, non-textual devices such as a video camera can be integrated; the Pre-defined Data Boxes associated with the camera would contain video pictures rather than pictures of text characters.

In the example of adding a keyboard device, the Data Boxes specific to that device consist of one Box for the letter "A", one for the letter "B", and so on, with one Box for each possible value which can be entered via keyboard. This implies that in order to perform any meaningful work within a fractal environment, some external device must exist or else no data is possible. Thus, the scope of the data acquired from all external devices determines the theoretical scope of what can be processed as data. The environment of the present invention is only limited by the capabilities of its peripheral devices.

3.6.2. Pre-defined Procedure Boxes

There are eight Pre-defined Procedure Boxes. Of these eight Contexts, three are used to manipulate the database, and five are used for procedure control. These pre-defined Procedure Boxes are: Locate, Precede, and Delete (for database manipulation), and Invoke, Iteration, Enumeration, Accept Argument, and Return Argument (for procedure control). Note that some of these Pre-defined Procedures correspond directly to the database control commands discussed above. That is, these Pre-defined Procedures implement the control commands discussed earlier.

3.6.2.1 Locate

The Locate Context is used to establish position within the database. There are two forms of the Locate Context: one for keyed access and one for positional access. The two forms of the Locate Context Box are shown in FIG. 38.

The first form of the Context has two Argument Boxes. The first Argument Box, [Which], specifies which occurrence is to be Located, either [First], [Last], [Next], or [Prior]. Its use in the second form ensures that all Data Boxes with identical key values can be accessed. The Data Chart for [Which] appears in FIG. 39. The values in FIG. 39 are pre-defined; the programmer inserts a value for [Which] as desired.

Both forms of the Locate Context have a second Argument Box. This Box specifies the Data Structure whose Value is to be Located. Since the Null Box defines this Argument Box, any data type can be used here. Once Located, the entire Data Structure, from the next-highest Asynchronous Line on down, becomes the current Value. The current Value is the value on which the system is currently operating. In other words, when the system Locates a name, all Data Boxes associated with that name become "current".

An example of the usage of the Locate Context is shown in FIG. 40. It is based on the Data Structure shown on the right-hand side of FIG. 41, which is a list containing many [Name]s. The example shown in FIG. 40 finds the first [Name] in the [Name List].

The second form of the Locate Context has a third Argument Box. This Box is used to specify a key value, that is, it pinpoints the occurrence which is to be Located and made the current Value. Since the Null Box is used to define this Argument Box, any data types can be used here. However, it must match the data type of the second Argument to prevent ambiguity.

If the Locate succeeds, the first Value for [Name] in the [Name List] is made ready for access. If it fails, the Null Box is the Value for [Name].

As an example of the second form of the Locate Context, Locate the [Name] in the [Name List] which corresponds to [Some Name]. The calling Context and the associated Data Structures would appear as shown in FIG. 41.

Figure 41A:
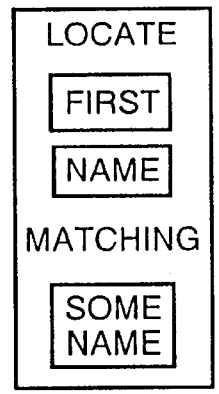
FIG. 41 is a diagram showing the usage of the Locate Context to find the first value which matches a predetermined value, and includes data definitions.
Figure 41B:
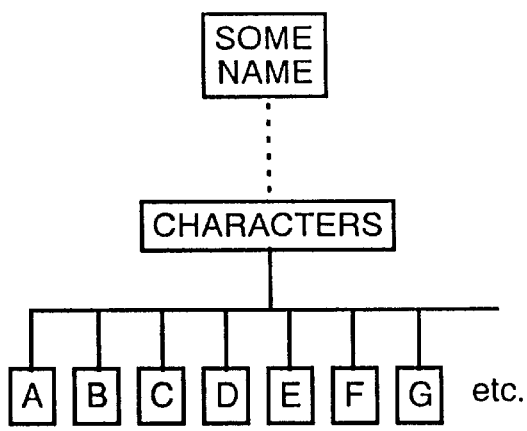
Figure 41C:
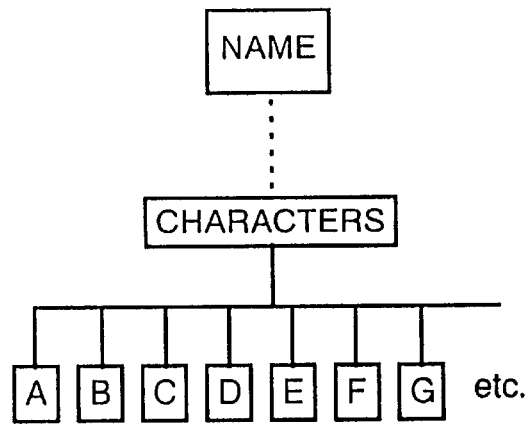

The example in FIG. 41 requests that the value of [Name] in the [Name List] which corresponds to [Some Name] be made the current value. If the Locate fails, no occurrence is made current; the current value of [Name] becomes undefined, that is, the Null Box [ ]. FIG. 41 includes the data definitions for [Some Name] and [Name List].

3.6.2.2 Precede

Figure 42:
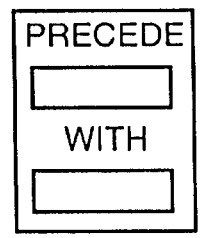
FIG. 42 is a diagram showing the form of the pre-defined Precede Context.

The Pre-defined Precede Context is used to add Values to a Data Structure. The format of the Precede Context is shown in FIG. 42.

Two Argument Boxes are needed to use this Context. The first Argument Box specifies the Data Structure which is to receive a new Value. This Box need not appear below an Asynchronous Line.

The second Argument Box indicates the Value which is to be added. It must match the data type of the first Argument Box.

When invoked, this Context adds the Value of the Data Box indicated by the second Argument as a new member of the Data Structure indicated in the first Argument. The new Value is added prior to the currently-Located value. Before executing this Context, the current position in the Data Structure must be established using the [Locate [Which] [ ]] Context. If no occurrence is current, that is, if the Null Box is current, then the new member is added as the last occurrence. After the new data are added, the previously-Located value remains current.

No status is returned by this Context; it always executes successfully.

3.6.2.3 Delete

Figure 43:
FIG. 43 is a diagram showing the form of the pre-defined Delete Context.

The third Pre-defined Context which is used for database control is the Delete Context. This Context is used to remove values from the database. Before it can be used, the position in the Data Structure must first be determined by using the Locate Context. The form of the Delete Context is shown in FIG. 43.

Only one Argument Box is needed to use this Context. It specifies the Data Structure whose value is to be Deleted. The Box named as the Argument can appear anywhere in a Data Structure.

When invoked, this Context removes the Located Value from the Structure indicated in the Argument Box. If no occurrence is currently Located, no action occurs. After invoking this Context, no Value remains current.

No status is returned by this Context; it always executes successfully.

3.6.2.4 Iteration

The fourth of the six Pre-defined Procedure Boxes is the Iteration Context Box. This Context controls the repeated execution of other Procedure Boxes.

Although the Charting technique for Iteration may not obviously reflect it, the internal representation for Iteration is structured as a Context. When this Box is used in a Chart, the Context Box is not displayed; instead, the Iteration notation is displayed (Cf. Section 3.3.4, Iteration).

Figure 44:
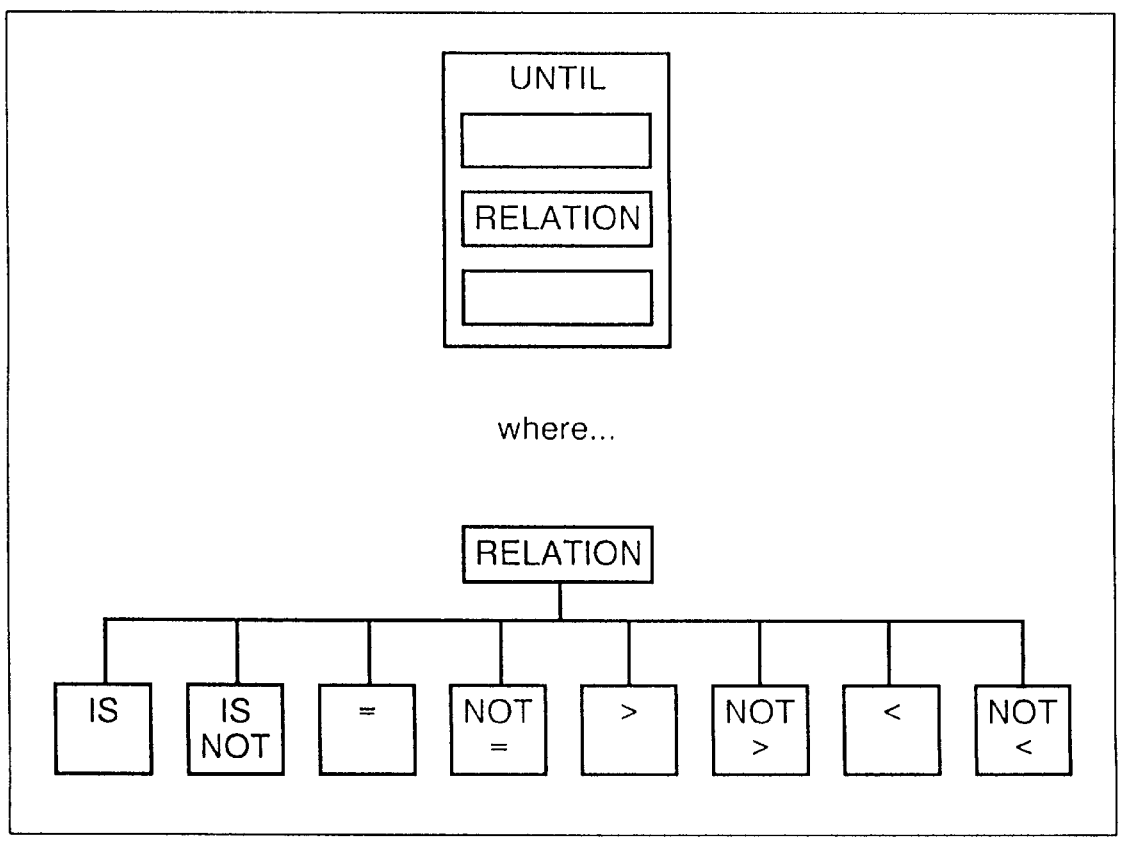
FIG. 44 illustrates the pre-defined Iteration Context, using the format of a Context Box.

The Context Box format for Iteration is shown in FIG. 44.

When invoked, the Iteration Context uses the supplied [Relation] to compare the Values associated with each supplied Argument Box. If the result of the comparison is true, then the Owner Box execution is immediately aborted; execution of the Procedure continues with the next Child Box of the Owner of the Owner of this Context. If the result of the comparison is false, execution continues normally with the next Child Box of the Owner of the Iteration Context.

Figure 45:
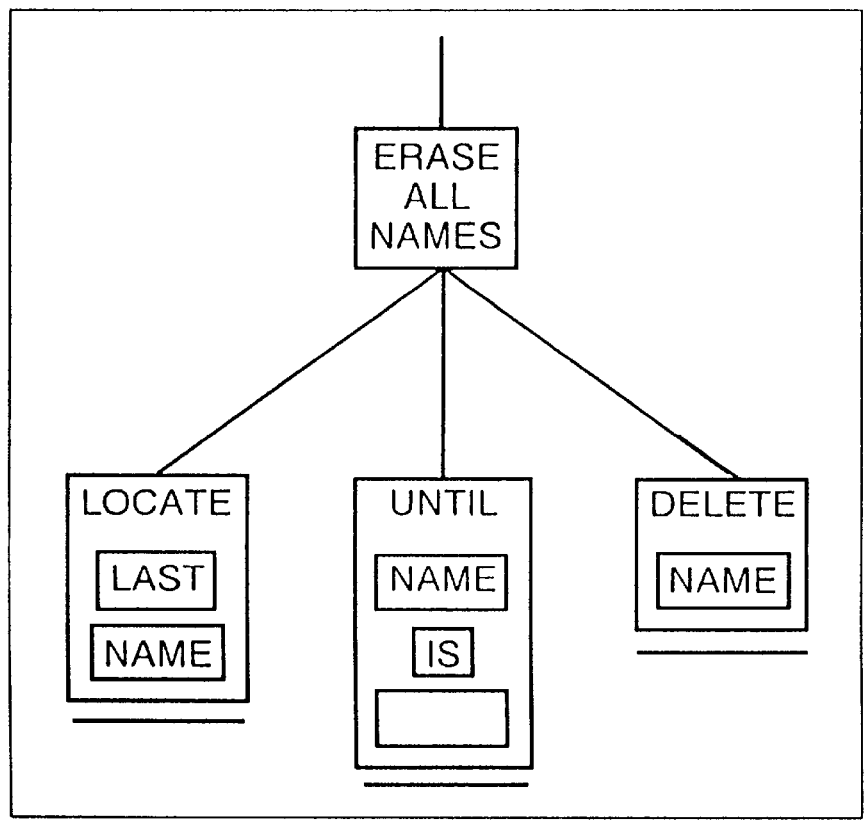
FIG. 45 is a sample Procedure Chart using the Iteration Context.

As an example of how the Iteration Context operates, FIG. 45 shows a program which deletes all names in the list of names from FIG. 32.

Figure 46:
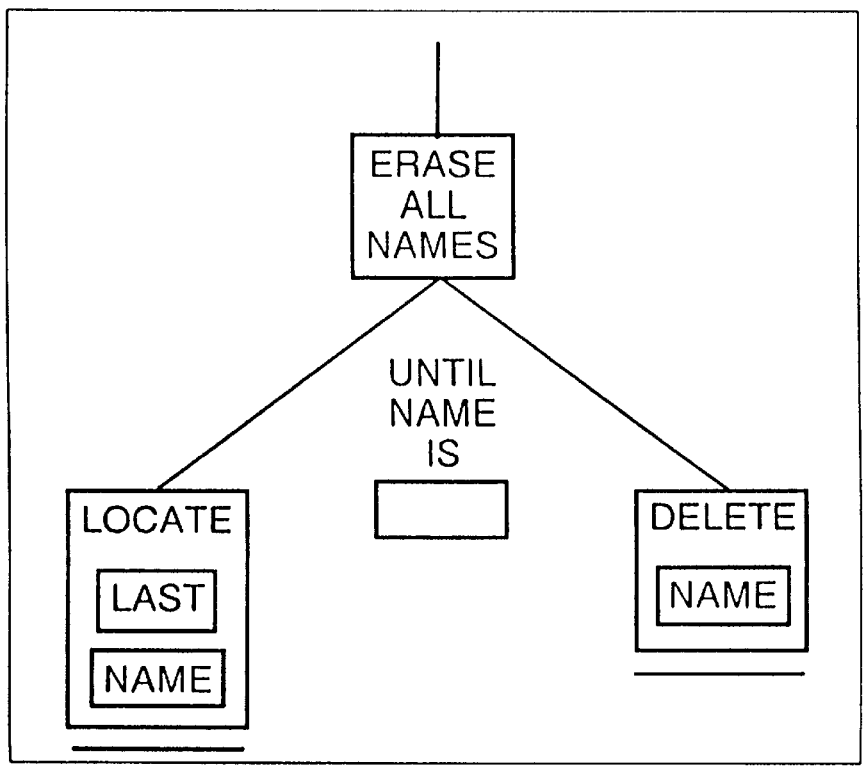
FIG. 46 is a sample Chart, similar to FIG. 45, but using the normal Iteration syntax.

The Chart in FIG. 46 re-draws the Chart in FIG. 45, using the standard Iteration notation.

Both FIGS. 45 and 46 reflect the same Structure; the first is the actual internal representation while the second is the displayed representation.

In the sample Structure [Erase All Names], the two Child Boxes are executed repeatedly until the condition [Until [Name] [Is] [ ]] evaluates as true; when it does, the Owner Box of the Iteration Context (i.e., [Erase All Names]) is immediately aborted and control returns to the Owner of [Erase All Names] (not pictured in the examples).

There are eight possible Enumerants which can be used as a [Relation]. Those Enumerants and their meanings are presented in the following table.

| [Relation] | Comparison result |
|---|---|
| [=] | True when the Values associated with the two Argument Boxes correspond Value for Value at all levels, that is, one Structure is a duplicate of the other |
| [Not =] | True when the Values associated with the two Argument Boxes do not correspond Value for Value at all levels |
| [Is] | More precise than [=], the comparison is true only when the Argument Boxes are both associated with the exact same Value, not merely a duplicate of the Value |
| [Is Not] | True when the value associated with the first Argument Box is not the same Value associated with the second |
| [>] | True when the number of Values associated with the first Argument Box exceeds the number of Values associated with the second Argument Box. If the numbers of Values are the same, then the comparison is based on the relative position of the Enumerants in the Enumeration. For example, if the Values are numbers, they would be compared according to numerical values. The Values need not be numbers, however. |
| [Not >] | True when the number of Values associated with the first Argument Box does not exceed the number of Values associated with the second Argument Box |
| [<] | True when the number of Values associated with the second Argument Box exceeds the number of Values associated with the first Argument Box |
| [Not <] | True when the number of Values associated with the second Argument Box does not exceed the number of Values associated with the first Argument Box |

Together, these eight relations provide all of the required control for any Iterative Procedures.

3.6.2.5 Enumeration

The fifth of the six Pre-defined Procedure Boxes is the Enumeration Context. This Context conditionally executes a specified Box.

Although the Charting technique for Enumeration may not obviously reflect it, the internal representation for Enumeration is structured as a Context. When this Box is used in a Chart, the Context Box is not displayed; instead, the Enumeration notation is displayed.

Figure 47:
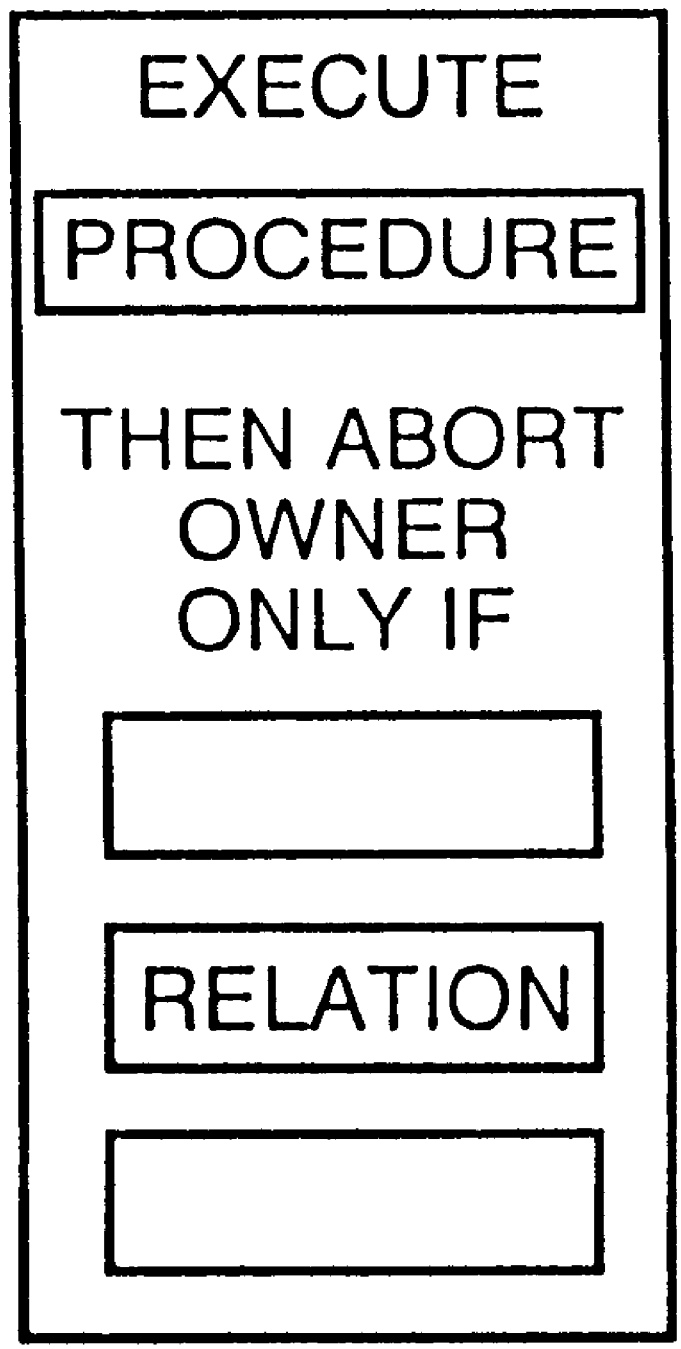
FIG. 47 illustrates the pre-defined Enumeration Context, using the format of a Context Box.

As a Context, Enumeration appears as shown in FIG. 47.

The example shows that the Context has four Argument Boxes. The first Argument names the Procedure Box to be invoked upon a certain condition. That condition is determined by the final three Argument Boxes. These three Boxes perform a comparison in the same manner as the Iteration Context presented in the previous section. If the result of that comparison is true, then the named [Procedure] is invoked and the Owner of this Context is subsequently terminated, that is, no more of its Child Boxes are invoked.

Figure 48:
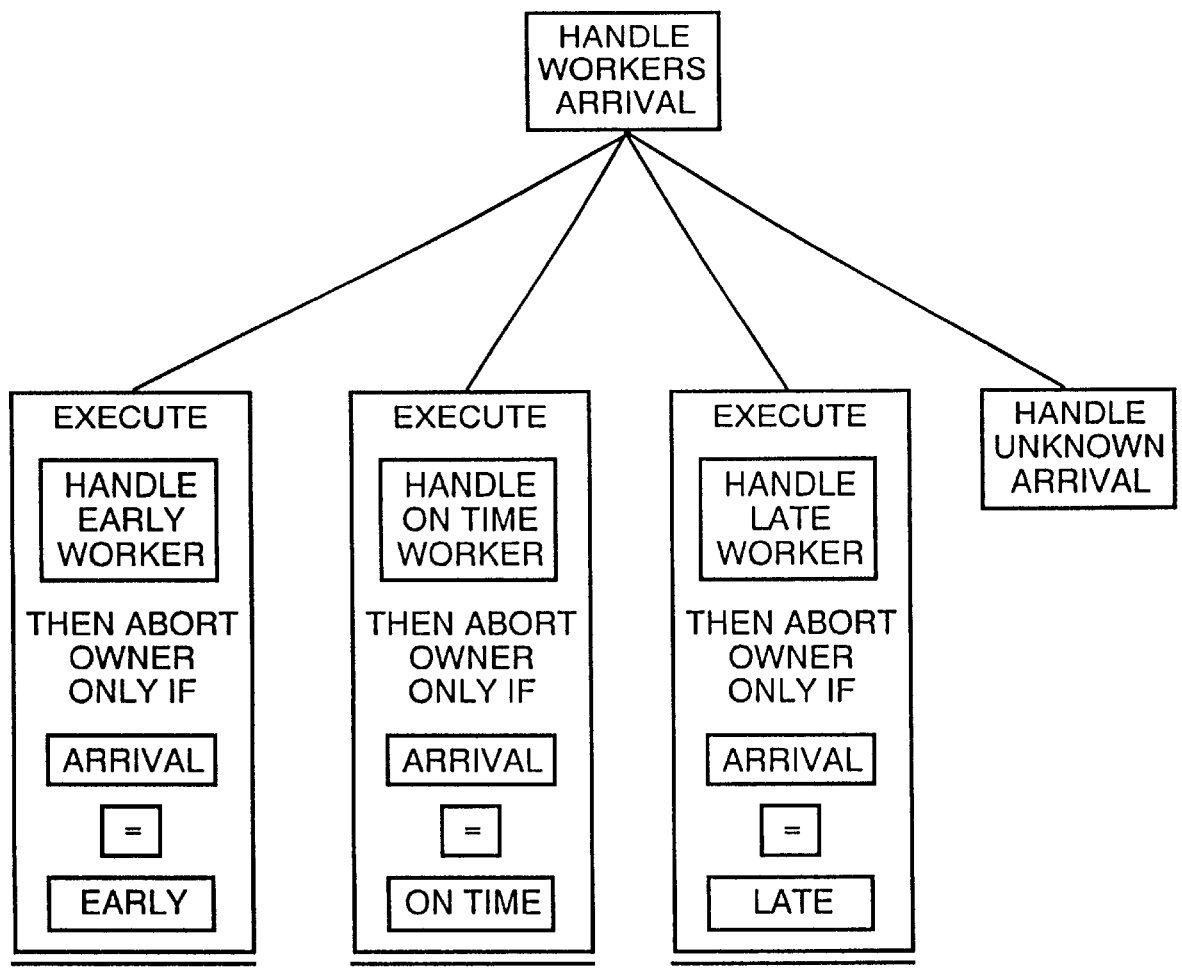
FIG. 48 is a Chart which illustrates the internal representation of a sample Enumeration Context.
Figure 49:
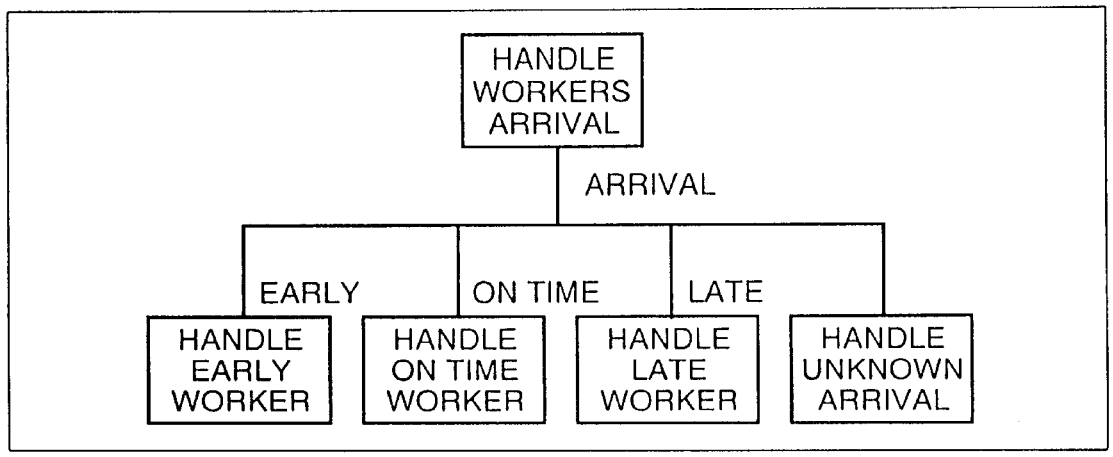
FIG. 49 is a Chart which illustrates the external representation of the Enumeration Context of FIG. 48.

FIGS. 48 and 49 show the differences between the internal and external representations of the Enumeration Context, in a particular example.

Note that [Relation] is not displayed in the External representation when the relation is [=]. If the relation is other than [=], it will be displayed explicitly.

3.6.2.6 Invoke

The sixth of the six Pre-defined Procedure Boxes is the Invoke Context Box. This Context controls the asynchronous execution of other Procedure Boxes.

Although the Charting technique for an Asynchronous Procedure Line may not obviously reflect it, the internal representation for the Invoke function is structured as a Context. When this Box is used in a Chart, the Context Box is not displayed; instead, an Asynchronous Line is displayed.

Figure 50:
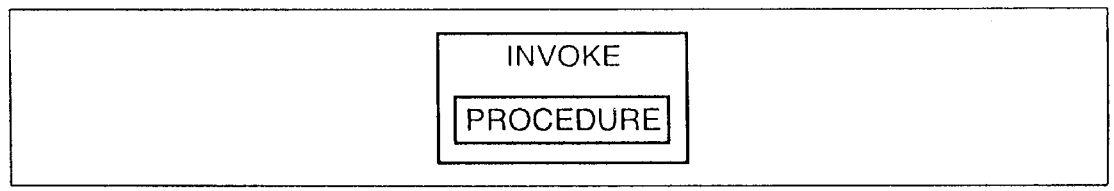
FIG. 50 is a diagram showing the Context Box format for the predefined Invoke Context.

The Context Box format for Invoke is shown in FIG. 50.

When executed, the Context in FIG. 50 initiates the execution of [Procedure] as an independently-executing Box which never returns control to the Invoke Context. Once the new task is started, the calling program returns to the Owner Box of the Context. Thus, the program splits into two, with the called program executing on its own, and the calling program returning to the point from which the call was made.

Figure 51:
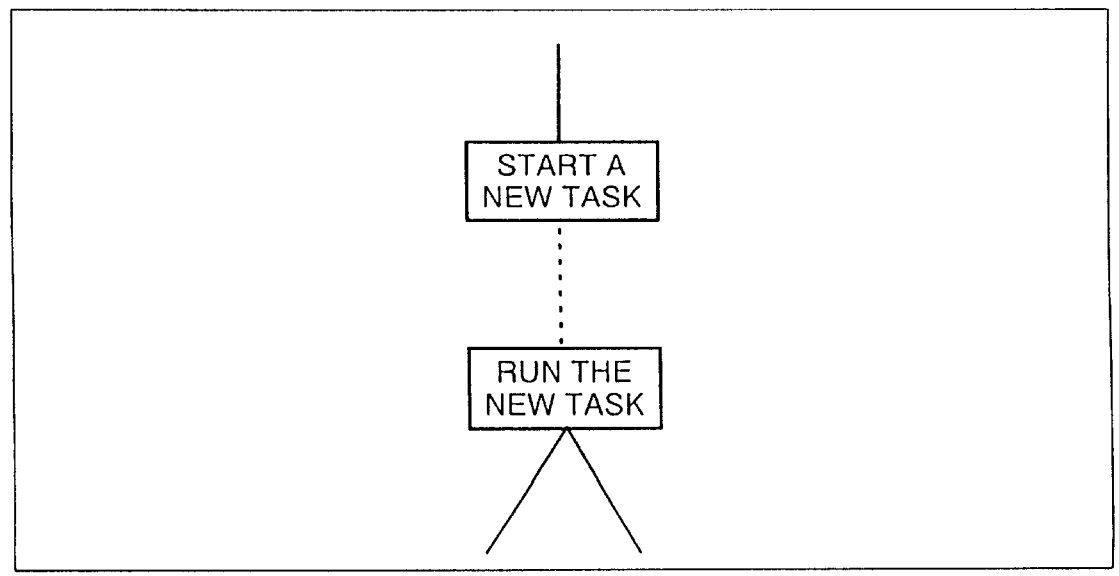
FIG. 51 is a Chart showing the external representation of the Invoke Context.
Figure 52:
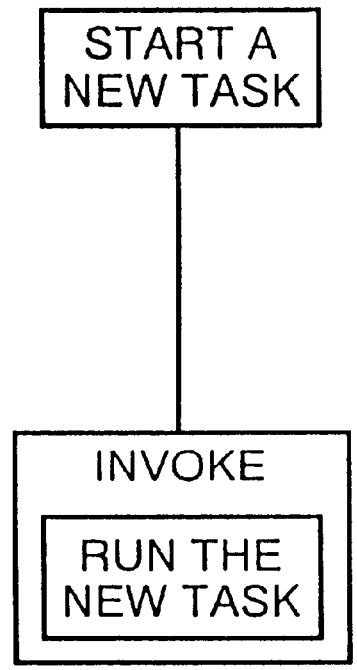
FIG. 52 is a Chart showing the internal representation of the Invoke Context.

As an example of the differences between the internal and external representation of the Invoke Context, FIGS. 51 and 52 show both representations, respectively. FIG. 51 shows the user-perceived representation of the Invoke Context. FIGS. 51 and 52 can also be viewed as showing the internal and external representations of an Asynchronous Line, in a Procedure Structure.

Note that internally, all Lines are Synchronous. The Box labeled [Invoke [Run the New Task] is a primitive procedure function. This function signals the environment of the present invention to execute two Procedure Structures simultaneously, namely [Run the New Task] and [Start a New Task]. It also signals the Chart editing program to display the Line between [Start a New Task] and [Run the New Task] as an Asynchronous Line.

Upon execution of the Invoke Context, the Box named [Run the New Task] begins execution of its Child Boxes; [Start a New Task] then returns control to its Owner Box (not shown). When the last Child Box of [Run the New Task] has completed executing, control is returned to [Run the New Task]; from there, control returns to nowhere, and the execution of [Run the New Task] ceases.

3.6.2.7 Accept Argument

The Pre-defined Accept Argument Procedure is used to bring input data into a procedure. This Procedure is also used to synchronize the execution of independent procedures. For example, if a procedure should attempt to accept an argument which has not yet arrived, the procedure enters a wait state until the data become available.

3.6.2.8 Return Argument

The inverse operation of the Accept Argument Procedure is the Return Argument Procedure. This Procedure is used to pass output data from a procedure.

3.6.3 Pre-Defined Directory Boxes

All Boxes located between the Top Box and a Context are called Directory Boxes. There may be one or more layers of Directory Boxes. These Boxes perform a labeling function only, and are analogous to directories in the well-known MS-DOS operating system. Directories can hold pieces of Structure, either Procedure or Data. The term "execute a directory" means to execute all Contexts within that Directory, in the order in which they appear. Although a Directory Box can be placed almost anywhere, it is not meaningful to place it within a Context.

Aside from the Pre-defined Data and Procedure Boxes, there is a Pre-defined Directory Box as well. The only Pre-defined Directory Box is the Top Box. The Top Box is the ultimate Owner of all Boxes in the entire environment of the present invention. When the first Directory Boxes are defined, they must be connected to someplace; the Top Box is the place. All Contexts are subordinates of the Top Box, either directly or as Child Boxes of intervening Directory Boxes. The Top Box is the foundation which ties the entire environment of the present invention together into a single whole.

Note that, within a Context, the Data Structure must be connected to the Top Box of the Context, and Procedure Structure must be connected in the same manner. This connection tells the system that the Data Structure is local to that Context.

3.7 Utility Boxes

In addition to the Pre-defined Data, Procedure, and Directory Boxes, there are several other Boxes available for use. These Utility Boxes are not primitive, lowest-level Boxes such as Precede or the Null Box. Rather, these Boxes are built out of existing Pre-defined Boxes to perform handy functions.

There are Utility Data Boxes, Utility Procedure Boxes, and Utility Directory Boxes.

The Utility Data Boxes are: [Character] (which is an Enumeration of the set of keyboard characters), [Digit] (the set of decimal digits), [Alpha] (the set of 26 letters), and [Which] (the Enumeration of [First], [Last], [Next], and [Prior]).

The Utility Procedure Boxes are as follows:

a) [Clone Box [ ] [ ]]

This Utility Procedure creates a duplicate of the specified Box.

b) [Send Screen Map [ ]]

This Procedure causes the program to display a particular screen at a specified point in the program. For example, the user creates a Box containing a desired screen display. The Box can be made as large as the screen by "fluffing" it with tabs or spaces; the boundaries of the Box will expand to accommodate the spaces. Then, suppose that the user places a Box called [My Map] above the Box containing the display. Then, when [Send Screen Map] is invoked with the argument "My Map", the program will automatically display the contents of the Box at the bottom of the branch containing "My Map", i.e. the screen display previously entered by the user. If there are several Boxes at the same level, the system will display each one in turn, as the user presses the "Enter" key.

c) [Transceive Screen Map [ ]]

This Procedure can be used to accept data entered onto a screen display, making values keyed in by the user available to the program. It can also be used in the other direction, i.e. to print stored values onto predetermined positions on a pre-formatted screen.

d) [Accept Argument [ ]]

This Procedure makes an Argument for a Context available to the Context. It can also be used in multitasking, as it provides a queue for incoming arguments.

e) [Return Argument [ ]]

This Procedure returns output arguments from within a Context.

Note that the functions of Accept Argument and Return Argument are essentially analogous to the function of an argument list in a subroutine or procedure in a conventional programming language such as Basic or Pascal.

The Utility Directory Boxes are: [Utility Data] (which holds the Utility Data Boxes listed above), and [Utility Procedure] (which holds the Utility Procedure Boxes listed above).

4.0 The Editor

This section describes the operation of the Editor, used as the primary tool for entering and modifying all Charts in the environment of the present invention. The Editor provides for the overall maintenance of Data, Procedure, and Directory Structures as well as the actual stored Data Values.

The discussion of the Editor is divided into four parts. The first part presents the commands available within the Editor. The second part reviews data type checking within the Editor environment. The third part discusses Box names and the rules for searching out a particular name. The final part describes the editing and execution of all Charts by means of a sample program development.

4.1 Editor Commands

This section describes the various keyboard controls which control the Editor of the present invention. Each of the commands are presented in the subsequent subsections along with a brief description of their function. More-detailed examples of the usage of the commands are presented in Section 4.4, Sample Edit Session.

There are only twelve commands which control the Editor of the present invention: Create, Destroy, Cycle, Clear, Zoom In, Zoom Out, Run, Commit, Get Next Owner, Invoke Alternate Editor, Clone Structure, and Help.

In addition to these ten Commands, there is a full complement of cursor positioning and character editing commands available for editing the text which is enclosed within each Box, namely Cursor Up, Down, Left, and Right, Home and End, and Insert and Delete Character.

For moving around among the various Elements (i.e., the Lines and Boxes) of a Chart, there are the five additional cursor commands, namely Up Element, Down Element, Left Element, Right Element, and Home Element.

4.1.1 General Information

The Editor of the present invention draws Charts on a terminal screen for review or modification. By using the various Editor commands, Contexts, Procedure Boxes, Directory Boxes, Data Boxes and their Values can each be displayed. All of these components are displayed as Lines and Boxes; no other icons or characters are required.

Not only does the Editor serve as a chart modification tool, but it also serves as a program execution and debugging platform for the entire environment of the present invention.

Many Editor commands are positional, that is, their functions are strongly dependent upon the current state of the screen display. The Editor employs a cursor to mark the current position of the Editor within the Chart being edited. For example, if a Box is the current Element, then the cursor is positioned within that Box. If a Line is the current Element, then the cursor is positioned immediately next to that Line.

4.1.2 Cursor Control

The traversing of Data, Procedure, and Directory Charts is effected via cursor control commands. Two kinds of cursor control are available within the Editor: IntraElement cursor control commands (for moving the cursor within a Box or Line) and InterElement cursor control commands (for moving the cursor between Boxes and Lines).

4.1.2.1 Moving Within a Box or Line

IntraElement cursor control allows for cursor movement within a Box or alongside of a Procedure Line. Included are Cursor Up, Down, Left, Right, which move the cursor one character in the specified direction (up, down, left, and right), Cursor Home, which moves the cursor to the first character of the current Element, and Cursor End, which moves the cursor to the position after the last character of the current Element. Insert and delete character commands are also provided, along with a host of optional functions (ultimately becoming a hypertext word processor with a full range of text and graphic manipulative capabilities).

4.1.2.2 Moving Between Boxes and Lines

InterElement cursor control allows for movement of the cursor between Elements of a Chart. InterElement controls include Element Up, Down, Left, Right, and Home, which move to the nearest Element in the specified direction. Where multiple choices exist, Element Down always moves the cursor to the first (leftmost) Child Element. Element Right and Element Left wrap around between the leftmost and rightmost Elements. Element Home displays the topmost Box of the current Structure.

After an InterElement cursor command is executed, the cursor is positioned either at home position inside the Box (for Box Elements) or in home position at the right side of a Line (for Line Elements).

4.1.3 Create Command

The first of the ten Editor commands is the Create Command. This Command is used to add new Elements to a Chart. If a Box is the current Element, this Command draws an empty Box inside of the Box, at the current cursor position. If the current Element is a Line, then a new Box is created to the immediate right of the current Line. In either case, the cursor is positioned as the first character in the new, empty Box. If the cursor is moved away from an empty Box and its Line, without using the Commit Command, then that Box and Line are removed from the display.

4.1.4 Destroy Box Command

The next Editor Command is the Destroy Box Command. This Command is used to destroy Elements which already exist in a Structure. If the current Element is a Box, then the Box is deleted from the database. Note that if other Structures utilize the deleted Box, their use is unaffected by this Command. To destroy all other appearances of that Box, one must destroy those Boxes individually. Note, however, that the Destroy Box Command will destroy all Boxes below the Box being destroyed, within that particular structure only. If the current Element is a Line, then the subordinate Box is deleted as if it were the current Element.

To prevent inadvertent deletions, this Command must be issued twice to effect the deletion. Additionally, all destroyed Elements are temporarily retained under the Directory Box named [Current Edit Session]. Thus, accidental deletions can be restored. These Destroyed Elements are retained until the end of the Editor session.

4.1.5 Cycle Command

The third Editor Command is known as the Cycle Command. This Command cycles the current Element through all of its possible configurations. For a Line, the choices are Synchronous or Asynchronous. For a Box, the choices are to search locally for the named Box (the default) or to search other Contexts for the named Box. Refer to Section 4.3, Name Search Rules for more information on name searches.

Note that Enumeration Lines are not created by this Command. For Procedure Charts, they are created by entering text alongside of a Line. For Data Charts, the lowest-level Boxes are always connected to their immediate superiors by Enumerative Lines.

4.1.6 Clear Command

This Command erases any text associated with the current Box or Line. If issued twice, the entire screen is cleared. This Command does not delete any Elements; it only affects the current display.

The Clear Command is used to exit the Help facility.

4.1.7 Zoom In Command

The Zoom In Command is used to view the other Structures and Values associated with the currently-displayed Structure. The function of this Command is position dependent; the current Element determines what is to be Zoomed In upon.

If a Zoom In is performed while the cursor is positioned on a Procedure Chart, one of three results occur, depending on the current Element:

1. If the current Element is the top Box of the Context, then the Procedure Value for that Context is displayed. A Value associated with a Context indicates that the Context is currently executing. See Section 4.4.3 for additional information on Procedure Values.
2. If the cursor is positioned within an Argument Box of a Context Box, then a subset of the Data Chart for that Context is displayed, namely, that Argument Box and its Child Boxes.
3. If the current Element is any Element aside from a Context Box or one of its Argument Boxes, then the entire Data Chart for that Context is displayed.

If a Zoom In is performed while the cursor is positioned on a Data Box, the current Value associated with that Data Box is displayed, if any. A Data Value indicates that an occurrence of this data exists; the Value becomes associated with a Data Box via the [Precede] Context. For additional information on Data Values, refer to Section 4.4.3.

4.1.8 Zoom Out Command

The next Command is the counterpart of the Zoom In Command, namely, the Zoom Out Command. The Zoom Out Command is used only to return from a previous Zoom In Command. When issued, this Command returns the display to the state it was in before the Zoom In Command was issued. If no Zoom In was active, Zoom Out does nothing. This Command is also used to return from the Get Next Owner Command.

4.1.9 Run Command

The seventh Editor Command is the Run Command. This Command is used to invoke a Context. Execution sequence is in hierarchical order, that is, top to bottom and left to right.

Run Mode is initiated when the Run Command is issued while viewing a Context Procedure Chart. If the current Element is anywhere within a Context or Directory Structure, then that Context or Directory is immediately executed, starting and ending with the current Element. Upon completing execution, control returns to the Editor.

A Context can execute in either Run Mode or Debug Mode. Run Mode is initiated if the Run Command is issued while viewing a Procedure Chart. Debug Mode is initiated if the Run Command is issued while viewing a Procedure Value. Debug Mode executes a Context in single steps; each Run Command issued advances the execution of the Context by one Box. The current Element indicates the Box to be executed next.

4.1.10 Commit Command

The eighth Editor Command is the Commit Command. The Commit Command is used to commit Box Name changes to the database. For example, after entering a Box Name, pressing the Commit key causes a Box of that name to be added to the database, or, if the named Box already existed, the current Chart becomes another Owner of the named Box.

A Commit Command is also used to signal the completion of Box Name entry for an Iterative or an Enumerative Line.

4.1.11 Get Next Owner Command

This Editor Command is used to locate and display each Owner Box of the current Element. For each successive Get Next Owner command, each other owner of the current Element is successively displayed along with any other Child Boxes of that Owner Box.

The Zoom Out Command cancels this display, returning to the original display as it was before the first Get Next Owner Command was issued.

4.1.12 Help Command

The next Command in the Editor is the Help Command. A full help facility is available within the Editor environment which supplies information relating to all Editor Commands, the Pre-defined Boxes, the Utility Boxes, and their usages.

4.1.13 Invoke Alternate Editor Command

This Command is used to hold multiple Editor sessions simultaneously. Each Alternate Editor session has a user-assigned name. Any number of Editor sessions can be simultaneously active.

To start an alternate Editor, enter the Invoke Alternate Editor Command followed by any text and the Commit Command. The current Editor session is saved and a new Editor session is begun.

An Alternate Editor session can be interrupted at any point to return to any other Editor session. Simply enter the Invoke Alternate Editor Command and the name of the session to resume, followed by the Commit command. The current Alternate Editor session is saved and the named Editor session is resumed. To resume the initial Editor session, enter the Invoke Alternate Editor Command followed immediately by a Commit command; the initial Editor session has no name.

Caution should be used with multiple Editor sessions. If a given Structure is being accessed in two or more sessions, any change made in one session is automatically reflected in all other sessions.

4.1.14 Clone Structure Command

This Command is used to create duplicate Data, Procedure, and Directory Structures. It is used to create a second copy of a Structure without having to re-enter all of the Elements within the Structure. This Command is useful because a cloned Structure can be modified without affecting the original Structure on which it was modeled.

To clone a Structure, create an empty Box, enter the name of the original Structure to be cloned, then enter the Clone Structure Command instead of the usual Commit Command. The specified Structure is cloned as the current Box. The name of the new clone Box is copied from the original Box, suffixed with the characters "Clone", then added to the database. Child Boxes of the cloned Box are also copied into the current Editor session if they are not already locally defined. Refer to Section 4.3.1 for more information on locally-defined Box Names.

4.2 Type Checking in the Editor

Data types are rigorously enforced in the Editor of the present invention.

Figure 53A:
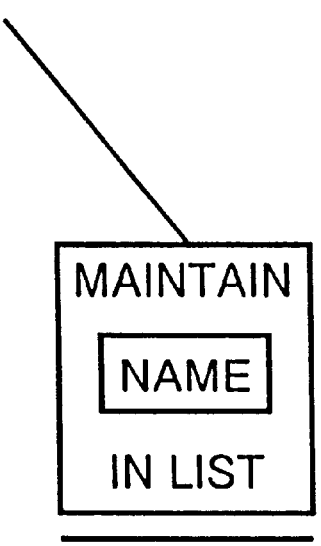
FIG. 53 is a diagram showing two callings of a Context which may or may not be the same.
Figure 53B:
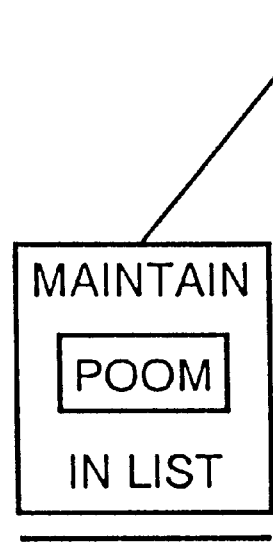

Whenever a Context Box name is entered, the Editor automatically insures that the data types of the Argument Boxes in the calling Context match the data types of the Argument Boxes in the called Context. This is due to the fact that the Editor treats the data type of the Argument Boxes as a part of the Box Name. The example in FIG. 53 shows two callings of a Context; the two Structures may or may not be invoking the same Context.

The two Structures are referencing the same Context only if [Name] is the same data type as [Poom]. If [Name] and [Poom] are different data types, then the two Context Boxes being invoked have different Box Names from each other. Thus, they represent two different Contexts. This implies that it is absolutely impossible to pass incorrectly-typed Data Boxes into a Context. Attempting to do so merely adds a new Context Box to the database, with the Box Name being identical to the existing Box Name in all aspects except for one, namely, the data type of the Argument Box. A different Box Name means that it is a different Context.

4.3 Name Search Rules

The next several subsections describe the search techniques employed by the Editor to locate the Boxes which are to be connected by Lines as a part of a Structure.

The Editor adds new Boxes to the Structure via the Create Command. When text is entered into the created Box, the Editor scans its database of Boxes to determine if this is a new Box or a reference to an existing Box. If it is a new Box, then the Name of that Box is added to the database of all Box Names within the Editor; initially, this new Box has no Child Boxes. If it is the Name of an existing Box, then the Editor automatically fetches the Child Boxes from the database for displaying on the terminal screen. If the found Box is a Context, only the Context Box is displayed; the Child Boxes of the Context are not automatically displayed. The Down Element Command is used to display them when needed.

In larger systems, difficulties can arise when several Structures wish to use identical Box Names in differing ways. For example, one Structure may use the Box [Get Input] to get terminal input while another Structure wishes to use the same Box Name to get a different kind of input.

In order to permit identically-named Boxes to describe differing Structures, the Editor employs a two-tiered name searching algorithm: Box Names can be either Local names or non-Local names. A Local name is a name that is contained in the current Context or Directory. Non-Local names are those that are not defined in the current Context or Directory. In this manner, two Contexts can each have a Box, each with the same Box Name, but having differing Child Boxes. Optionally, both Contexts can reference the same Box as well. In searching for a Box having a particular name, the system will search locally first. If no local Box having that name is found, the system will search non-locally. If the Box is found locally, the search will stop. Optionally, the search may be continued by using the Cycle Command, to search for non-local Boxes.

This duplication of Box Names does not raise problems in the environment of the present invention. Because the text in each Box is only a comment for the convenience of the human, it can be anything at all, even a duplicate of another Box's name. The system always keeps a record of each Box, using a unique internal identifier.

4.3.1 Local Names

Local names include the name of all Boxes which are subordinate to the top Box of the current Structure.

As an example of the scope of Local Box Names, the Box named [Top Box] has the name of every Directory Box and Context Box in its list of Local names. Also, each Context Box has all of its subordinate Procedure Box Names and all of its Data Box Names in its Local name list. When a new Box is added to the Editor's database, the current list of Local names is scanned first. In all cases, if a match is found within the Local names list, then the Child Boxes associated that name are displayed on the terminal screen.

4.3.2 Non-Local Names

In many cases, a Box is needed in a Structure, but its name is not among those in the list of Local names. To search other Contexts or Directories for a given Box Name, the Cycle Command is used. When this Command is issued, the Editor searches other Contexts for an alternate definition of the Box Name. If found, the Child Boxes of the alternate Box are substituted for the existing Child Boxes. Re-issuing the Cycle Command resumes the search for other occurrences of that name.

When searching for a non-Local name, the Editor begins searching with [Top Box], continuing in hierarchical sequence, that is, top to bottom, left to right. In this manner, the relative positioning of Directory Boxes and the Contexts within them becomes critical. Their sequence directly affects the hierarchy of selection. This implies that putting a new system into production can be accomplished by moving only one Box to a new position in its Directory.

In order to narrow the search or override the automatic search pattern, the Cycle Command can be issued with the name of the Context where the desired Structure can be located. The Editor then begins its search with the Box Names that are Local to that Context.

4.3.3 Distinguishing between Boxes of the Same Name

Figure 54:
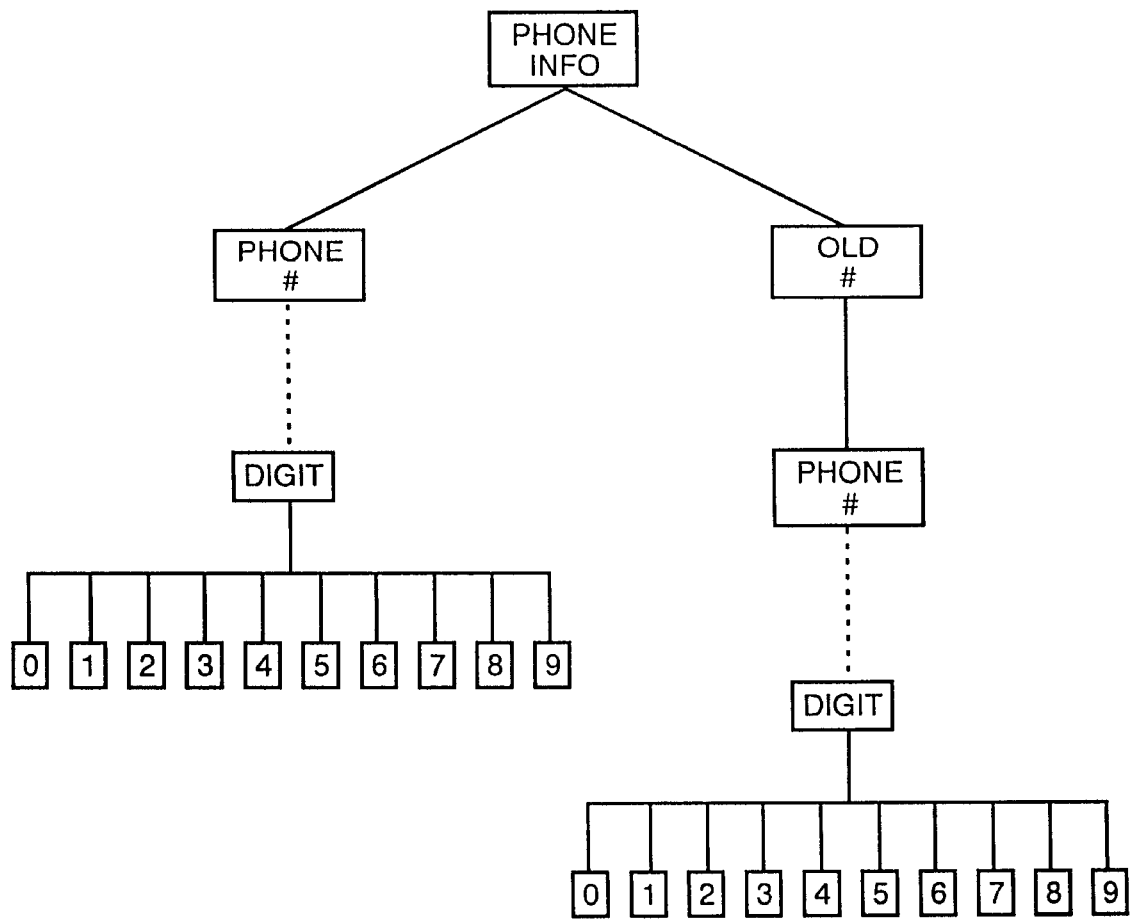
FIG. 54 is a Chart showing a data structure using the same Data Box twice.

The ability to include a given Data Box at several points in a Data Structure raises the question of how to differentiate which Data Box is being accessed. The following example in FIG. 54 presents a situation where the same Box, [Phone #], needs to be included twice.

In the Data Structure [Phone Info], the Data Box [Phone #] appears once as a subordinate of [Phone Info] and again as a subordinate of [Old #]. If the Data Box [Phone #] appears as an Argument Box in a Context, a human observer cannot be certain as to which Data Box is being accessed.

To resolve the ambiguity, a minor notational modification is introduced. The Context Argument Box is divided into two connected Boxes. One of the two segments names the next-higher unique Box name such as to differentiate it from other occurrences of the Argument Box Name. For example, for each of the occurrences of [Phone #], the Context Argument Box would respectively appear as shown in FIG. 55.

It is important to note that there is no actual difference between the internal representation of the Argument Boxes and their visual equivalents. The Editor is always aware of which Box is to be used; the notational difference exists only for the human observer's convenience. If the user enters an ambiguous name, the system will prompt the user for more information, as described in Section 4.3, Name Search Rules.

4.4 Sample Edit Session

This section and its subsection describe a sample Editor session using what is described in the preceding sections. The purpose of the example is to show how a user can compose a Context which performs a logical AND operation on two infinitely-large bit strings, producing as output the result of the AND. The example assumes an empty environment, that is, only the Pre-defined Boxes exist.

The sequence of actions for the sample Editor session as described in the next few subsections is not critical; any Boxes can be created before or after any other Boxes. The sequence used in the sample session begins with the Context Definition. Onto that base, the Data and Procedure Structures are then built. Next, the Condition Structure associated with the Context is defined. Finally, the completed Context is executed, consuming input Values and producing output Values.

Note that the present invention is preferably implemented as an integrated environment. This means that, when the system is first activated, the Editor is in operation. All programs are run from within the Editor, by issuing a Run Command.

4.4.1 Context Definition

The initial definition of the Context involves two steps: choosing the Owner Box for that Context and adding the new Context as a Child Box of that Owner. The next two subsections detail the exact sequence of steps required to select an appropriate Owner Box (in this example, [Top Box]), and the sequence of steps required to define the new Context Box Name.

4.4.1.1 Choosing the Context Owner

This section describes the method of selecting an Owner Box for the sample Context. Note that while the Owner Box can be defined first, the sequence of definition is not important. This task could be deferred until later; however, eventually, it must be performed.

When first invoked, the Editor presents a blank screen. To begin the choice of the Owner Box, [Top Box], issue the Create Command; an empty Box is drawn on the top center of the screen with the cursor positioned at home position within it. The screen now appears as shown in FIG. 56.

Enter the Box name "Top Box", then issue the Commit Command. At this point, the directory structure for [Top Box] is displayed. However, the sample assumes an empty environment. Thus, [Top Box] has no Child Boxes; the display remains as it appears in FIG. 57.

Normally, [Top Box] has Child Boxes; in this instance, there are none. Had there been any Child Boxes, they would be displayed.

Upon completion of the Commit Command, the cursor is positioned in empty space immediately below [Top Box]. Next, issue a Create Command to create a new empty Child Box; the cursor is positioned inside of it, as shown in FIG. 58.

Ordinarily, only Directory Boxes are the Child Boxes of [Top Box]. However, any Box can be connected to any other Box. So rather than create an intermediary Directory Box, the (soon to be created) Context Box is connected directly to [Top Box].

Thus, the Owner Box of the Context has been defined; it is the [Top Box], as shown in FIG. 58. The next Section describes the entry of the Context Box Name into the Structure.

4.4.1.2 Defining the Context Box Name

This section describes the sequence of steps required to enter a Context Box Name. The description assumes that the cursor is positioned within an empty Box. The name of the sample Context to be added is [Perform a logical AND with [This] and [That] yielding [New]].

To enter the name of the Context, one performs the following ten steps:

1. With the cursor inside of the empty Box, enter the text "Perform a logical AND with".
2. Issue the Create Command; an empty Box appears inside the Context Box at the current cursor position. The cursor is then positioned within the newly-created Box.
3. Enter the name of the first Argument Box, "This", followed by the Commit Command. [This] is added to the database, and the cursor is positioned back inside of the Context Box just after the first Argument Box.
4. Enter the text "and" into the Context Box.
5. Issue the Create Command; an empty Box appears inside the Context Box at the current cursor position. The cursor is then positioned within that newly-created Box.
6. Enter the name of the second Argument Box, "That", followed by the Commit Command. [That] is added to the database, and the cursor is positioned again inside of the Context Box just after the second Argument Box.
7. Enter the text "yielding" into the Context Box.
8. Again issue the Create Command; another empty Box appears inside the Context Box at the current cursor position. The cursor is then positioned within the newly-created Box.
9. Enter the name of the third Argument Box, "New", followed by the Commit Command. [New] is added to the database, and the cursor is positioned again inside of the Context Box just after the third Argument Box.
10. Finally, issue the Commit Command. The Context Box named [Perform a logical AND with [This] and [That] yielding [New]] is added to the database. The cursor is positioned immediately below the newly-created Context Box.

At this point, the new Context has been created. The Editor screen now appears as shown in FIG. 59.

This completes the definition of the Context Box Name. Although no Child Boxes have been defined, the Context Name still exists; executing this Context now is essentially a null operation.

With the definition of both the Context Owner and the Context itself, the Boxes for any of the other Context Structures can be defined. For this example, the Data Structure is defined first, then the Procedure Structure.

4.4.2 Data Definition

This section describes the creation of the Data Structure associated with the Context. As with all other Structures, the sequence of definition is not critical. Argument Box definitions can be entered in any order. One can start from the top of a Chart, or proceed from the bottom.

In the case of a Context, the system knows, in advance, which branch is Procedure and which branch is Data. The user can view either the Procedure or the Data associated with a particular Context, by issuing a Zoom In or Zoom Out Command. One can also add a Command (or dedicate a key on the keyboard) which alternately displays the procedure or data portions of a Context. In general, a single screen is too small to show both procedure and data at once.

Figure 60:
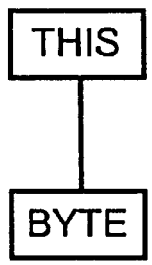
FIG. 60 shows the editor screen after creating a Child Box called [Byte], in the sample editing session.

Since there are Argument Boxes used in the sample Context, the definition of those Boxes must be supplied. To define the Argument Boxes, perform the following ten steps:

1. Position the cursor on the Argument Box [This] by first issuing an UpElement Command; this positions the cursor at the start of the Context Box name. Use the cursor movement controls to position the cursor within the Argument Box [This].
2. Issue the Zoom In Command. The screen is cleared, and the Box [This] is drawn at the top center of the screen. The cursor is positioned immediately below the Box.
3. Issue the Create Command. An empty Child Box is drawn under [This] with the cursor positioned inside.
4. Enter the name of the Child Box, namely [Byte], and issue the Commit Command. The Box named [Byte] is added to the database as a Child Box of [This]. The cursor is positioned immediately under [Byte]. The Chart at this point is shown in FIG. 60.
5. To define [Byte] as a collection of bits, a single Child Box is first created. Issue the Create Command to create an empty Child Box under [Byte]. Next, enter the characters of its Box name, Bit, and issue the Commit Command. The Box named [Bit] is now a part of the database.
6. Step 5 defines [Byte] as a single [Bit]. To define a Byte as a collection of Bits, an Asynchronous Line is needed. Use the UpElement Command twice to position the cursor on the Synchronous Line above [Bit] and issue the Cycle Command; the Line becomes an Asynchronous Line.
7. Next, create the Child Boxes of [Bit], namely 0 and 1. First, issue the DownElement Command twice to reposition the cursor below [Bit] again; issue a Create Command to create an empty Child Box under [Bit]. The cursor is now positioned inside of the new Child Box.

8. Enter the Box name, "0", into the Child Box then issue the Commit Command. The Box [0] is added to the database.

9. Issue the Up Element Command to position the cursor on the right side of the Line above the Box [0]; issue a Create Command to create a second Child Box of [Bit], on the right side of [0]. The cursor is positioned inside of the new Child Box.

10. Enter the Box name, "1", into the Child Box then issue the Commit Command. The Box [1] is added to the database.

Figure 61:
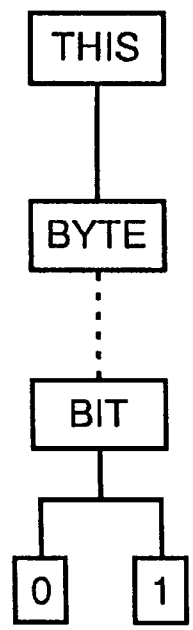
FIG. 61 shows the editor screen after completion of the definition of the Argument Box, in the sample editing session.

With these ten steps, the full definition of the first Argument Box has been constructed. The Editor screen now appears as shown in FIG. 61.

At this point, the Box [This] does not have an Owner Box. Since all Boxes used in a Context must be defined locally within that Context, an Owner Box must eventually be assigned. While the Editor session is in progress, unowned Boxes such as [This] are "owned" by the Editor. That is, the Editor keeps an internal, temporary list of Boxes that have not been connected to the other Structure. If the user tries to exit from the Editor without connecting these Boxes, the Editor prompts the user to connect them.

Figure 62:
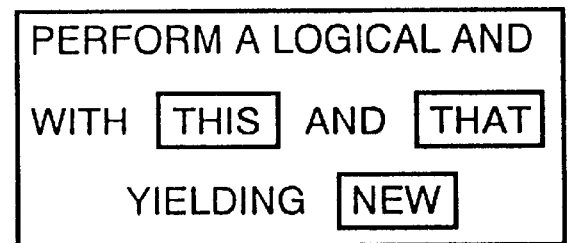
FIG. 62 shows the editor screen after execution of a Zoom In Command from open space, in the sample editing session.
Figure 62:
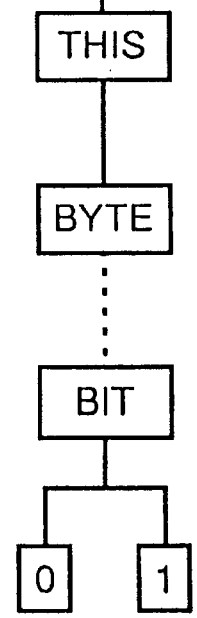

To display the data of the current Context, one can issue the Zoom In Command when the cursor is positioned in empty space outside of any Box. Since an Argument Box of [Perform . . . ] is currently displayed on the screen, issuing the Zoom In Command displays the entire Context Data Structure as shown in FIG. 62. Note that FIG. 62 also shows the Data Structure [This], which is a part of the Context data.

Now that the entire Context Data Structure is displayed, the other Argument Boxes, [That] and [New], can be included in the Data Structure in a similar manner as [This] was included. When complete, the Data Structure for the Argument Boxes appears as shown in FIG. 63.

Figure 63:
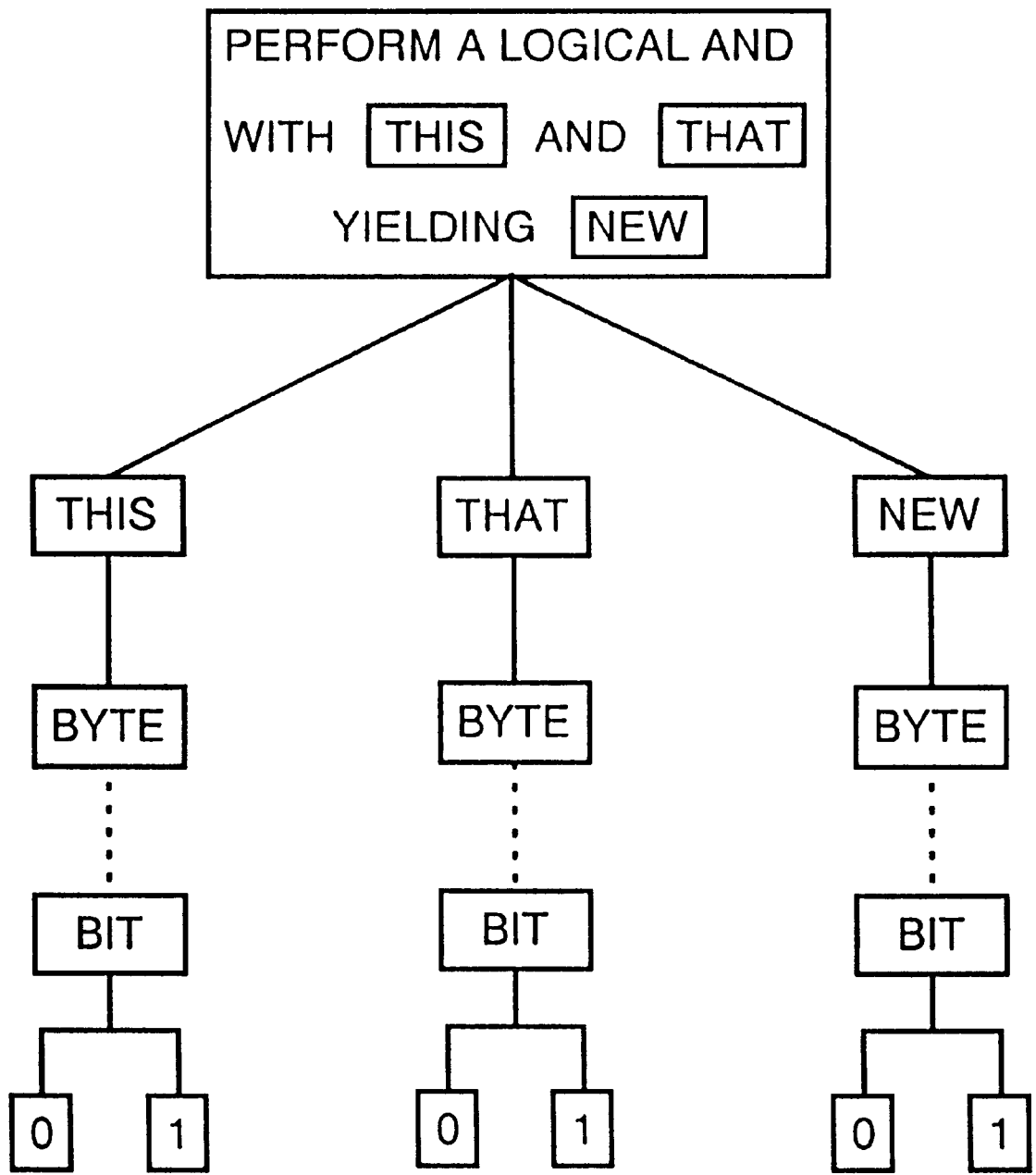
FIG. 63 shows the editor screen with the Data Structure of the Argument Boxes, in the sample editing session.

The Structure in FIG. 63 now represents the entire Data Structure which is required for performing the logical AND. Next, the Procedure Structure is defined for the example.

4.4.3 Procedure Definition

This section describes the entry of the sample Procedure Chart by using the Editor described above. Mechanically, the operations involved are the same as those already performed.

To begin, display the top Context Box on the screen. This is accomplished by clearing the screen with the Clear Command, creating an empty Box with the Create Command, then entering the name of the Context into that Box. The Structure shown in FIG. 64 can be created with the Editor commands, as described above. The step-by-step procedure will not be given here.

Figure 64A:
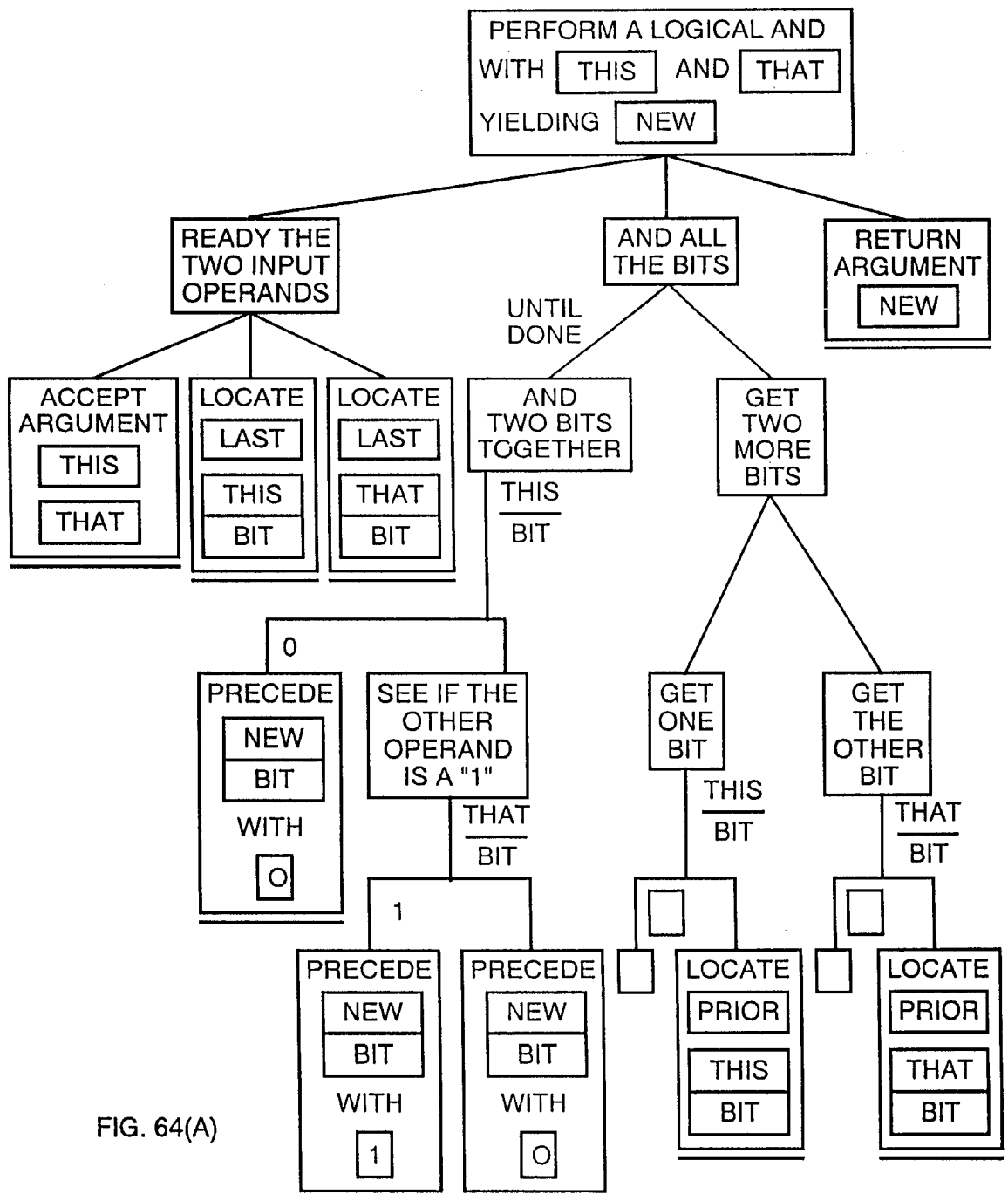
Figure 64B:
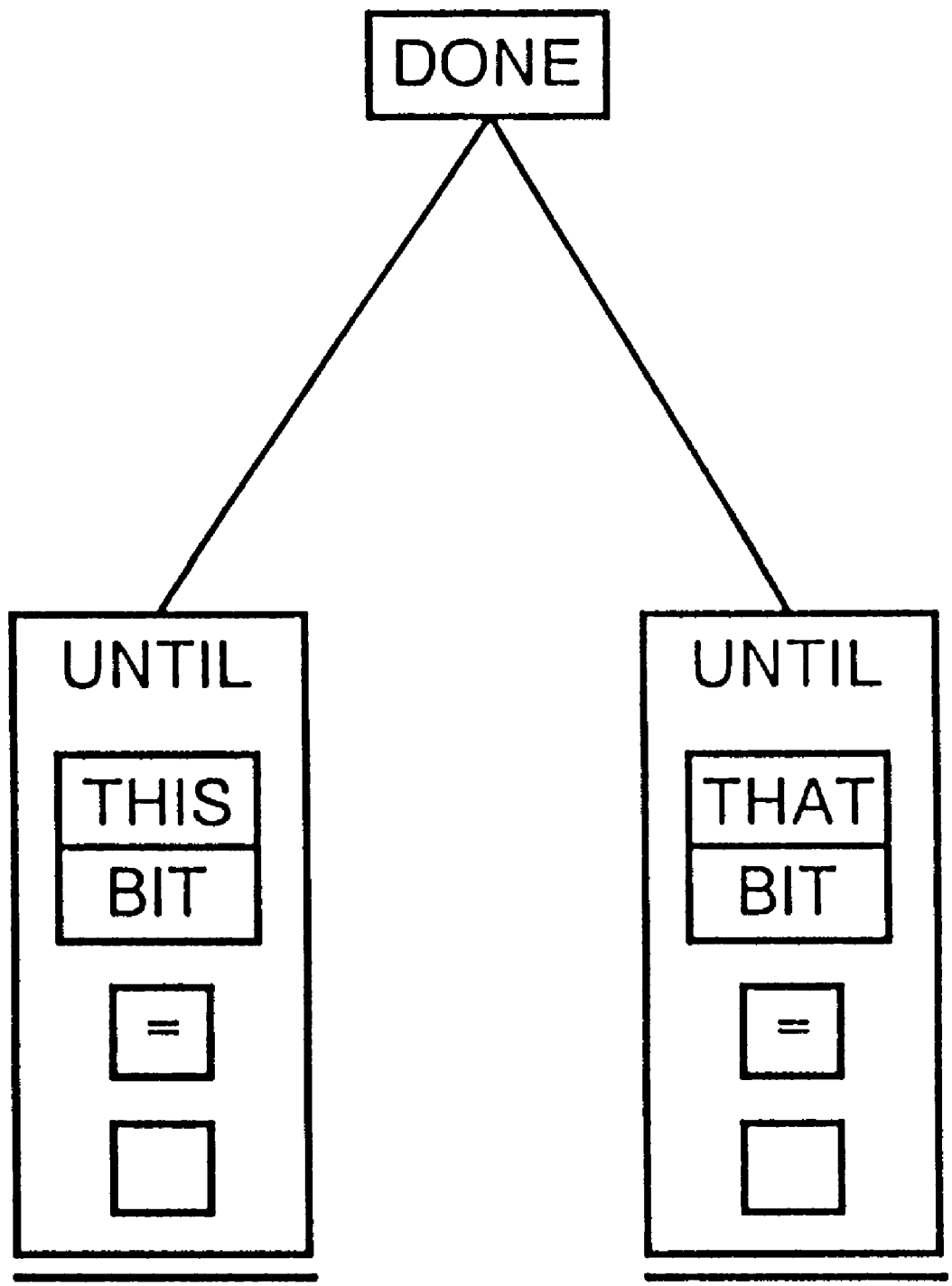

Once the final Commit Command is issued, the screen appears as shown in FIG. 64.

4.4.4 Editing Data and Procedure Values

A Value can be assigned to any Box. This Value is not a number or string, but is simply a yes/no indication that a Value is associated with this Box. A Box merely defines a possible component of a Data or Procedure Structure; the Value shows that an actual occurrence of the Data or Procedure exists and has been connected to that Box. Values can be associated with Data Boxes (to show that an occurrence of the data exists) and with Procedure Boxes (to show that an execution of this Box is in progress).

In the case of a Data Box, the Value must be distinguished from the Structure under the Box. For a Data Box to have a Value, the system must associate another Structure with that Box. This "other" Structure can be viewed as a "shadow", or as a Box in a different "dimension". These "other" Boxes have the same form as the Data Structure entered through the Editor. Their presence or absence indicates the presence or absence of data associated with the particular Box.

5. Example of the Use of the Present Invention

Having defined the theory, syntax, and mechanics of a fractal data base environment, the next step is to use that framework to address a real-world data processing application. Therefore, this section presents a complete Context which maintains a list of names and phone numbers.

The discussion is divided into two parts. The first part presents a detailed description of the operation of the sample Context on a Box-by-Box basis. The second part describes the logic of the calling Context from an operational point of view.

5.1 [[Maintain] [Name] and [Number] in Phone List] Context

This section presents and describes [[Maintain] [Name] and [Number] in Phone List], a complete Context which holds a phone list. Not only are the Data and Procedure Structures included, but there is also a description of the assignment of Values during its execution. The Context itself is illustrated in FIG. 65.

FIG. 65 is a Chart showing an example of the use of the present invention. FIG. 65 shows a complete Context, used for maintaining a list of telephone numbers. The figure includes both procedure and data portions. Every Context must have both procedure and data.

The structure shown in FIG. 65 is created with the Editor, using the Commands discussed above. The individual steps used to create this Structure need not be explained, as the examples given earlier show how to create Boxes and Lines. The Structure of FIG. 65 can be created in the same manner shown in the earlier examples. The present explanation will focus instead on the function of each portion of the Context.

Figure 65A:
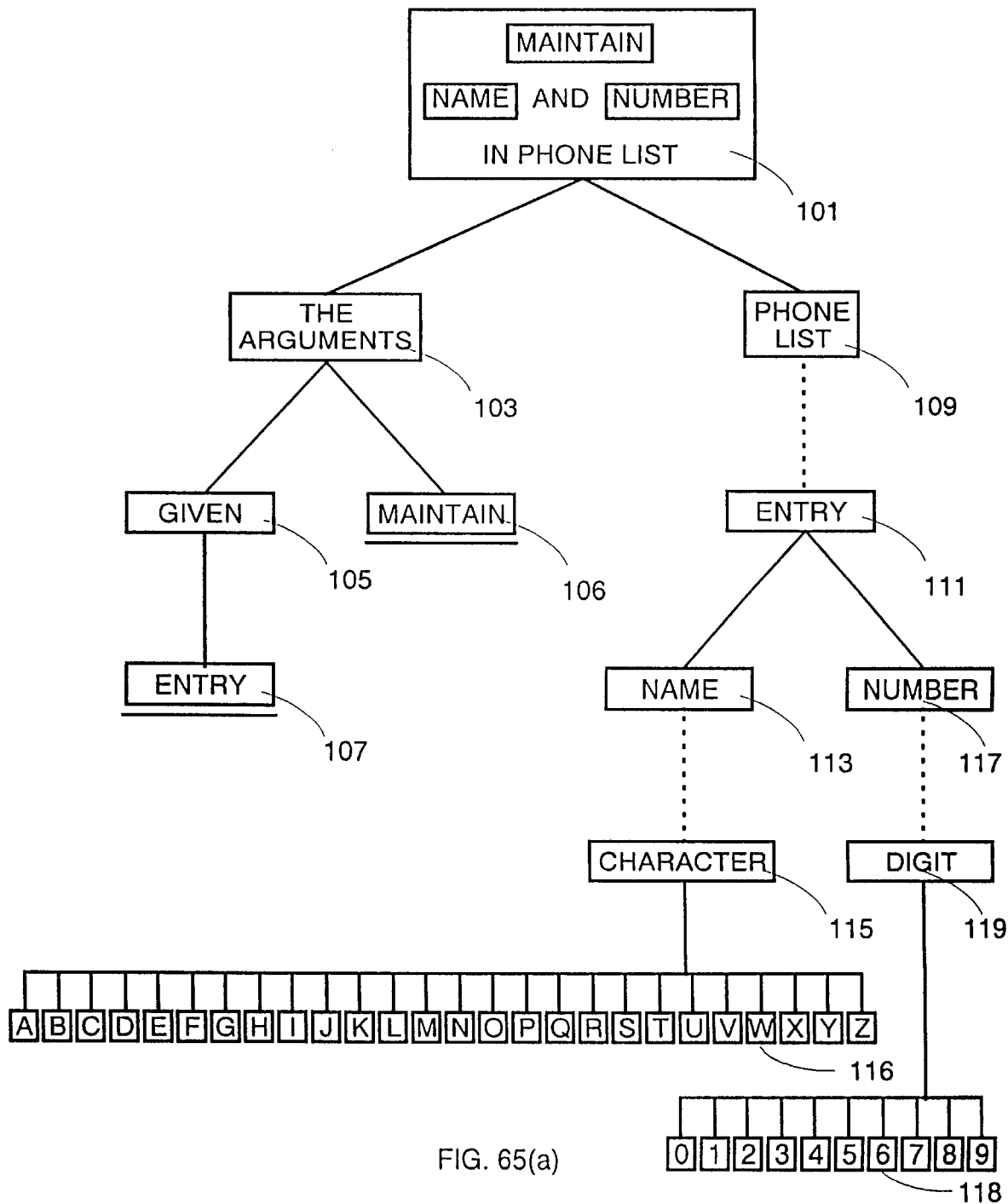
FIG. 65 is a Chart showing the use of the present invention to maintain a list of telephone numbers.
Figure 65B:
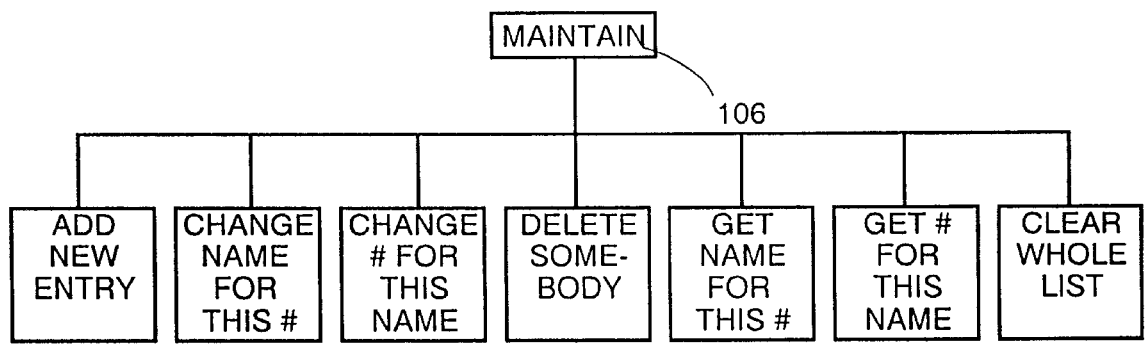

Box 101 is the Context Box. The Context Box includes the Boxes called [Maintain], [Name], and [Number]. The latter Boxes refer to Data Structures defined within the Context. FIGS. 65(a) and 65(b) together define the complete Data Structure for this Context. In Box 101, the labels "Maintain", "Name", and "Number" are all user-chosen labels which refer to Data Boxes which are described below. The expressions "and" and "in Phone List" are not the names of other Boxes, but are also user-defined. Another Context can call the present Context only by identifying the called Context with exactly the same labels given in Box 101. That is, the method of invoking the present Context is to use the Box [[Maintain] [Name] and [Number] in Phone List], or any other Boxes having three arguments, and having the same Context Box Name, provided that the data types of the arguments are the same as those of [Maintain], [Name], and [Number] respectively. Note also that there is no connection between the Box [Phone List] and the comment "phone list" appearing in the Context Box; the identity of these labels is, from the viewpoint of the system, purely coincidental.

FIG. 65(b) shows the Data Structure for the Box [Maintain]. [Maintain] is a Box which can have one of seven values, each of which is enumerated in FIG. 65(b). For example, [Add New Entry] is one of the seven possible Values which [Maintain] can assume. The Box [Maintain] is identified by reference numeral 106, to show that it is the same as Box 106 in FIG. 65(a).

Box 103 is [The Arguments], and is the first branch of the Data Structure for the Context. The various branches of data structures can be entered by the user, with the help of the Editor, and these branches can be entered in any order. What is shown in FIG. 65(a) is only one of many possible arrangements. Also, Boxes 103 and 105 are essentially only labels, which point to Boxes to which meaningful values will be assigned.

Box 103 has Child Boxes 105 and 106. Box 105, called [Given], is linked to Box 107, called [Entry]. [Entry] has the same structure as defined in Box 111, on the other branch of the figure, and will be explained below. However, Box 107 and Box 111 are different Boxes, and data attached to one is not automatically attached to the other. The horizontal line drawn below a Box, such as Box 106, indicates that the Box has various Child Boxes which are not shown, due to lack of space. The Child Boxes of Box 106 are instead shown in FIG. 65(b).

Box 109 is designated [Phone List], and is used as a label for the Data Structure of the telephone list. Box 109 is connected, by an Asynchronous Line, to Box 111, which is called [Entry]. The Asynchronous Line is used because, when data is entered into the system, there will be many Values of "Entry" but only one "Value" of "Phone List".

Box 111 is connected to Box 113, designated as [Name], and Box 117, designated as [Number]. [Name] and [Number] are connected, respectively, via Asynchronous Lines, to Boxes 115 and 119, labeled [Character] and [Digit]. [Character] can be connected to one of the various Boxes 116, the latter Boxes each containing a letter. Similarly, [Digit] can be connected to one of the various Boxes 118. The connections between Boxes 115 and 116, and between Boxes 119 and 118, are Synchronous. The only Asynchronous connections are between [Name] and [Character], between [Number] and [Digit], and between [Phone List] and [Entry].

Note that the Box called [Entry], appearing on the left-hand side of FIG. 65(a), represents the same Structure shown in detail on the right-hand side. One of the benefits of the present invention is that an entire Structure can be attached to any other portion of the Structure. Thus, when one attaches Box 111 to Box 105, one is also attaching the entire Structure of Child Boxes of Box 111 at the same point.

It is important to understand that FIGS. 65(a) and 65(b) show the Structure of Data only, but not the Values of the Data. That is, these figures show the various database set connections which can and will be made, in order to store various pieces of data. When it is necessary to store an actual piece of data, the system makes an internal copy of the Structure shown in these figures, and makes the particular database set connections representing the data to be stored.

For example, suppose that a particular entry consists of "John Smith" and "5551212". Then the system generates an internal representation of a Box, associated with Box 113 (not shown in FIG. 65), and the associated Box is connected, by ten lines, to ten Child Boxes (each Child Box representing a character). Thus, the ten connections represent the nine letters and one space defining the name "John Smith". Similarly, the system would generate an internal representation of a Box which is identified with Box 117, and the internal representation would be connected to Boxes representing the digits.

Thus FIG. 65(a) is only a template which shows how the various database set connections are made, but does not show any actual data, i.e. the presence of any actual connections. Any data to be entered will be stored by the system in the form of similar Boxes, internally linked to the Boxes shown.

When data are entered, say, for [Entry], the system internally "sees" a Box, "parallel" to [Entry], and located, as it were, in another dimension. In effect, the presence of data can be visualized as a "shadow" network of Boxes, each Box of the "shadow" network being associated with a Box of FIG. 65(a) or (b), with the Boxes of the "shadow" network being connected only in accordance with the template shown. Thus, the "shadow" network could contain an "Entry" Box corresponding to Box 111, a "Name" Box corresponding to Box 113, and a set of "Character Boxes", corresponding to Box 115, all of the latter Boxes being separately connected to the "shadow" Name Box. A more detailed explanation of the assignment of Values to Data Boxes is given in Section 6.

FIGS. 65(c), 65(d), 65(e), and 65(f) show the Procedure Structure for the Context. Note that all Procedure and Data Structures are considered to be connected to Context Box 101. But, in practice, one cannot fit both Data and Procedure Structure on the same screen. Thus, the Editor is programmed to show one or the other, but not both at the same time. In the example given, there are no Asynchronous Lines in the Procedure Structures. This is equivalent to saying that there is no multitasking in this example.

Figure 65C:
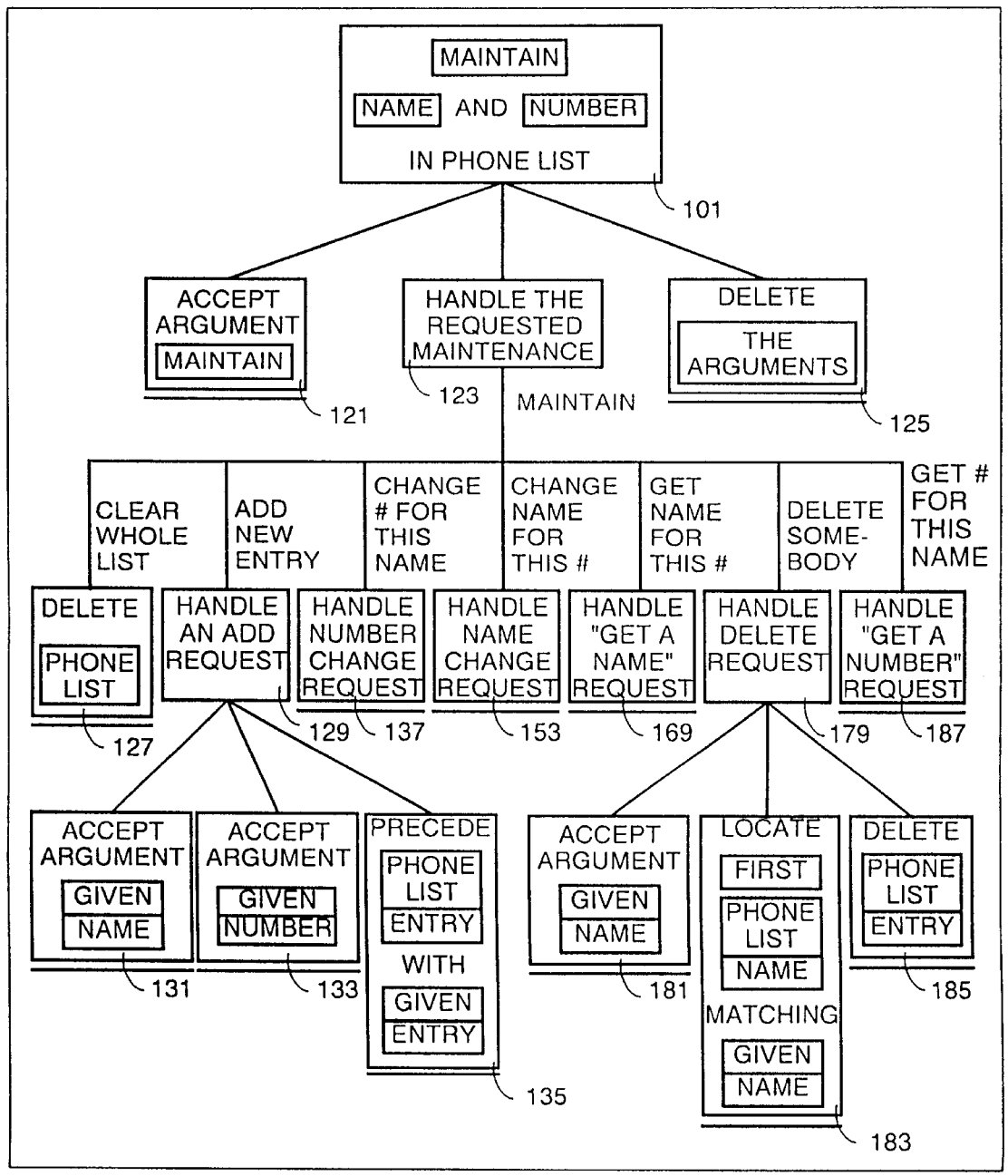
Figure 65D:
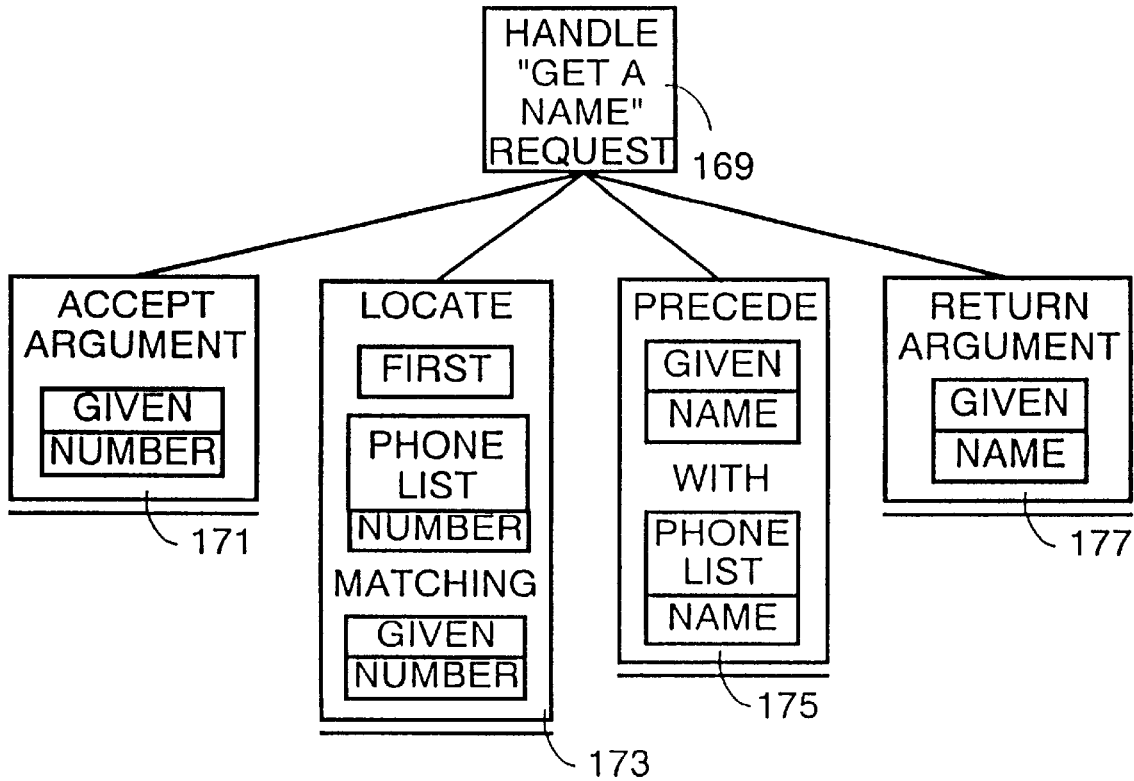

FIG. 65(c) shows that the Context includes three main components. First, there is an Accept Argument Context, in Box 121, which accepts the argument [Maintain]. [Maintain] is as shown in the Data Structure, i.e. in FIG. 65(b). Next, there is Box 123, called [Handle the Requested Maintenance]. The name of the Box is entirely user-selected, and serves as a label only. The definition of the Procedure represented by Box 123 is described below. Finally, there is Box 125, which contains a Delete Context. In this case, all of the arguments, as defined by Box 103 and the Child Boxes of Box 103, are deleted. Note, however, that only the Values accepted into the Procedure are deleted; other values are not affected, and the underlying Structure itself is not deleted.

Box 123 is connected to Boxes 127, 129, 137, 153, 169, 179, and 187, by an Enumeration based on the Value of [Maintain]. This Enumeration operates in a manner similar to that of the "Case" statement in the Pascal programming language. Suppose that the Value of [Maintain] is "[Clear Whole List]". Then control passes to Box 127. Box 127 is the Pre-defined Delete Context, which operates here on the Box [Phone List]. Since [Phone List], represented by Box 109, includes the entire Structure, i.e. includes every Entry, Box 127 deletes all the data in [Phone List]. Note that Box 127 does not affect the underlying Structure itself.

If the value of [Maintain] is "[Add New Entry]", the program executes Box 129. Box 129 is entitled [Handle an Add Request]. The latter is a user-defined label which identifies the Procedure. Box 129 has three Child Boxes, Boxes 131, 133, and 135. In Box 129, the program accepts the argument [Name]. Note that [Name] is a Child Box of [Entry], and since [Entry] appears twice in FIG. 65(a), there are, implicitly, two occurrences of [Name]. To resolve this ambiguity, the system (during the editing session) prompts the user to specify which [Name] is meant. Here, the user has told the system that the [Name] which is meant is the [Name] which is a Child Box of [Given]. The Editor automatically draws the line between "Given" and "Name"; the user never needs to be concerned with drawing the Boxes in this fashion. Note that both [Name]s have the same Data Structure, but that they do not contain the same data.

In Box 133, the program accepts the argument [Number], the latter argument being the one associated with [Given]. In Box 135, the system uses the Precede Context to attach the [Entry] associated with [Given] to the [Entry] associated with [Phone List]. This means that data, in the form of database set connections, are added to the "shadow" structure associated with Box 111 and its Child Boxes. Because no Locate Context was used, the new data are added to the end of the existing list. In this example, the program is not concerned with the order of names in the list. If the order were important, the Locate Context could be used to insert new data at a desired position.

Figure 65E:
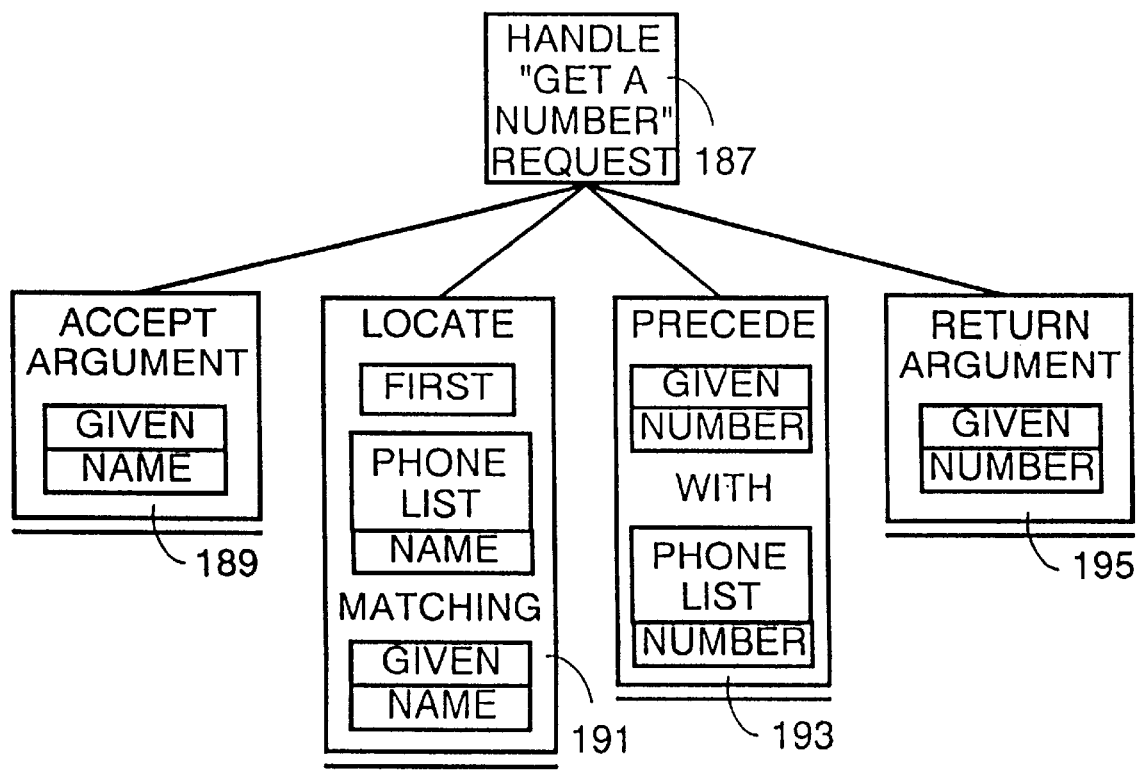

If the value of [Maintain] is "[Change # For this Name]", the program executes Box 137. This Box is labeled "Handle Number Change Request", the latter being a user-defined label. The Child Boxes of Box 137 are shown in FIG. 65(e). The Procedure begins with Box 139, which is [Get Both Arguments]. Again, the name of the latter Box is user-selected. The program executes the Child Boxes, in order from left to right, i.e. Box 141 and 143. In these Boxes, the program makes the arguments [Name] and [Number] available to the procedure. Note that the arguments are the ones associated with [Given], not with [Phone List].

The Procedure continues with Box 145, which is the next Child Box of Box 137. Box 145 is [Replace Old # With New #], the latter being a user-defined label. The Child Boxes of Box 145 are Boxes 147, 149, and 151, which are executed in that order. In Box 147, the program locates the first occurrence of [Name] (belonging to [Phone List]) which matches [Name] belonging to [Given]. If the Locate Context fails, the program will point to a null value. In Box 149, the program deletes the [Number] belonging to [Phone List], located at the current Value. The current Value is determined by execution of Box 147. Then, in Box 151, the program precedes the current Value of [Number] (of [Phone List]) with [Number] of [Given], i.e. with the data that was in the input arguments to the procedure.

Figure 65F:
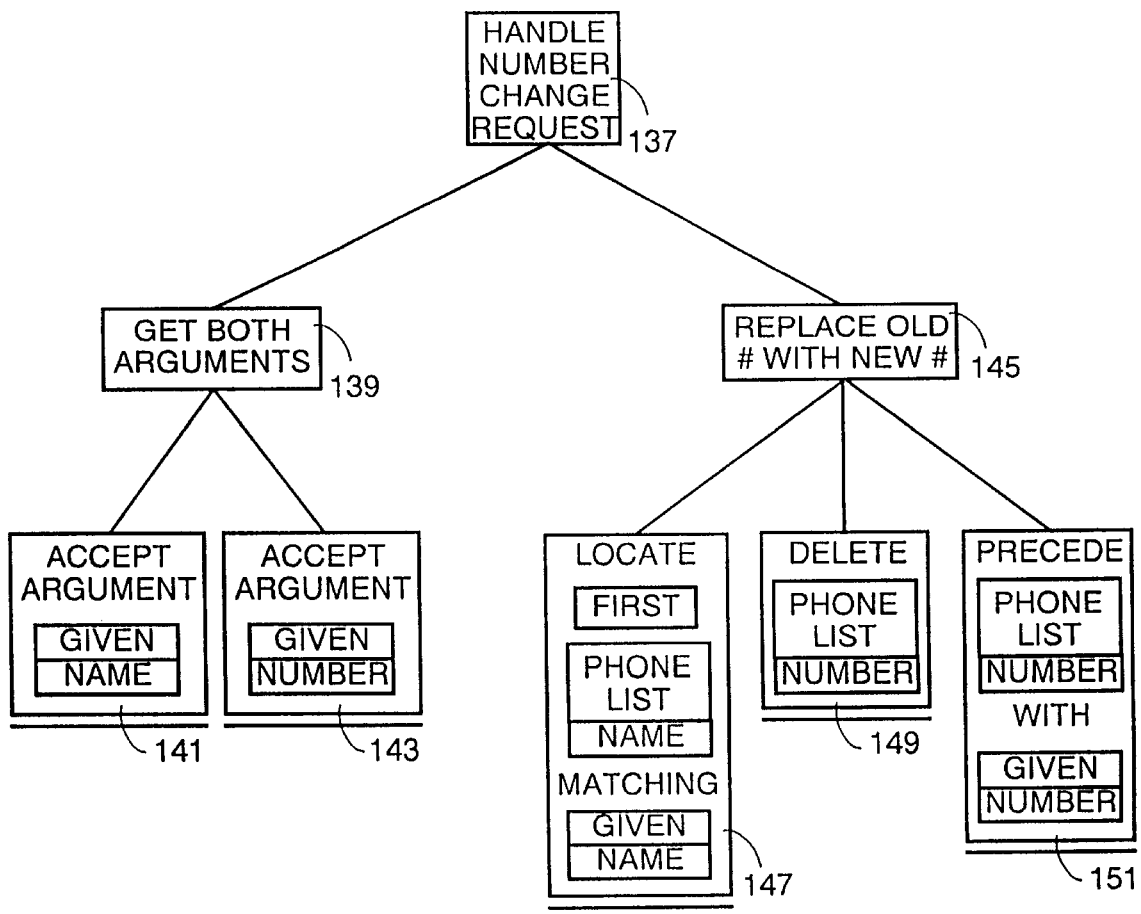
Figure 65G:
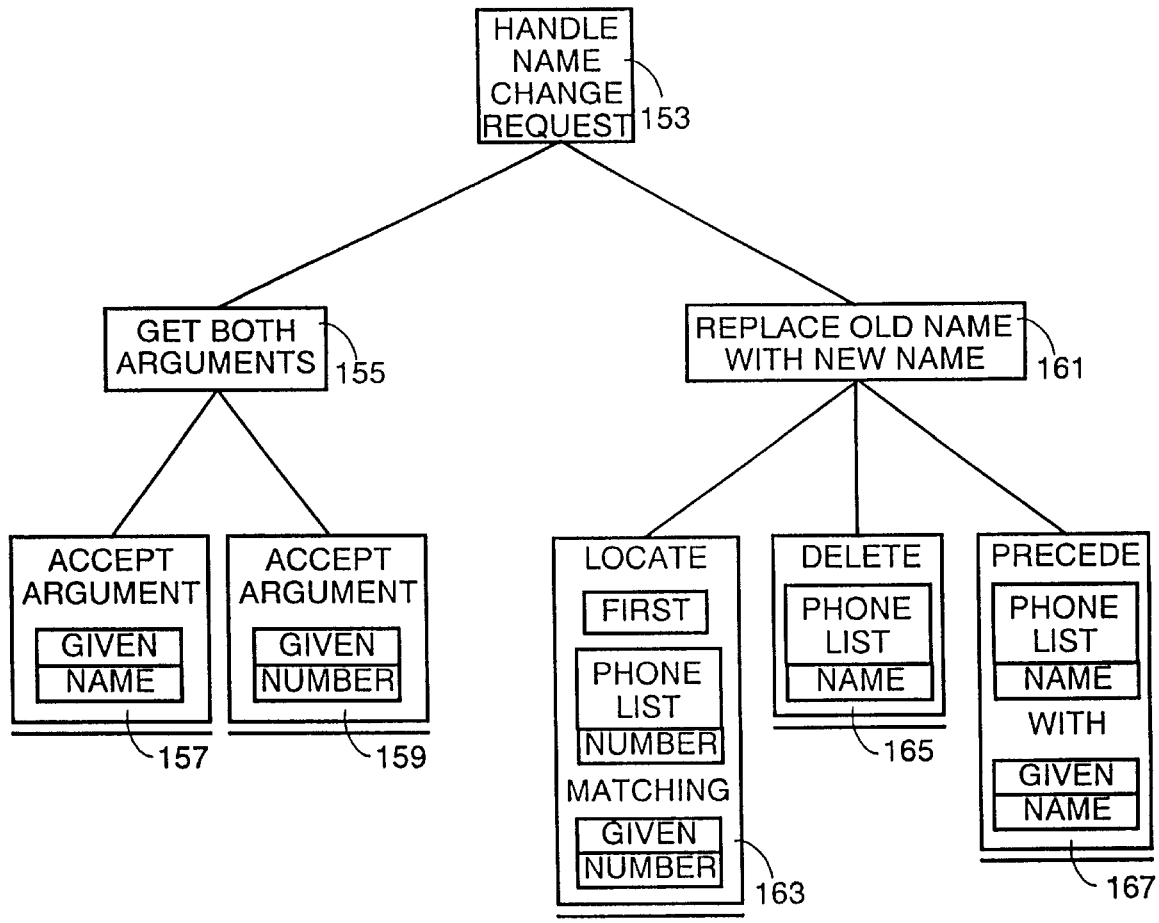

If the value of [Maintain] is "[Change Name for This #]", the program executes Box 153. The Child Boxes of Box 153 are shown in FIG. 65(f). The program first executes Box 155, which accepts the arguments, as shown in Boxes 157 and 159. The program then executes Box 161, the Child Boxes of which are Boxes 163, 165, and 167. In Box 163, the program locates the Value in [Number] (associated with [Phone List]) which matches the Value of [Number] (associated with [Given]). The program deletes the current Value of [Name] (associated with [Phone List]) in Box 165. Then, in Box 167, the program inserts ("Precedes") the argument [Name] (associated with [Given]) into [Name] (associated with [Phone List]).

If the Value of [Maintain] is "[Get Name For This #]", the program executes Box 169. The Child Boxes of Box 169 are shown in the upper half of FIG. 65(d), and include Boxes 171, 173, 175, and 177. It is apparent that the Contexts shown in these Boxes are sufficient to retrieve the desired Value of [Name]. Note that, when Box 169 is first executed, [Given] has no Values; note Box 125 which deletes [The Arguments], including the Value of [Given] every time Context 101 is executed. Thus, when Box 175 places an item into [Given], the item will be the only one. In any event, [Return Argument] will only return the current Value of the argument. Note also that [Return Argument] is necessary for the change in [Name] to be recognized by the calling Context. If [Return Argument] were not used, the calling Context and its Child Boxes would assume different Values for [Given].

If the Value of [Maintain] is "[Delete Somebody]", the program executes Box 179. The Child Boxes of Box 179 are Boxes 181, 183, and 185. It is apparent that the Contexts shown in these Boxes are sufficient to delete the desired Value of [Entry] associated with [Phone List].

If the Value of [Maintain] is "[Get # For This Name]", the program executes Box 187. The Child Boxes of Box 187 are shown in the lower portion of FIG. 65(d), and include Boxes 189, 191, 193, and 195. It is apparent that the Contexts shown in these Boxes are sufficient to obtain the desired Value of [Number] associated with [Given].

After Box 123 has been executed (i.e. after one of Boxes 127, 129, 137, 153, 169, 179, and 187 has been executed), the program continues in Box 125. Here, the program deletes [The Arguments]. That is, the program deletes all Data Values associated with the portion of the Data Structure including Box 103 and its Child Boxes. This completes the description of the Context called [[Maintain] [Name] and [Number] in Phone List].

5.2 The Environment Outside of the Sample Context

In the phone list maintenance example of FIG. 65, the Context is presented as a stand-alone Structure which is callable by another Context. It behaves much like a subroutine in that it needs to be called by another Context. To provide a more complete picture of how the Context is used in a real computer, this section describes the calling Context in narrative form.

In order to provide Arguments from the "real world" for the Context, an ultimate connection to the underlying hardware must be made. This connection is provided by Device-specific Boxes. In this case, a few Device-specific Boxes are needed to accept keystrokes from the keyboard and to display names and phone numbers on a video monitor. This discussion assumes that the phone list Context resides on a small, dedicated personal computer, such as an IBM PC.

The Context in FIG. 65 can be invoked by a calling Context. The Structure of the calling Context is relatively simple. The top Box of the calling Context has no Argument Boxes; it receives its arguments via Device-specific Boxes. For example, it first displays a menu of choices (which correspond to the Child Boxes of [Maintain]) via the [Send Screen Map [ ]] Context. It then accepts the menu choice from the keyboard via [Get [Keystroke] From Keyboard]. After matching the menu choice with a specific Child Box of [Maintain], the Context prompts for the [Name] and/or the [Number] by using the [Send Screen Map [ ]] Context again, and then [Get [Keystroke] From Keyboard] to read in the data. With all of the input parameters now in hand, the Context in FIG. 65, [[Maintain] [Name] and [Number] in Phone List], can be invoked. Outputs, if any, are then displayed by a final usage of the [Send Screen Map [ ]] Context.

An Iteration can be added to the calling Context to allow multiple requests to be made without re-starting the calling Context each time a new request is to be made. For example, after performing a function from the menu, the Iteration can re-display the menu, exiting the loop only on a termination condition such as [Until [Keystroke] [=] [Escape Key]].

In summary, the Pre-defined, Device-specific Boxes are used to prompt for inputs and display the outputs. These inputs and outputs are passed into and out of the Context in FIG. 65.

6. Implementation of the Present Invention

This section presents the detailed design specifications for implementing the environment of the present invention on conventional hardware. The internal architecture of the system is presented here, including a description of on-line and offline data storage, procedure execution, core vs. disk handling, performance tuning, and security considerations. Together, they form a complete description of the design of a fractal information system utilizing von Neumann hardware.

6.1 The Brick: An Introduction

The Brick is the basic building block of the environment of the present invention. It is a piece of storage which is used as the single fractal "curve" of the fractal shape, the "curve" which is selectively replicated to build functional programs and their stored data. The Brick serves as the actual database set connection, the single physical component of the environment of the present invention.

Every Brick has a unique identifying number. These numbers can be assigned in any manner, usually sequentially, as long as all Brick numbers are unique. This number is used by the Hardware to identify specific Bricks which represent specific database set connections.

The term "Hardware" represents the underlying functionality which is required to operate on the Bricks. Some of that functionality is detailed throughout this Section as needed. A full summary appears in Section 7. The required Hardware functions can be simulated in software, or can be performed by custom-designed hardware.

Every Brick is the same size as all other Bricks. Although differing storage media can have differing sized Bricks, this Section assumes, for convenience, that all Bricks are the same size.

Bricks are physically implemented as a block of storage which holds several pointers. A pointer is not a core or disk address. Instead, it is of the same type as the unique number assigned to other Bricks. Thus, Bricks can point to other Bricks because they can hold the unique number of another Brick. It is this pointing which connects Bricks together.

These blocks of memory can reside anywhere: in core memory, on disk, over a communications line, on tape, in another machine, or anywhere else. When they are needed, the Hardware fetches the Bricks from wherever they have been stored.

By using the unique Brick numbers, Bricks can link to each other. The hardware Links two Bricks together by placing the number of each Brick into the other. In this manner, from the point of view of either Brick, it is possible to find the other one; simply provide the Hardware with the number of the desired Brick and the Hardware retrieves it.

Three or more Bricks can be Linked together, too. For example, the first Brick holds the number of the second Brick, the second Brick holds the number of the third, and the third holds the number of the first, thus creating a circular chain. Infinitely long chains of Bricks can be built in this way: each Brick in the chain contains the number of the neighboring Brick. These chains can be made bidirectional, that is, each Brick has not only the number of the succeeding Brick in the chain, but also the number of the preceding Brick in the chain. Thus, each Link contains two parts: a Next Brick pointer and a Prior Brick pointer. For tuning purposes, a Handle pointer is included as well. A Handle pointer points to the Brick associated with the Owner Box of this Brick's Box. See section 6.2.1 for more information on the relationship between Bricks and Boxes.

In summary, a Brick is a uniquely numbered chunk of storage which holds the unique numbers of other chunks of storage. The underlying Hardware locates specific Bricks by using their unique numbers as an identifying key. Bricks are Linked together to represent Structures and Values within the environment of the present invention.

6.2 Use of Bricks in the Present Invention

The Data and Procedure Structures in the syntax of the present invention are represented internally as Bricks. The Bricks are linked together to serve as the database set connections which link the several components of the Structure.

Internally, each Box in a Structure is represented as a Brick. When Child Boxes are added to a Structure, it is a Brick which makes the connection between the Child and Owner Boxes. When a Box Name is entered, the individual characters of the name are connected as Bricks. All Values are built out of Bricks which connect them to their definition. Regardless of the Structure or usage, Bricks represent all of the linkages.

The next sections describe how the Bricks are used to represent Boxes and Lines, including not only the definitions of Data and Procedure, but also the Values associated with them.

6.2.1 Definitions

When a Box is created, the Hardware supplies an unused Brick to represent that Box. From that point on, the Hardware refers to this Brick's unique number whenever the Box is referenced. Because it is used by the Hardware to define a Box, a Brick that represents a Box is referred to as a Definition Brick.

Whenever a Child Box is added to a Structure, it is connected to the Definition Brick. The Hardware Links the Definition Brick to the appropriate Child Brick to represent its ownership.

In practice, a Definition Brick does not appear alone. It usually appears with an Occurrence of that Definition Brick.

6.2.2 Occurrences

Before a Child Box can be Linked to an Owner Box, a Definition Brick must first exist for both Boxes in order to hold the linkage. When an Owner Box is Linked to a Child Box, the Owner's Definition Brick does not Link directly to the Child's Definition Brick. Instead, a third Brick is used to make the connection. This third Brick stands between the Owner's Definition Brick and the Child's. Since it represents the fact that a usage of a Child Box has occurred, it is referred to as an Occurrence Brick of the Child's Definition Brick. Thus, the Owner's Definition Brick Links to the Child's Occurrence Brick. Then, in turn, the Child's Occurrence Brick Links to the Child's Definition Brick.

Figure 66A:
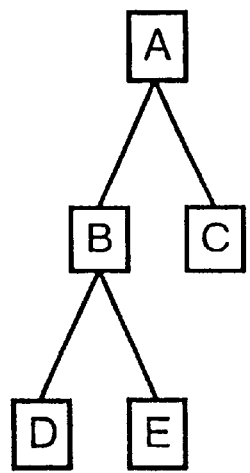
FIG. 66 is a Chart showing a simple structure, and an accompanying diagram illustrating the Bricks comprising the structure.
Figure 66B:
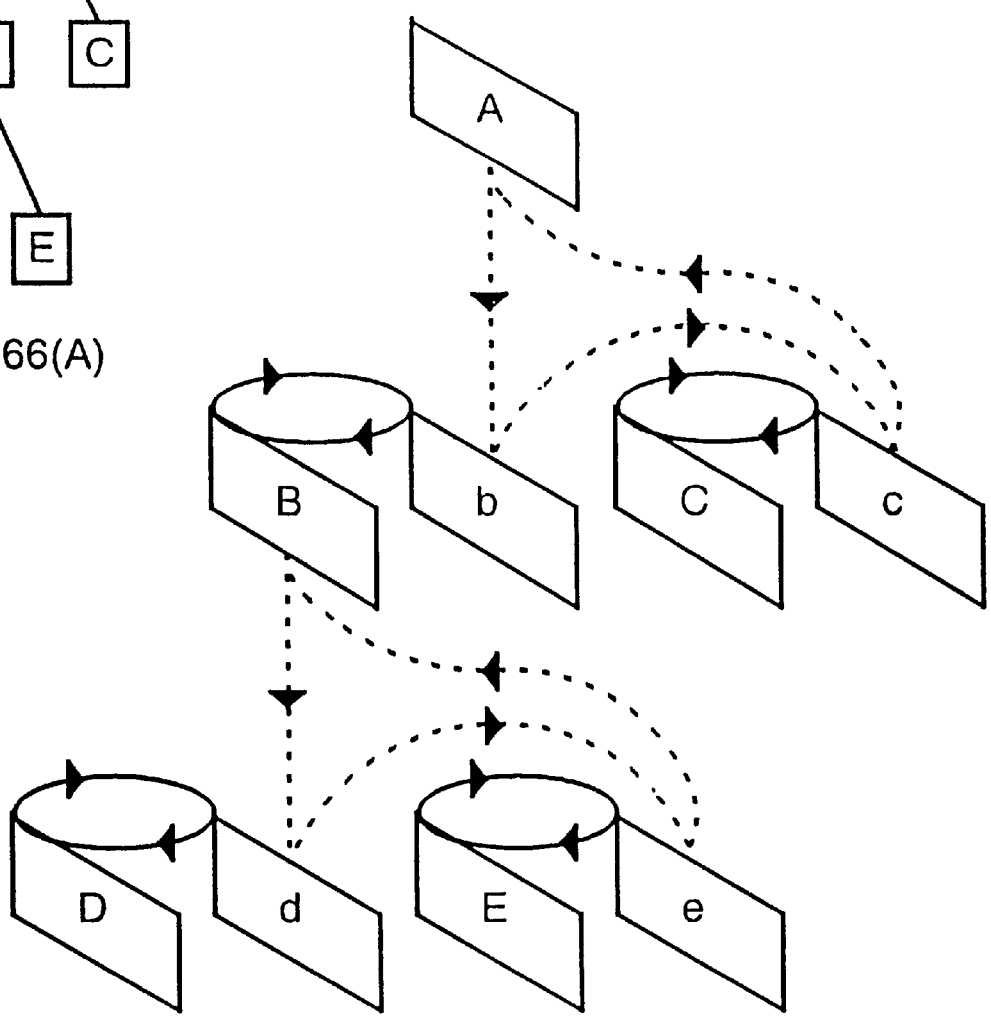

Any Structure, in the present invention, can be built out of Bricks in the same manner, whether Data, Procedure, Directory, or Conditions. FIG. 66 shows the relationships among the varying Definition and Occurrence Bricks for a simple Structure.

In FIG. 66, parallelograms represent Bricks. A capital letter indicates that the Brick represents the Definition Brick for the Box of the same name (for FIGS. 66 and 67 only). A small letter indicates that the Brick represents the Occurrence Brick for the Box of the same name (for FIGS. 66 and 67 only). Dashed lines indicate Links between an Owner Definition Brick and a Child Occurrence Brick (for FIGS. 66 through 70). Solid Lines indicate Links between an Owner Definition Brick and its own Occurrence Bricks (for FIGS. 66 through 70).

Figure 67A:
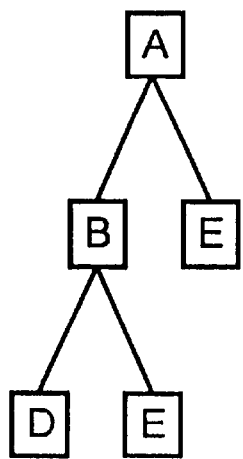
FIG. 67 is a Chart and diagram similar to FIG. 66, but wherein Box [C] of FIG. 66 has been replaced by Box [E].
Figure 67B:
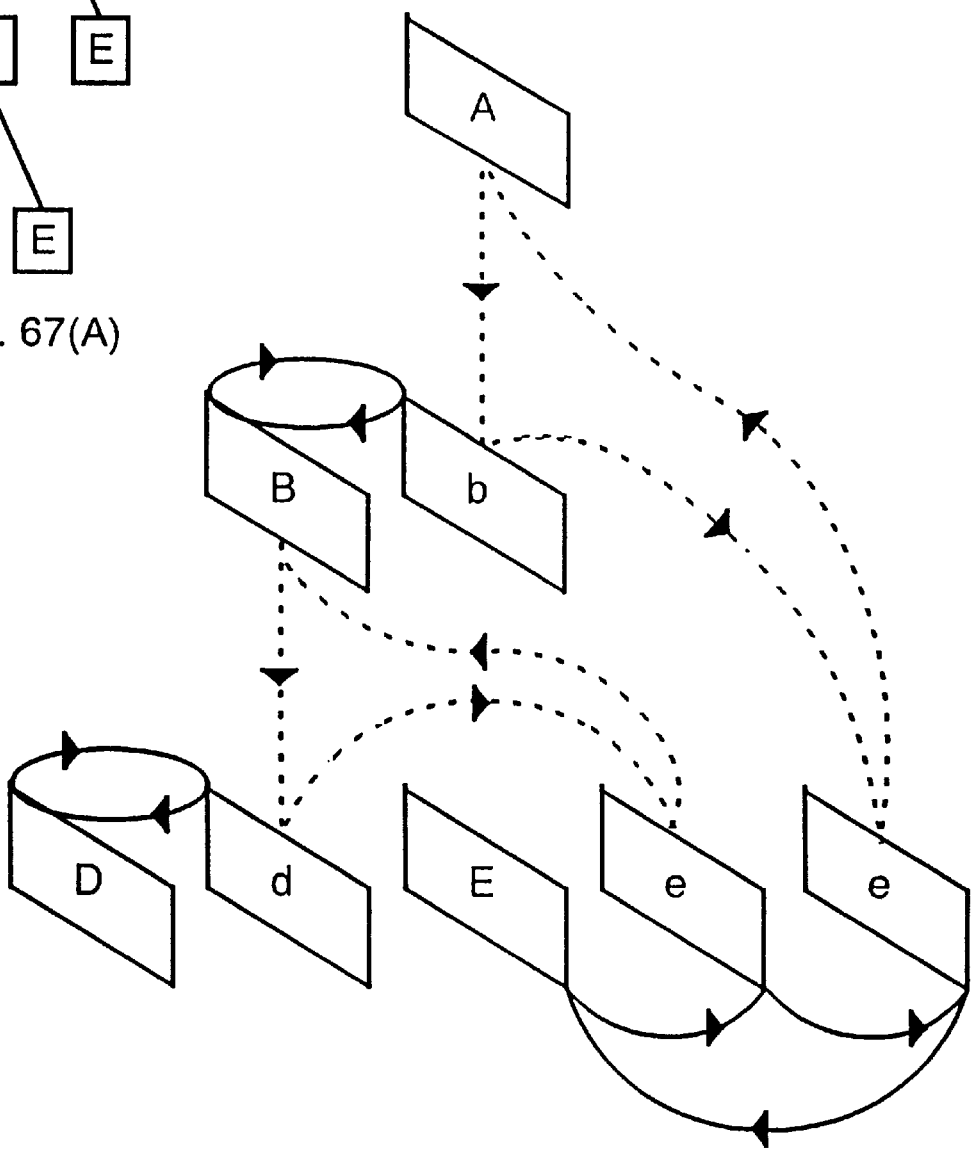

To show more clearly the relationship between an Occurrence and its Definition, the Structure of FIG. 66 can be modified slightly. The Box [C] can be replaced in the Structure with the Box [E]. In this case, the Box [E] is used twice, thus it has two Occurrences for the single Definition. FIG. 67 reflects the internal Links for the modified Structure.

Note that in FIG. 67, Box [E] has only a single Definition Brick but multiple Occurrence Bricks. As more and more Owner Boxes connect to [E], more and more Occurrence Bricks will be Linked to the single Definition Brick. In this way, should the Child Boxes of [E] be changed in any way, all Owner Boxes of [E] would be "aware" of the change instantly, systemwide, and without further modification to the Structure.

Internally, the Box Name is Linked with the Definition rather than the Occurrence. In this way, should the Box Name be changed, the change would occur systemwide instantly merely by changing the Name associated with the Definition. The Box Name itself is represented as Bricks, that is, the Structure Definition Brick is linked to the Occurrence Bricks of each character in the Box Name. Thus, even the Box Name is represented as Bricks. To keep the complexity of the examples to a minimum, the Links for these letters are not drawn. Rather, they are enclosed in the parallelogram for clarity. This representation does not imply that the characters of the Box Name are not Linked Bricks; on the contrary, they are Linked Bricks.

6.2.3 Bricks and Assigning Values

So far, Bricks have been used to represent Structures of the present invention. But Bricks are also used to represent the Value associated with Data Structures in a manner which is analogous to the method used to hold the Structure.

In the environment of the present invention, the only operations that can be performed on Data Values are database set operations, specifically, Locate, Precede, and Delete. This set of operations also applies to Bricks, but, to avoid confusion, they are referred to as Get, Link, and Unlink, respectively, when used on the Brick level.

6.2.3.1 Assigning a Single Value

Figure 68A:
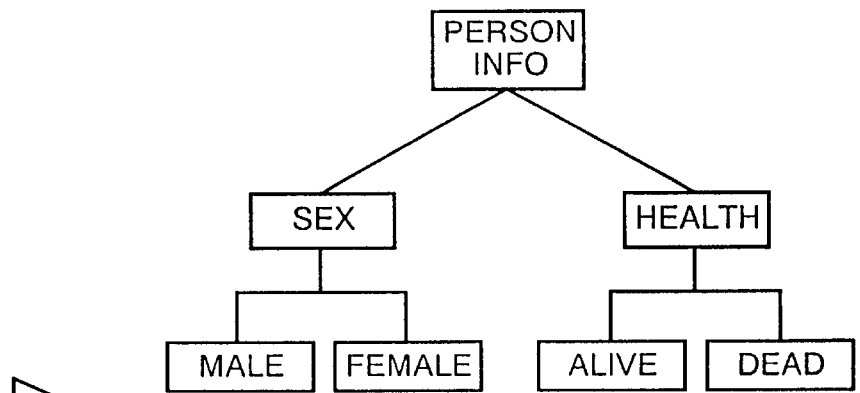
FIG. 68 is a Chart showing a data structure, and a diagram showing the representation of that structure as Bricks, illustrating the assignment of values to such structure.
Figure 68B:
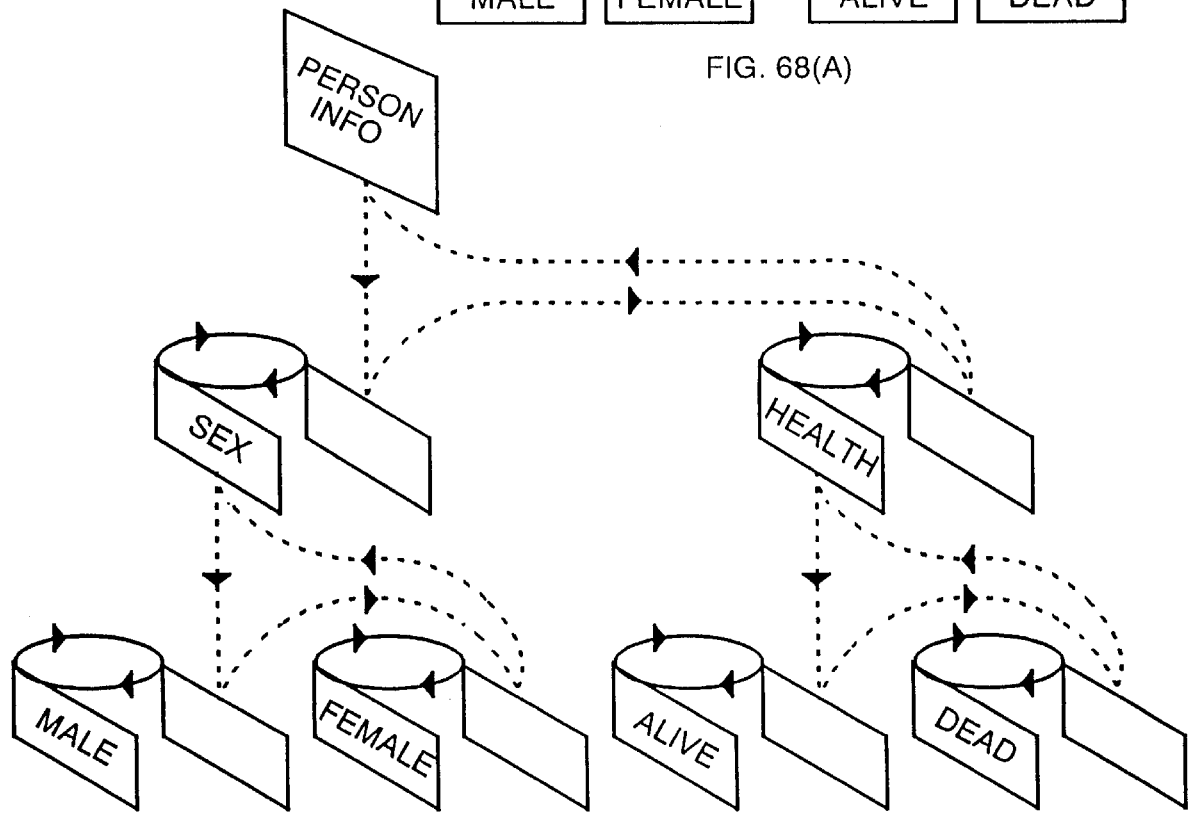

In order to demonstrate the representation of Values as Bricks, part of the Data Structure in FIG. 68 can be assigned a Value. FIG. 68 contains a simple Data Structure and its internal representation as Bricks.

Starting with this example, the convention of using the lower-case letter to represent an Occurrence Brick is omitted. Thus, all Occurrence Bricks are devoid of characters.

Note that in FIG. 68, there is no internal difference between an Enumerative Line and a Synchronous Line; both are represented in the same manner. Note that in a Data Structure, the lowest-level Boxes are automatically connected as Enumerative Lines. Enumerative Lines cannot be sprinkled throughout a Data Structure, but may be placed only at its lowest level. While it is theoretically possible to modify the system to accept higher-level Enumerations, it is usually true that the need for a high-level Enumeration is a sign that the programmer has not fully analyzed the problem. The rule barring high-level Enumerations makes programs using the present invention much easier to code, and simplifies the internal code generated by the system.

Figure 69:
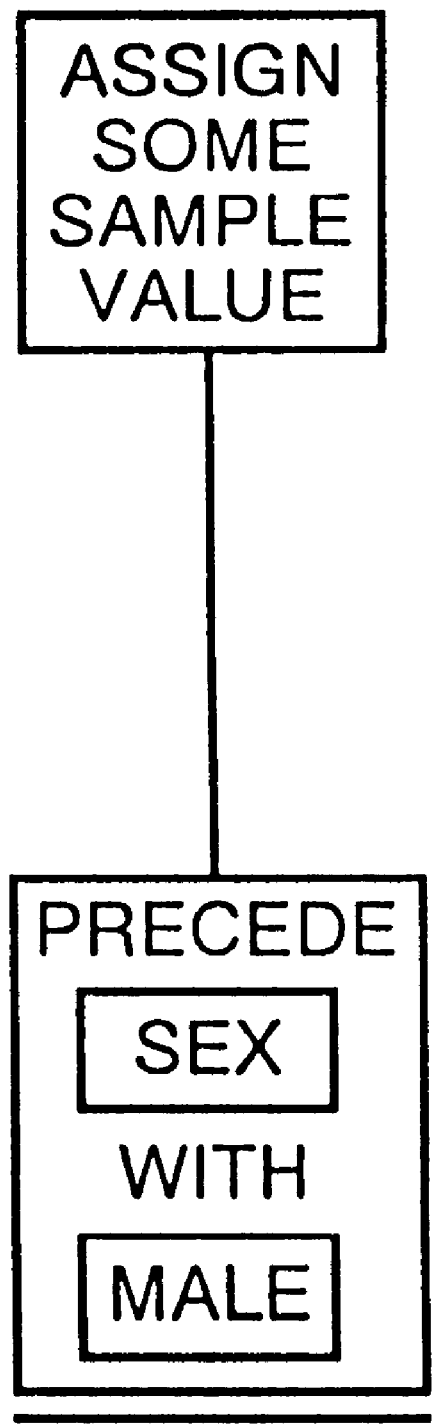
FIG. 69 is a simple Chart showing the Procedure Structure which assigns a sample value to the structure of FIG. 68.

Having defined a Data Structure using Bricks, the next step is to assign some Values to it using Bricks. The Procedure Structure in FIG. 69 is used to assign Values to the Data Structure of FIG. 68.

When the Procedure is executed, the Value [Male] is associated with [Sex]. Internally, this association is represented by Linking Bricks to the Occurrence to serve as its Value. Values are Linked in the same manner as Structures. In defining a Structure as Bricks, two Bricks are used to define a single Box, namely, the Definition and the Occurrence. Using two Bricks instead of one allows multiple Owner Boxes to connect to the same Child Box. Similarly, this idea of two Bricks is carried over into the realm of Values.

In order for a single Value to be Linked to several different Structures, the concept of Definition and Occurrence Bricks can be used to represent the presence and usage of a Value, respectively, just as the Definition and Occurrence Bricks of the Structure are used to represent the presence and usage of a particular Box.

Figure 70:
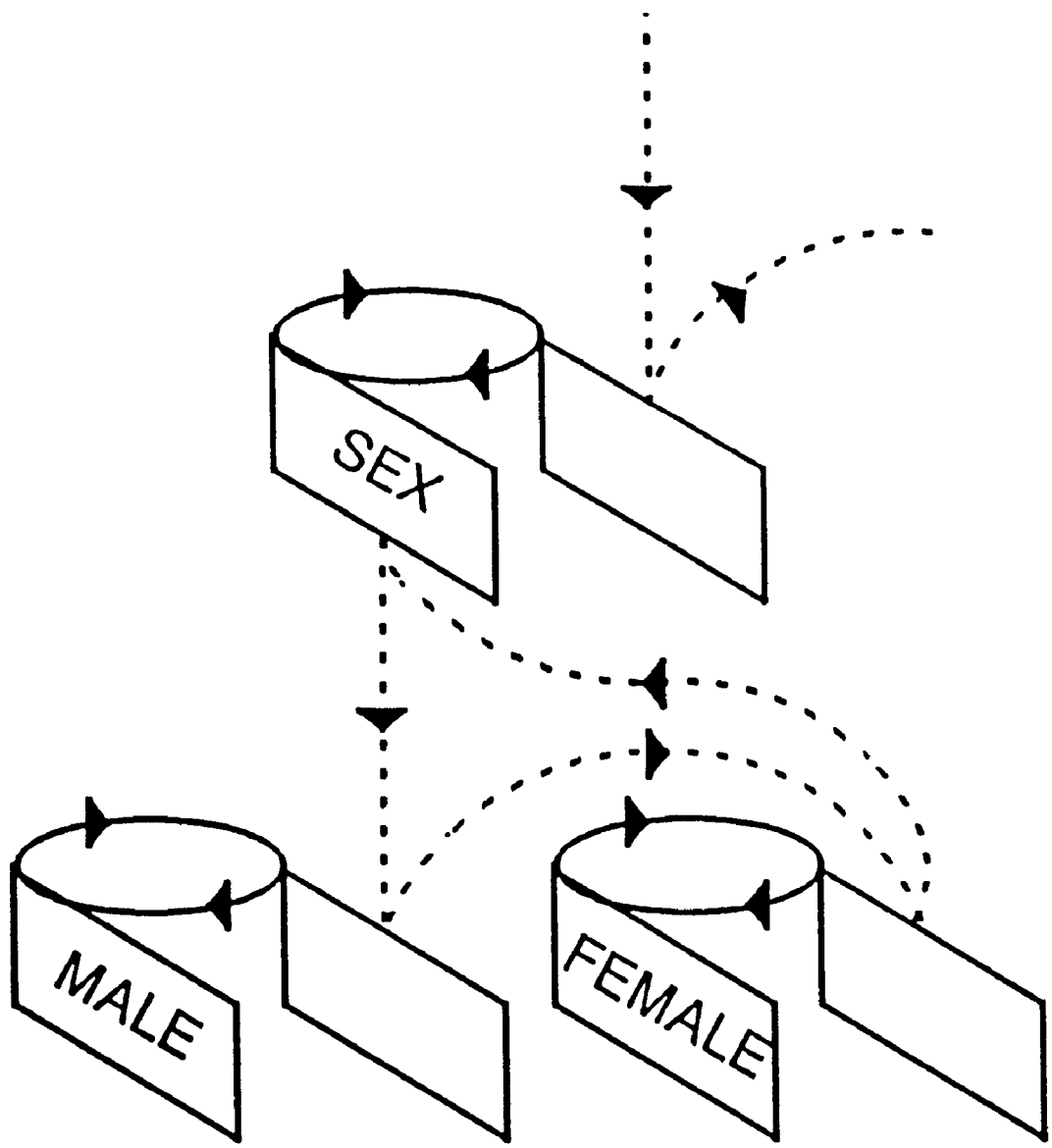
FIG. 70 is a diagram showing the Brick representation of a portion of the Data Structure of FIG. 68, before execution of the Procedure of FIG. 69.
Figure 71:
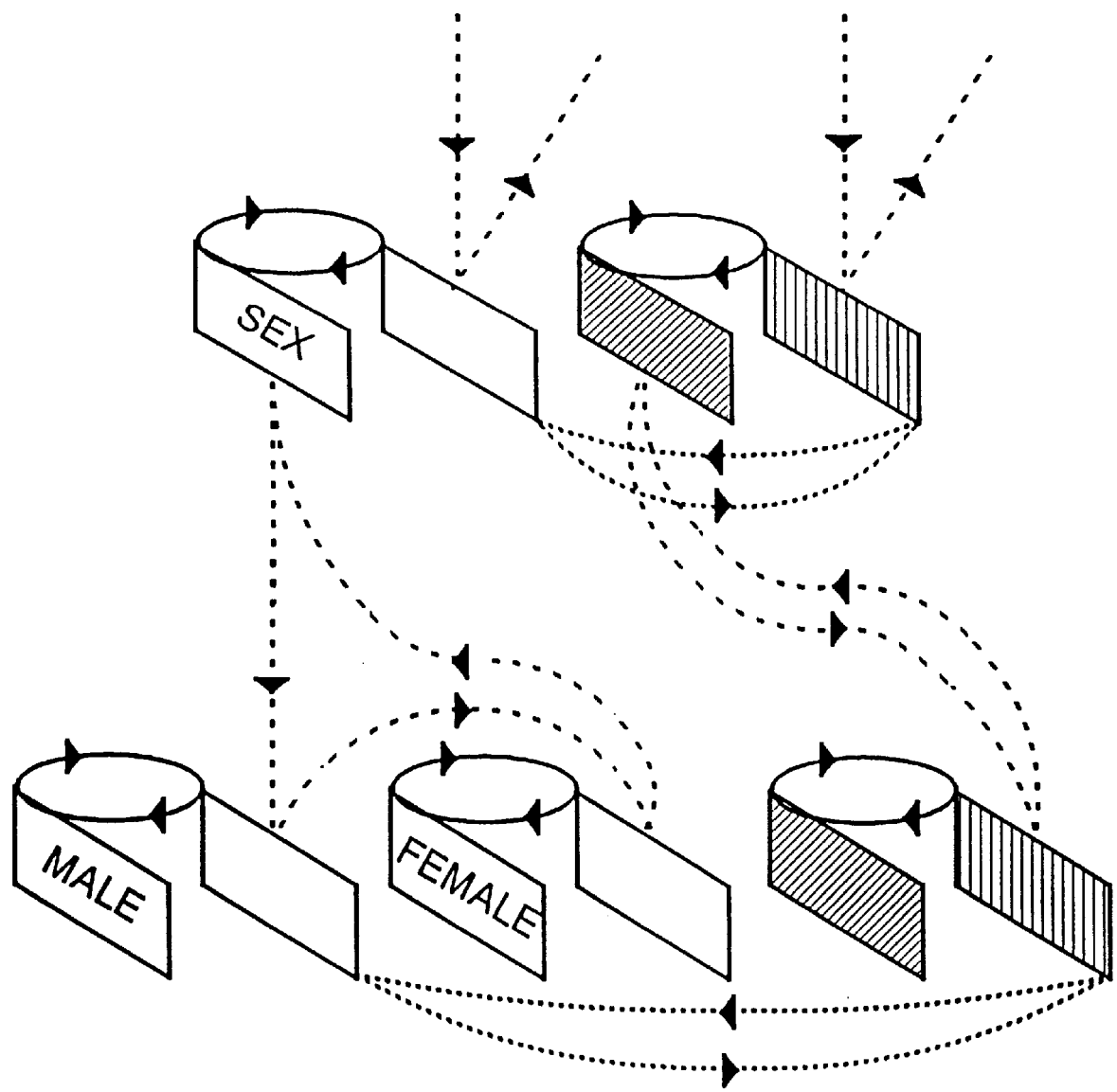
FIG. 71 is a diagram showing the Brick representation illustrated in FIG. 70, after execution of the Procedure of FIG. 69.

FIGS. 70 and 71 demonstrate the above analogy by presenting the internal linkage of Bricks both before and after execution of the [Precede [Sex] with [Male]] Procedure Box.

Note that, in FIG. 70, a Structure's Definition Brick is represented as a parallelogram enclosing the Box Name; a Structure's Occurrence Brick is represented as an empty parallelogram; dashed lines indicate the Link between an Owner Definition Brick and a Child Occurrence Brick; and Solid Lines indicate Links between an Owner Definition Brick and its own Occurrence Brick. In FIG. 71, the above definitions apply. Also, in FIG. 71, a Value's Definition Brick is represented as a parallelogram filled with diagonal bars; a Value's Occurrence Brick is represented as a parallelogram filled with a checkerboard pattern; and dotted lines indicate the Link between the Box in the Structure and the Value associated with that Box.

FIGS. 70 and 71 show the internal linkage of Bricks both before and after execution of the [Precede [Sex] with [Male]] Procedure Box. Value Bricks are Linked to the Structure's Bricks as well as to other Value Bricks. The Brick representations of Structure and Value mirror each other; each has a Definition Brick to which Occurrences can be Linked.

Note that in inserting a Value, as shown in FIG. 71, a pair of Bricks (i.e. Value Definition and Value Occurrence) are Linked not only to the Structure Occurrence for the variable being assigned a Value (as shown by the dotted lines), but also to all of the other Data Structure Occurrence Boxes through the chain, up to the Top Box of the Context. This is why FIG. 71 shows a pair of Bricks attached to the Structure Occurrence Brick for "Male" and another pair of Bricks attached to the Structure Occurrence Brick for "Sex". The Bricks above "Sex" are not shown in FIG. 71. The Links to the Bricks representing higher-level Boxes indicate that a Value has been assigned to this Structure.

FIG. 71 also illustrates an important point, namely that there are four types of Bricks. There is a Structure Definition Brick, a Structure Occurrence Brick, a Value Definition Brick, and a Value Occurrence Brick. In FIG. 71, the Definition Bricks for both Structure and Value are shown to the left of their respective Occurrence Bricks.

6.2.3.2 Assigning a Second Value

Figure 72:
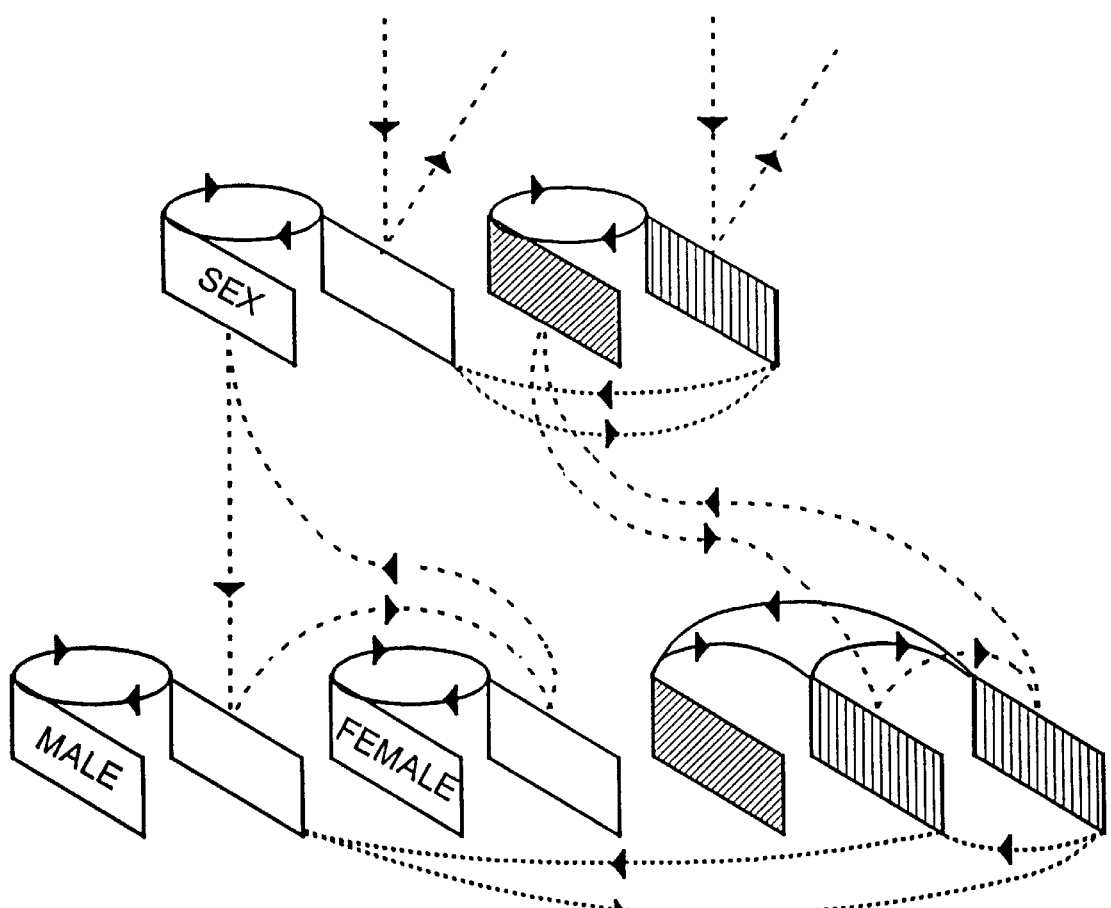
FIG. 72 is a diagram showing the Brick representation of FIG. 71, after a second execution of the Procedure of FIG. 69.

This section shows the different Links that are required when a second Value is assigned for the same Box. FIG. 72 illustrates the case where [Person Info] has more than one [Sex] (certainly a hypothetical situation). This section describes the method which is used internally to handle the one-to-many relationship, the Asynchronous Data Line.

Because a Value is Linked to the Structure, adding new Values is trivial; Values are merely linked into the existing chain. Thus, there is no reason prohibiting a second execution of the Procedure Structure of FIG. 69. If the Procedure is executed a second time, the internal Brick arrangement appears as shown in FIG. 72. The only difference between FIGS. 71 and 72 is that there is another Brick attached to the previous Value Brick. Note that no further Brick has been added to either of the Value Bricks associated with [Sex].

The ability to hold multiple Values for any Box, such as [Sex] in the last example, implies that all lines in a Data Structure are Asynchronous Lines, even Enumerative Lines. Every Data Box, regardless of the type of Line to which it is connected, can hold an infinite number of Values.

Despite the above capability, all Lines in the present invention are not implemented as Asynchronous Lines. To provide greater clarity for the programmer, the Synchronous Line type is introduced. Internally, a Synchronous Line is identical to an Asynchronous Line except that some of the pointers in the Brick are "blocked" so that the Brick cannot Link to multiple Data Values. This lack of the ability to Link is, by definition, the lack of multiple Values for a Box. Thus, a blocked Data Value Brick Link indicates a Synchronous Line; normal Linking ability indicates an Asynchronous Line.

In theory, there is no reason to block out multiple Values at any level of a Data Structure. In practice, too, there is no reason except to allow the programmer to document the known one-to-many relationships versus the one-to-one relationships. Even with all Data Values unblocked, an executing program does not operate differently; database set operations are still used regardless of the number of possible Values.

Figure 73:
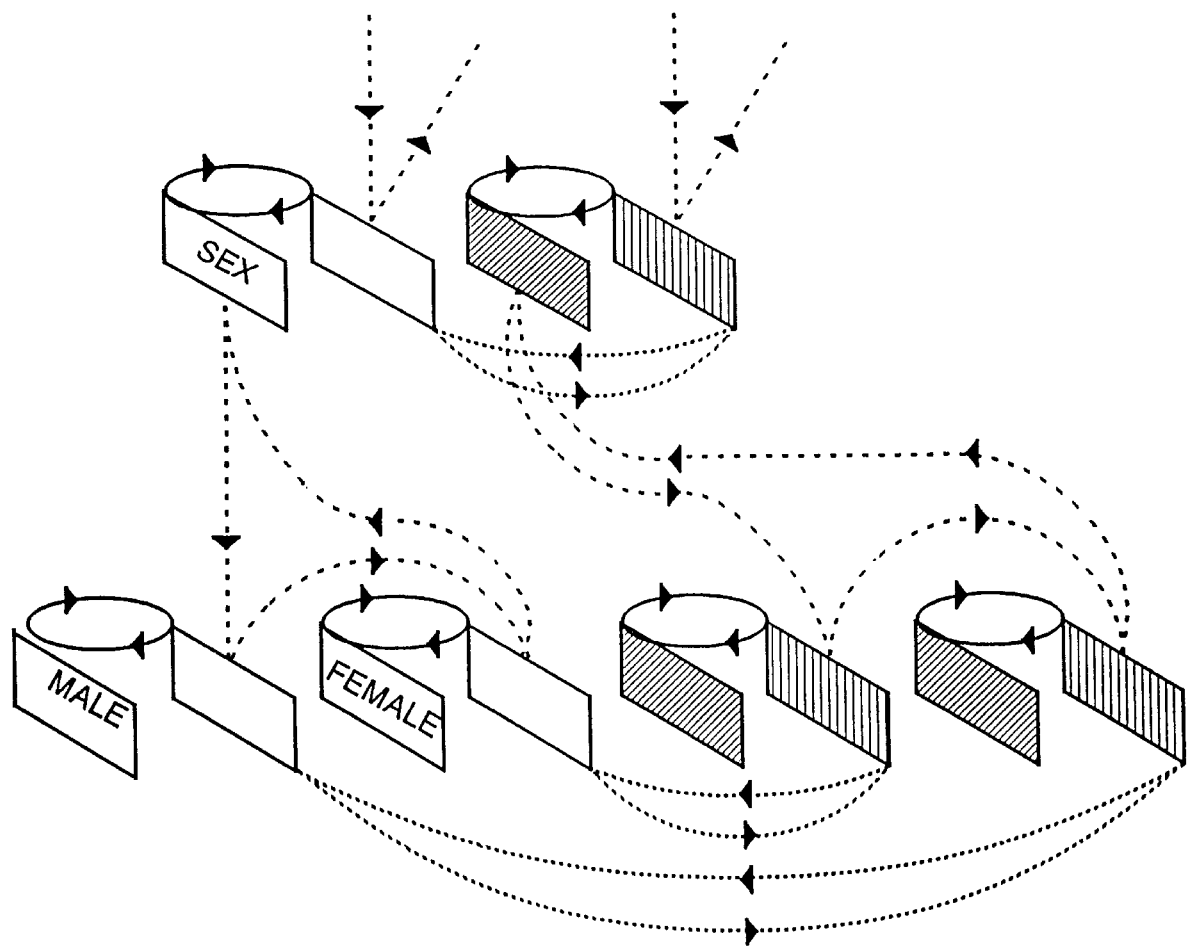
FIG. 73 is a diagram showing the Brick representation of FIG. 70, after execution of the Procedure [Precede [Sex] with [Male]] and then [Precede [Sex] with [Female]].

A third example of Data Value Links is presented in FIG. 73. It is based on FIG. 70, but instead of re-executing [Precede [Sex] with [Male]], this time, the Procedure Box [Precede [Sex] with [Female]] is used for the second execution. Rather than showing the Linkage between two [Male] Values, the example shows the Linkage between a [Male] and [Female] Value. It shows that [Sex] has two Values, [Female] preceding [Male]. Note that the order of the Bricks is critical. A Brick is inserted at the "current" location. The Precede Context inserts an entry at the current location. The current location can be altered with the Locate Context, as discussed above.

6.2.4 Inside a Brick

Having represented Data Structures with multiple Values using only Bricks, a closer look into the physical Structure of a Brick is helpful.

Figure 74:
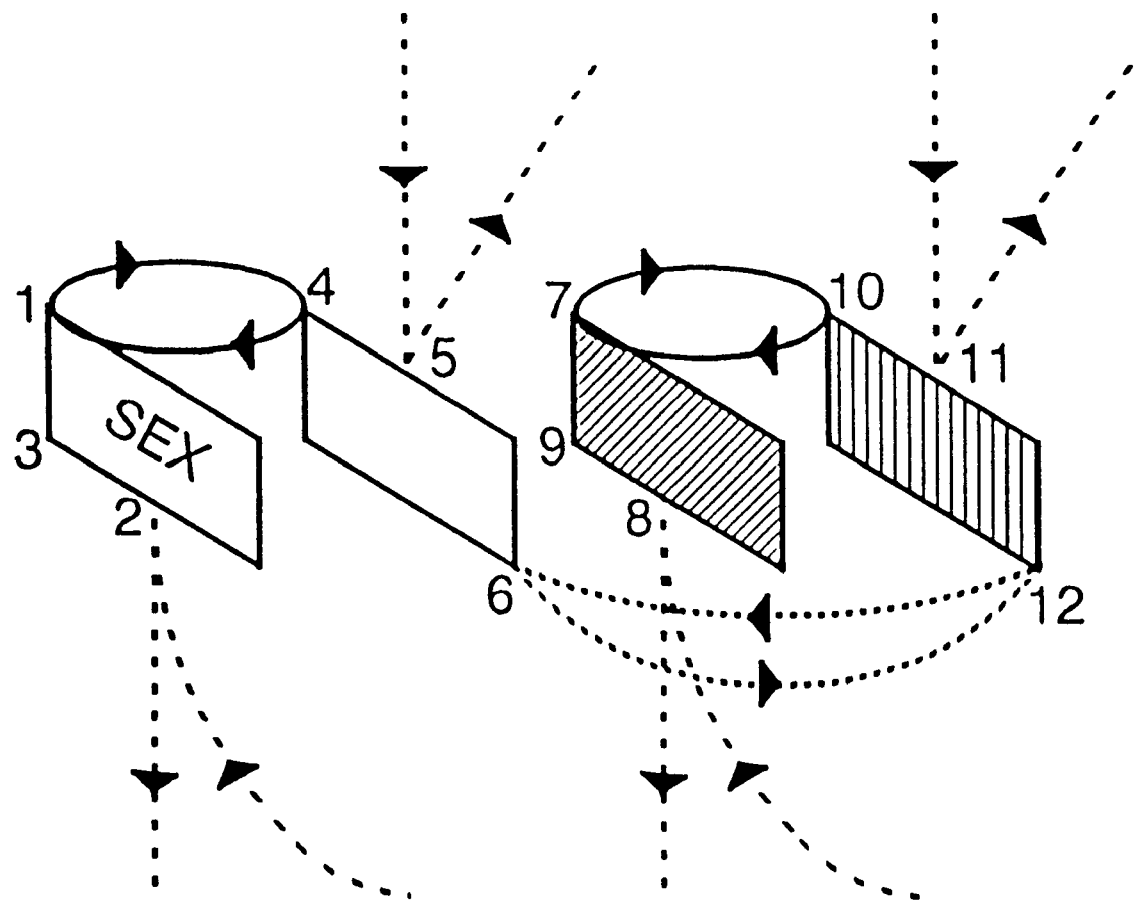
FIG. 74 is a diagram showing the links in which each Brick may participate.

A Brick is a piece of physical storage which holds the unique numbers of other Bricks. For identifying purposes, it also holds its own unique number. By study of a particular example, one can determine the number of Links in which a Brick can participate simultaneously. FIG. 74 extracts a portion of FIG. 73, labeling the various links in which each Brick participates.

In FIG. 74, the Links can be identified as follows:

Links to/from the Structure Definition Brick:
    1=Structure Definition to its own Structure Occurrence
    2=Structure Definition to Child Structure Occurrence
    3=Structure Definition to Box Name Links to/from the Structure Occurrence Brick:
    4=Structure Occurrence from its own Structure Definition
    5=Structure Occurrence from its Owner's Structure Definition
    6=Structure Occurrence to its Value Occurrence Links to/from the Value Definition Brick:
    7=Value Definition to its own Value Occurrence
    8=Value Definition to its Child Value Occurrences
    9=Links to execution Currency Brick (see below)

Figure 75:
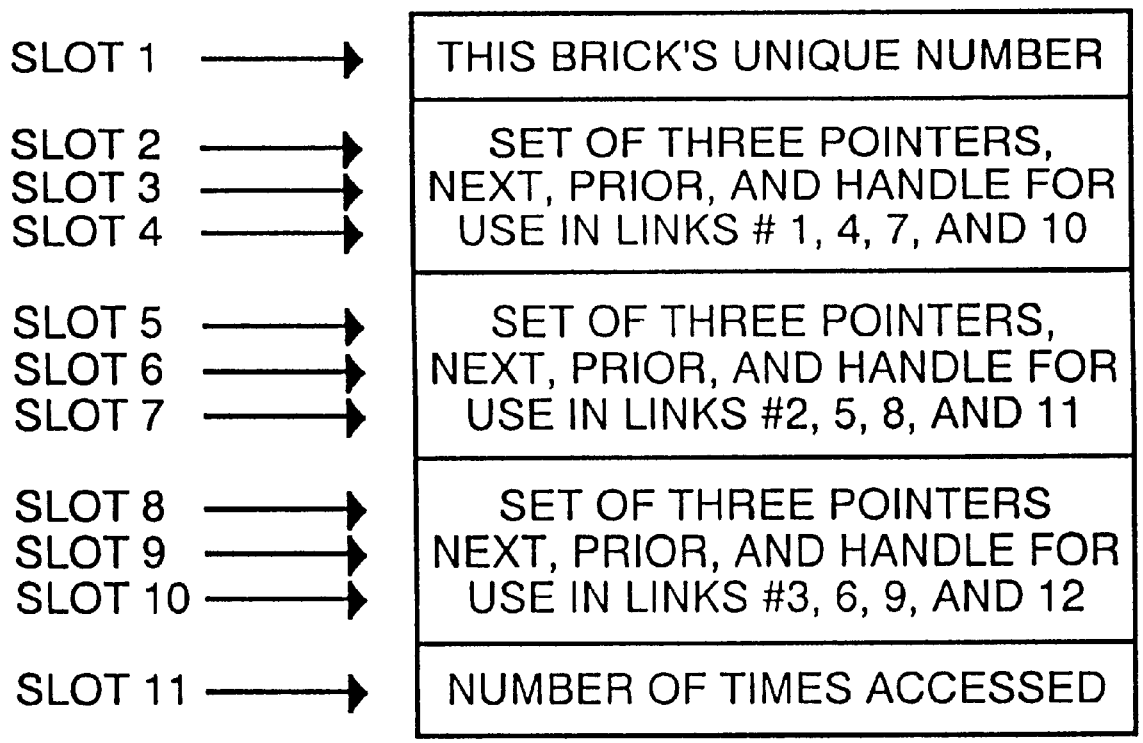
FIG. 75 is a diagram showing the physical layout of a Brick in memory, and showing the pointer usage for linking and tuning.

Links to/from the Value Occurrence Brick:
    10=Value Occurrence from its own Value Definition
    11=Value Occurrence from its Owner's Value Definition
    12=Value Occurrence from its Structure Occurrence Bricks participate in three Links each. The three Links, for each of the four types of Bricks, are as shown above. Thus, a Brick holds up to ten pointers: three sets of Next/Prior/Handle pointers (one per Link) and one pointer containing the Unique number of the Brick itself. To assist in the automated tuning process, an eleventh slot is reserved in the Brick to hold the count of the number of times that the Brick was assessed (cf. Section 6.7, Tuning Considerations). FIG. 75 shows the in memory with all eleven slots.

From diagrams such as FIGS. 70 and 71, one can see that the dotted dashed, and solid lines all form closed curves. This means that it is always meaningful to speak of the "Next" Link or the "Prior" Link. Even if there were only one Child Box (i.e. if "Female" did not exist in FIG. 70), the "Next" and "Prior" pointers, for the Link represented by the dashed line, would still have meaning: the Structure Occurrence Brick of "Male" would point to the Structure Definition Brick of "Sex", and the Structure Definition Brick of Sex would point to the Structure Occurrence Brick of "Male". Thus, the "Next" and "Prior" pointers always have meaning, even when Linking to only a single Brick. The arrows in FIGS. 70, 71 etc. point from the "Prior" Brick to the "Next" Brick.

The "Handle" pointer has a meaning which varies slightly according to the type of Brick. The "Handle" pointer is somewhat analogous to the concept of ownership of a Box; indeed, the relationship between Owner and Child Boxes is established by assigning the correct Link to the Handle pointer of a Brick. In the case of a Structure Definition Brick, or a Value Definition Brick, which by definition have no "higher" Brick (see, e.g. FIG. 74), the Handle pointer of this Brick points to itself. In the case of a Structure Occurrence or Value Occurrence Brick, the Handle pointer points to the next higher Brick (see FIG. 74, Links 5 and 11).

Given that there are eleven pointers in each Brick, the next issue is the size of each pointer in the Brick. The pointer size is the critical factor in determining the total number of Bricks which the environment of the present invention can handle. For example, if each pointer were a normal 16-bit binary number, then there could only be 65,535 Bricks that could be uniquely identified.

In actual usage, the size of the pointer is determined by the number of Bricks which are required to be simultaneously Linked within the environment. For example, a small "demo" environment using 8-bit pointers could be built which would allow a user to operate the system on a small scale. The 8-bit pointer size limits the number of possible Bricks in the environment to 256. On the other hand, if a giant database is needed, a 32-bit pointer can be used, providing several gigaBricks of storage.

Controlling the size of the Brick pointers provides a measure of control over the process of upgrading to larger environments. The 8-bit "demo" environment supplies a sufficient number of Bricks to begin to operate the system, but only for a short time. As the user's database grows, extra bit positions are needed to increase the bandwidth of the pointers to increase the capacity of the environment. This means that small environments do not need to pay the penalty of unused bit positions, and large environments are never stifled. The ultimate size of a Brick is hardware dependent; if the memory to hold it exists, then the Brick pointer size (and the environment) continues to grow.

Regardless of their pointer size, Bricks can be exchanged between environments. Interfacing a larger-pointer environment with a smaller one is dependent on the direction of the interface. Larger environments could easily accommodate the Bricks from a smaller one by simply zerofilling the unused bit positions. This allows an easy upgrade path. But smaller environments could not accommodate Bricks from larger ones without the potential for losing some Links. A small environment would first need to enlarge its pointer size before it could withstand the load of the added Bricks. For more information on altering the size of a Brick pointer, refer to Section 6.4.4 and 6.4.5, Adding and Removing Bricks.

6.2.5 Bricks and Procedure Values

Procedure Structures can be built from Bricks, just as Data Structures are; they are identical in every respect. Values are Linked to Procedure Structures, as well.

A Value is Linked to a Procedure Box to indicate that the Box (or a Child Box) is executing. When a Context execution is begun, a Value is Linked to the top Context Box in the same manner as a Data Value is Linked to its Data Structure.

When the first Child Box of the top Context Box is executed, the Value Brick is un-Linked from the top Box and Linked to the Child Box. As execution continues, the Procedure Value Brick is Linked to each Box in turn, un-Linking from the previous Value.

In this way, the environment of the present invention always knows where an execution is currently located because a Procedure Value is Linked onto the Procedure Structure. An infinite number of Values can Link simultaneously to any Box; this gives the present invention its multitasking capability. To start an independent task, all that is needed is to Link a Brick as a Procedure Value.

Procedure and Data Structures and Values are represented with Linked Bricks. Internally, the representations each mirror the other. However, when a Procedure Structure is constructed from Bricks, there is an apparent difference from Data Structures, that is, the ability of Procedure Structures to have a Box as a part of the Box Name (such as Context Argument Boxes). In such a case, the Bricks which represent the Context Argument Boxes are simply Linked into the middle of the Box Name at the appropriate spots. Since the characters of the Box Name and the Argument Box itself are both represented as Bricks, they can be Linked together just as any other Brick could be. In this way, Boxes can be used in parts of the Box Name as easily as characters.

Since any one Brick can represent any one Box, anything can be represented in a Context Argument Box. This implies that entire databases can be passed as Arguments into and out of Contexts with the same ease as a single character.

Since an Argument Box Name contains character Bricks, it follows that Boxes can be created within Box Names within Box Names, allowing operations to be performed on variables whose identities are determined at execution time (rather than at compile time as is true for a conventional programming language). Increased Box Name/Box nesting levels permits variable lists of variables to be passed as Arguments. Taken to extremes, a Context Box could pass itself as an Argument into itself, creating an instant infinite recursive invocation, although such an endeavor may not serve any useful purpose. Regardless of its utility, the capability is present.

6.3 Locating Physical Bricks

A Brick is a physical chunk of storage which resides in a memory device. Each Brick has a permanent address somewhere in storage where the Brick is kept when it is not in use. In practice, a Brick's permanent address is usually on a disk or other on-line device so that the Brick is readily available when needed.

One of the underlying functions of the Hardware is its ability to fetch a Brick from slower memory, such as disk, for use by a Context. The fetching of a Brick can be performed by custom-designed Hardware, or by a software simulation.

In simulating the fetching of Bricks, the Bricks are stored in relative files as supported by the host operating system. A Brick is treated as a single record in one vast relative file which is keyed by its unique Brick number. Thus, the first record holds Brick number 1, the thirty-third record holds Brick number 33, etc.

Many operating systems already provide for accessing individual disk records by using their record numbers as a key; the latter can be done even with the MS-DOS operating system on a personal computer. However, few of these operating systems allow for a single file spanning many physical devices. For those that do support a single vast relative file, Bricks are stored as records and keyed directly by their Brick number. Thus, fetching a Brick can be accomplished by standard operating system function calls.

For those systems which do not support one vast relative access file spanning many physical devices, such an ability must be simulated instead. The next three sections detail an implementation of a large relative file where only tiny ones are available.

6.3.1 Bricks and Brick Indexes

A large relative file can be simulated by using several small relative files. Into these smaller files the Bricks are placed. As with the single vast relative file, one record holds one Brick. The Bricks are arranged sequentially by Brick number to allow random selection within the file. The number of Bricks per file is a function of the device where the file is stored. For optimal capacity and speed of access, the files are sized to be the largest possible size for their physical device or operating system.

Aside from the file which holds the Bricks, an index file is also needed. The index file is used to correlate Brick numbers to the physical file where they permanently reside. Thus, when rick is needed, the index is first scanned to find out which file holds the Brick. Once the correct file is determined, the Brick (and its neighboring Bricks in the same block) is read in to faster memory (i.e., core) for use.

In summary, groups of Bricks are kept in small relative files. For each one of these files, an entry is placed into an index file to serve as a translation aid between a Brick number and a file name/record number. By first using the index, the permanent address of any Brick can be found.

6.3.2 Brick Indexes and Index Indexes

In larger environments, the size of the index file can become too large for a single device to hold or too large for the operating system to handle. Should this happen, an index can be made for the index, just as the index was made for the Bricks. Adding an additional index multiplies the number of Bricks accessible by a factor equal to the number of entries in this index index. Additional indices can then be added if needed to expand the range of addressable Bricks by the same factor again.

For example, assume that a file can hold 1,000 Bricks. Assuming that an index can hold 1,000 entries, the theoretical limit of a single-level index is 1,000,000 Bricks. Adding an index index raises the possible span to one billion Bricks. Additional index levels achieve similar benefits.

Although the number of input/output (I/0) operations apparently increases for large numbers of Bricks, in practice there are few additional I/0 operations. Indices, by their very nature, are much fewer in number than the Bricks to which they point. And index indices are even fewer. Because of their relative scarcity, it is easy to find room in faster memory to hold them. In this way, once they are read in from disk, they tend to remain in core always, due to the frequency of access. For a full treatment of core-resident versus disk-resident Bricks, refer to Section 6.7.1, Fast Versus Slow Memory.

6.4 Juggling Physical Bricks

The next three sections discuss how the environment of the present invention grows and shrinks, as well as how to break off Bricks from an environment for storage offline or offsite.

6.4.1 Adding New Bricks

Every environment of the present invention begins empty, devoid of Boxes. The first Boxes that need to be added are the Pre-defined Boxes, then the user-defined Boxes. But before any Boxes can be added at all, a supply of unused Bricks must exist from which to construct representations of Boxes.

When creating unused Bricks (or at any time when the environment has run out of unused Bricks) the environment will prompt the user to find out the possible location of more storage to use for Brick space. Possible replies include memory address ranges (for internal core storage), disk drive names (drive letters for MS-DOS, DD names for IBM mainframes, or whatever the hardware requires), or the name of some other form of on-line random access storage device.

Once the environment is provided with the location of additional storage, the space is automatically formatted as unused Bricks with its own Brick Index (and an Index Index, if required). The Bricks are then available for use by the environment to build Boxes.

When new Bricks are added, the environment reserves the last Brick created for itself. This Brick is used to preserve the highest Brick number that is currently utilized in the environment so that when additional Bricks are added later, the environment knows where to begin assigning their unique Brick numbers.

When a new device is added, the environment performs a timing test to determine the access speed of the device. This allows the environment to better manage memory by maintaining an awareness of faster versus slower memory.

6.4.2 Removing Bricks

On occasion, the number of Bricks in an environment of the present invention must be reduced, either because of a shrinking business, a phasing out of old software, or other reasons. At that time, some of the unused Bricks might need to be removed.

There are two steps required to remove Bricks: convert the unique Brick Numbers to be removed into unused Bricks; then release control of the space holding those Bricks.

Turning Bricks into unused Bricks begins by scanning all Bricks in the environment. The scan begins with the highest numbered Brick and works downward. If a Brick is in use, then an unused Brick is fetched to hold the Links currently in the in-use Brick. Once the Links are reLinked using the new Brick, the now-unused Brick can be discarded.

When shrinking a database, the Brick replaced and the replacement Brick should be chosen with care: if the purpose of the shrinking is to remove a physical device, then the old Brick should have a permanent address on that device; the new Brick should not. Once all Bricks in a file or device are unused, then that file or disk can be deleted from the hardware system as determined by its operating procedures. For example, the file of empty Bricks is deleted or the disk is taken offline or removed. When this is done, the environment replaces its old highest-numbered Brick with the new highest-numbered Brick.

6.4.3 Bricks on Independent Media

A common practice in the data processing world is to copy data or programs to independent media, such as tapes, modems, or diskettes for either backup purposes or for use off-site. As such, there is a need for subsets of the environment of the present invention to exist independently. The purpose of this section is to outline the criteria for creating a meaningful, self-contained miniature environment. Its purpose is to carry database information across time or space where no Links can exist.

There are two aspects of independent media which must be addressed: what to copy and how to encode it.

6.4.3.1 What is Copied to Independent Media

In the environment of the present invention, all data are encapsulated inside of a Context; Data without Procedure has no meaning, and vice versa. Because of this constraint and the high degree of integration which exists in the environment, if data are to be copied out to an independent media, then the data must be copied along as a part of their accompanying Context. Without the Procedure Structure in the Context, the Data cannot be interpreted.

While the above may seem unusual, there are benefits which result from a Context residing on external media. For example, the procedure that is needed to operate on the data is already present. This insures that the correct version of the Procedure is always available; it travels with the Data. This removes any possible Data/Procedure incompatibilities caused by loading old versions of programs or old files.

Of course, small chunks of incomplete Contexts can be copied to external media, but they remain just that: incomplete Contexts. Copies such as these are of interest only to programmers who are developing new systems. In general use, though, since all data are located in Contexts, only Contexts are copied to external media.

6.4.3.2 How to Copy to Independent Media

Having addressed the issue of what to copy, the next step is to outline the method for the physical encoding of the Context outside of the environment of the present invention. This discussion assumes the existence of binary sequential storage devices, such as magnetic tapes or communication lines.

The independent media always begin with a header that contains a series of ON bits and a series of OFF bits. The number of adjacent ON bits that appear in the header is equal to the number of OFF bits. This number is also equal to the number of bits in each and any Brick on that media. With the header information in hand, the Bricks can be extracted from the media intact. Due to the offline nature of independent media, the eleventh tuning slot in the Brick is not included.

After the header bits, the first Bricks to appear are the Pre-defined Bricks which define the Pre-defined Boxes. The sequence of the Pre-defined Bricks is site-specific (see section 6.8, Security Considerations). These Bricks must be included so that the Structures on the media can be integrated meaningfully into a receiving environment's Pre-defined Boxes.

After the header bits and the Pre-defined Bricks, all of the remaining Bricks appear. Because the remaining Bricks are linked into a known set of Pre-defined Boxes, the remaining Bricks can appear in any sequence, with one exception: the highest-numbered Brick must appear first. This serves as a count of Bricks within the independent medium, insuring that the correct number of Bricks is transferred. This allows multiple Contexts and Structures to coexist on the same media.

In summary, Contexts and partial Structures can be copied to independent media. The format of the copy begins with a header which identifies the number of bits in a Brick, followed by the Bricks for the Pre-defined Boxes, then the highest-numbered Brick which prefixes all of the other Bricks in the medium. Together, this forms a system-independent method of interfacing environments which requires virtually no operating system overhead, no tape labels, and no support firmware except the simplest, most primitive bit stream device handlers.

6.5 The Present Invention and Physical Bricks

This section describes how the environment of the present invention uses the physical Bricks to represent the Pre-defined Boxes and functionality. Specifically, it reviews the Brick representations of the Pre-defined Boxes, as well as the issues of executing Contexts and maintaining database currency.

6.5.1 Data Storage

This section reviews the relationships between Bricks and the Pre-defined Data Boxes. As described earlier, Bricks are used to represent both Data Structures and their Values. Since Bricks can represent Data Boxes, the existence of Pre-defined Data Boxes implies the existence of Pre-defined Bricks to represent the Boxes. The Pre-defined Data Bricks are detailed below.

6.5.1.1 No Brick

When a Brick is not Linked to any other Brick, the lack of a Link is flagged by using Brick Number zero. This indicates that there is no other Brick in the chain. No physical Brick with the number zero exists. The first Pre-defined Brick is not a Brick at all; it is merely a number used only as a flag.

For example, if there exists a Structure which has no Value, then the Link to the Value (i.e. the Link represented in the figures by asterisks) would point to Brick Number zero. This convention avoids the need to attach a special "null" Brick every time one needs to indicate the absence of a Value.

6.5.1.2 The Null Box

The Pre-defined Data Box called the Null Box is represented internally as the Null Brick. This Pre-defined Brick is considered to be equal to Brick number zero, except that the Null Brick actually exists. The Null Brick is used when a null Value needs to be Linked with some other Bricks. It is usually used in Procedure Structures, such as when a Null Box is used in an Enumeration or as an Argument Box. If the Null Box does not need to be Linked to a specific position, then no Brick is used instead.

The Null Brick Definition is Brick number 1. There is no Pre-defined Occurrence Brick for the Null Box.

6.5.1.3 The Top Box

The Top Box is used as the base to which all Bricks ultimately Link, either directly or through other Bricks. The Brick which serves as the Definition Brick for the Top Box is Brick number 2. As with the Null Box, there is no Occurrence Brick for this Brick.

6.5.1.4 Utility Boxes

The next group of Pre-defined Bricks are the Utility Boxes Definition Bricks. They include the Enumerations which the Pre-defined Procedure Boxes require, [Which], [Relation], and all of their Child Boxes. The fourteen Bricks are numbered as 3 through 17, and represent the Definition Bricks of [Which], its four Child Boxes, [Relation], and its eight Child Boxes, respectively. Numbers 18 through 29 represent the Occurrence Bricks of the Child Boxes of [Which] and [Relation], respectively.

Another group of Pre-defined utility Boxes are the basic character set of the environment. These Bricks, numbered 30 through 77 inclusive, represent the Box [Alphabet], the Owner Box of the 26 letters of the alphabet, and the Brick representing [Digit], the Owner Box of the ten digits 0 through 9.

Since [Character] and [Digit] are Owner Boxes, their Definition Bricks are Linked to their Child Boxes'Occurrence Bricks. Thus, Bricks number 78 through 113 are the Occurrence Bricks for the letters of the alphabet and the numerals of the digits. The names of the Pre-defined Boxes are not pre-defined; these Box Names may be changed, omitted, or included along with the user-defined Bricks.

These Bricks provide the basis for forming textual Box names and for performing arithmetic.

6.5.2 Execution of Procedures

This section relates the Pre-defined Procedure Boxes with their Bricks. In doing so, the relation of an executing Procedure to its procedure Structure and Data Values are discussed.

6.5.2.1 Pre-defined Procedure Boxes

The Pre-defined Procedure Boxes, as with Data Boxes, have Pre-defined Bricks which represent them.

When a Pre-defined Procedure Box is encountered during execution, the hardware must perform a different function from the normal execution process. For this reason, the unique Brick numbers associated with these Boxes must be known to the Hardware so that the Hardware can recognize them when they execute. Normally, the Hardware's only function is to execute all Child Boxes and return to the Owner Box when done. But with Pre-defined Procedure Boxes, the Hardware must deviate from this normal mode of execution in order to perform whatever function the Pre-defined Box has requested.

After executing a Pre-defined Procedure Box, execution resumes with the Owner; these Boxes have no Child Boxes, except in the Hardware.

The first two Pre-defined Procedure Bricks, numbers 114 and 115, are the Definition Bricks which represent the two Locate Contexts: [Locate [Which] [ ]] and [Locate [Which] [ ] matching [ ]].

The next Pre-defined Procedure Brick is the Definition Brick representing the Precede Context. Its Definition Brick's number is 116.

Number 80 is the iterative control Box, [Until [ ] [Relation] [ ]]. Number 81 is the Enumeration choice Box, [Execute [ ] Then Abort Owner Only If [ ] [Relation] [ ]]. The last Pre-defined Brick, representing [Invoke [ ]], is number 82.

There are other Boxes, such as Device-specific Boxes, which must also be recognized by Hardware in order for them to function. For example, [Clear Screen] is a Procedure Box specific to display terminals. As such, this Box must be pre-defined for that type of device. Pre-defined Boxes of this nature are not included with Bricks number 0 through 82. Because they are device specific (and therefore site-specific), they can be any Brick number which the site chooses. For further discussion of how Brick numbers can be chosen, refer to Section 6.8, Security Considerations.

Note that the arrangement of Pre-defined Bricks, given above, is arbitrary, and that these Pre-defined Bricks can be arranged in any order.

6.5.2.2 Executing Procedures

The environment of the present invention can execute an infinite number of Procedures simultaneously. Each running Procedure is marked by the Hardware by Linking a procedure Value to the corresponding procedure Structure. The Hardware keeps track of all of these Values by Linking them together through Link #9 from FIG. 74. Using this Link, the Hardware can track every simultaneous execution. The Handle for this Link points to the Brick which defines the top Box of the initially invoked Context.

In single-processor Hardware, simultaneous execution of procedures must be simulated. That is, execution of various procedures is accomplished on a "time-shared" basis. All Procedure Values are chained together. The Hardware executes one Box from each Procedure Value on this execution chain, and then moves on to the next. In this way, each executing Structure advances in execution. A higher-priority Procedure Structure can be made to run more rapidly by Linking the same Procedure Value to two or more places on the execution chain. In this way, for every full cycle of executions, the low-priority Procedures advance only one Box in their execution; the higher-priority Procedure executes more often. In a parallel-processing environment, different procedures could be physically executed simultaneously, and there would be reduced need for "time-sharing".

Another Link to this Procedure Value is a Link to all current positions in all accessed Contexts. This provides the database currency information, that is, the knowledge of which Data Box was last accessed. Maintaining currency is vital if the [Locate [Next] [ ]] is to function. For example, if one executing Procedure performs a Locate, the Located Value is Linked to the Procedure Value of that executing Procedure. Currency Links are created when any Data Value is Located, Unlinked and Relinked for every new Locate, and finally disposed of when the procedure has completed execution. The Handle for this Currency Link also points to the Brick which defines the top Box of the initially invoked Context.

6.6 Distributed Processing

The unique structure of the environment of the present invention is well suited to a much-simplified method of distributed processing. A central database can be established at one site, passing off the needed Bricks to remote sites.

In a distributed environment, simple processors, such as personal computers, or "dumb" terminals, interface to the central database. Whole Contexts can be downloaded for execution and modification, then returned to the central database. To prevent the possibility of multiple updates occurring against the same data, modification requests can be passed to the central database from the remote site; the modification occurs at the central database. In effect, the central site is a Context, accepting requests and returning outputs. The transmission protocol which is used for the transmission of Bricks is described in Section 6.4.3, Bricks on Independent Media.

6.7 Tuning Considerations

There are several methods for optimizing the execution and storage of data within the environment of the present invention. This section discusses some of those methods, including capitalizing on relative memory speeds, crunching down Procedure Structures, resequencing Enumerations, clustering Bricks, and automated fine tuning techniques.

6.7.1 Fast versus Slow Memory

One method of improving the performance of Brick access is to keep as many Bricks as possible in the fastest memory available to the environment, usually dynamic random access memory (DRAM) on a silicon chip. Pre-defined Bricks should be here, as well as any other Bricks which have a high access rate.

"Faster" is a relative word; bubble memory is faster than disk, but slower than DRAM. There can be several layers of memory speeds. The fastest is reserved for the highest frequency Bricks. Thus, when a Brick is accessed, it moves immediately to the fastest memory. After it has not been used for a predetermined period, it is removed from faster memory and placed in a slower memory. Eventually, the Brick is returned to a permanent resting location on a permanent medium. On all of these speed levels, space for new entries into faster memory is controlled on a least-recently-used (LRU) basis. This means that the space is acquired by leaving the more-recently used Bricks alone, but transferring the less-recently used ones to slower memory. Thus, the most active Bricks are almost always found in the fastest memory; this speeds execution.

Slower memory, such as disk drives, holds the permanent copy of all Bricks. When first needed, a Brick is read from its permanent location into a faster memory. When a Brick is no longer needed, the Brick is rewritten to its permanent address, but only if the Links to the Brick have been modified. Otherwise, it is simply ignored when it is removed from memory by the LRU algorithm on that speed level. Depending on the level of recoverability needed, Bricks can be re-written when modified or when removed from fast memory.

In this manner, Bricks are automatically shuffled among memories of varying speeds according to the needs of the executing procedure to provide fast execution, by attempting to keep the most-used Bricks in the fastest available memory.

6.7.2 Crunching Procedure Structures

Figure 76A:
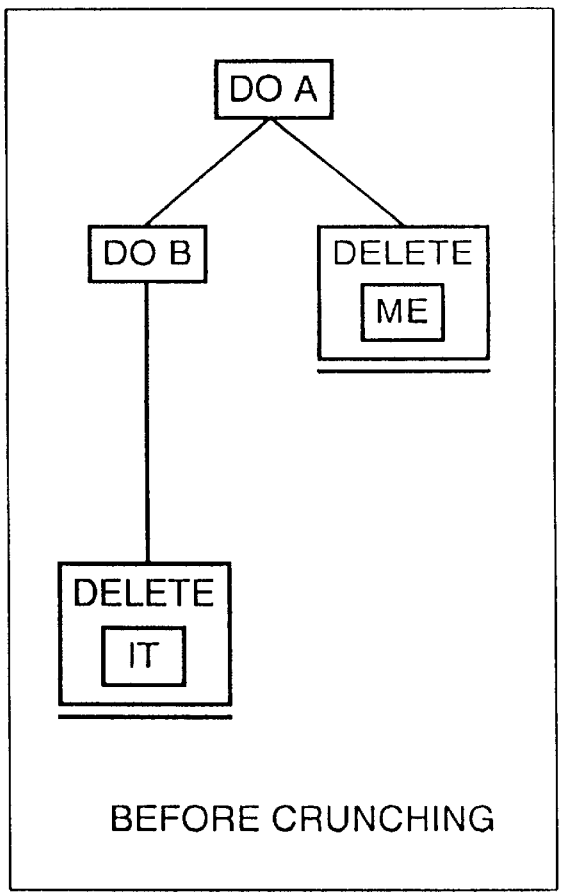
FIG. 76 shows two portions of procedure Charts, illustrating the effect of removing an unnecessary Box.
Figure 76B:
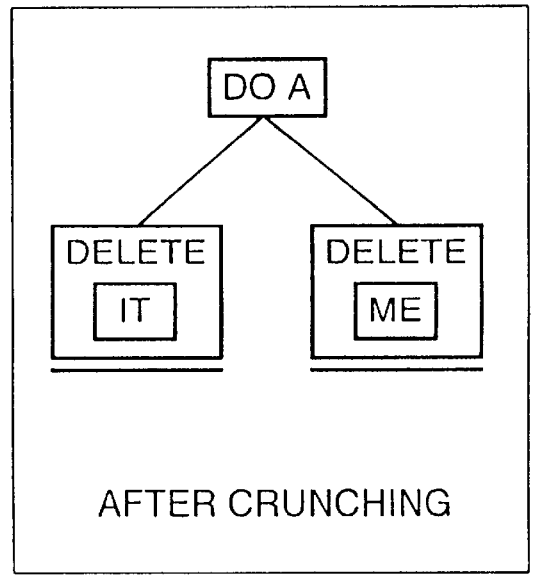

A fruitful method of improving the execution performance of a Procedure Structure is to "crunch out" unnecessary levels. For example, in FIG. 76, there is no reason for [Do B] to exist; it only slows down execution. To prevent this unnecessary delay, any intermediate Boxes can be removed, connecting their Owner Boxes directly to their Child Boxes. Thus, the intermediate Boxes can be deleted. FIG. 76(b) shows a Procedure Structure after an unnecessary Box is deleted.

Although crunching is an effective technique to tune Procedure Structure execution, Data Structures cannot be crunched; each Data Box is a potential site onto which other Values can be attached. As such, Data Boxes can only be removed by a programmer; automated crunching can introduce performance penalties in the event that the crunched Data Box needs to be reintroduced. But because of its simplicity, crunching Procedure Structures can be performed on a fully-automated basis.

6.7.3 Enumeration Sequencing

Another fruitful method of improving execution efficiency of Procedures is to arrange Enumerants according to the frequency of their usage. In executing an Enumeration condition, the present invention evaluates each condition from left to right. The most frequently accessed Boxes should always be kept as far to the left as possible. In this way, execution speed is improved because the correct Enumerant can be found more quickly.

Because of its simplicity, resequencing Enumerations can be performed on a fully-automated basis by maintaining statistics within the Brick relating to the number of invocations. Enumerations can be resequenced during program execution, whenever a passing execution notes that the Enumeration in hand has a higher usage count than the preceding Enumerant.

Thus, the deliberate positioning of frequently-used Enumerants (either automated or manual) results in faster Enumeration selection.

6.7.4 Clustering Bricks in Slow Memory

Of course, a fractal information system can still benefit from some of the techniques used by non-fractal systems to enhance the efficiency of slow memory devices. One of the best methods of enhancing performance is to keep related Bricks together in slow memory via judicious choice of the device's block size and judicious choice of a Brick's permanent address.

For example, all of the Bricks for a Context's procedure Structure should be available with a single I/O by optimizing the block sizes for that specific device. A Context's data could also be included nearby on the same device. This increases the chance of reading in soon-to-be-needed Bricks, thereby saving an I/O access.

Re-clustering Bricks can be handled automatically, but on an on-demand basis. All of a Context (Data and Procedure) can be cloned onto a new device with new Brick numbers; the old Bricks could then be deleted. The cloning brings all of the Bricks of the Context together by copying them onto the new device.

Thus, clustering Bricks can improve performance by increasing the chance that a soon-to-be-needed Brick is already in faster memory.

6.7.5 Automatic Fine-tuning

As discussed in the previous sections, there are several automated tuning processes. Some can be performed on an ongoing basis, while others must be explicitly triggered. Transferring Bricks among varying memories by a least-recently-used algorithm is always performed as a feature of the Hardware.

Resequencing Enumerations can also be performed constantly, provided that the eleventh Brick slot is being used to collect statistics. Statistic collection involves incrementing the access count in a Brick whenever the Brick is accessed. However, there is a performance penalty to pay for this collection; each and every Brick needs to be ultimately rewritten to its permanent address to insure that the count is not lost. This means extra I/O operations along with the attending performance penalty. If the penalty is too great, this feature can be turned off.

Another automatic tuning feature can be used for often-used Contexts. Once the frequency of use reaches a certain threshold, the Context can be automatically crunched. While this would require a bit of time to accomplish, subsequent invocations of the Context will execute more quickly.

Re-clustering Bricks so that their permanent addresses are closer together cannot be performed on a fully-automated basis. However, a procedure can be devised which compares the closeness of Bricks. If a Context is too scattered across too many devices, the procedure could bring this scattering to the attention of a human. Then, if unscattering is desired, the Context could be cloned onto another device with better clustering. While both the determination of scattering and the correction for scattering can be automated, their invocation should be triggered by a knowledgeable human when system activity is low.

Thus, there are several tuning techniques which can be applied to an environment of the present invention. But other, more-traditional methods, such as cache memory, RAM disks, and good programming practices, can be employed as well.

6.8 Security Considerations

Because of the nature of its construction, the environment of the present invention provides several built-in security methods. Among the features are data encryption, source code security, Context-enforced security, and overall system protection.

6.8.1 Data Encryption

All data can be encrypted in the environment of the present invention without paying any performance penalty. All that need be done is to renumber unique numbers assigned to the Pre-defined Bricks, such as the characters A to Z, the numbers of the Pre-defined Boxes, etc. This makes the information stored in one environment uninterpretable in another; the most basic definitions would not match up.

Once the unique numbers are shuffled, even the Box Names cannot be read in another environment. In this way, disks or tapes made in one environment are useless in another, unless a correspondence can be made between the Brick numbers of the two environments. With these Brick number incompatibilities, data stored in one environment are impervious to integration with any other environment.

To allow dissimilar-numbered environments to communicate, a common numbering scheme must be used on all external media, such as tapes and other offline storage devices. The Bricks stored within these devices are required to begin with the Pre-defined Bricks as a header so that the receiving environment knows how to interpret the remaining Bricks. The Pre-defined Bricks need to be in a prescribed order on the device to allow this mapping. But if one removes this header, the Brick Linkages contained in the offline storage become meaningless.

In either of these two examples (shuffling Brick numbers or omitting the Pre-defined Bricks from external media), the links could be manually traversed. However, without the lowest-level keys, the Structures and Values would remain incomprehensible.

6.8.2 Stripping Box Names

Source code security can be easily attained in the environment of the present invention by simply removing the characters of the Box Names from the database. If an unauthorized person were to view any data, only unlabeled connections could be seen. Without the Box Names, the data are meaningless. Procedures can be executed, however, since they do not need their Box Names to operate. Thus, source code can be protected more thoroughly than normal object code now is. Without Box names, the unauthorized person could not tell if the Values were sensitive financial data or unused Bricks.

6.8.3 Context Security

The concept of the Context in the environment of the present invention automatically introduces a high level of security by providing a single access control point.

Since a Context is the "keeper of the data", access to the data from outside of the Context is virtually impossible. Access is only possible through the Context's rigidly-defined interface. Sensitive data can be encapsulated in a Context which has extensive password protection. That Context itself can be encapsulated in yet another Context which can be accessed only by certain users. Additional layers can be added without end, with each successive Context requiring its own form of access procedures.

As the ultimate security, a Context's Bricks can be physically removed from the environment, taking up residence in an offline permanent address. The offline device (tape or removable disk) can then be locked in a vault until needed. This adds physical security to the logical security, making the possibility of unauthorized access even more remote.

Thus, the independence of the Context provides the independence needed to deter unauthorized access. That independence also facilitates the removal of the Context entirely from the environment.

6.8.4 Securing the System Against Unauthorized Use

The environment of the present invention can be secured against unauthorized access with a two-tiered approach using passwords to identify both the program itself and a particular user.

In order to begin a session with the present invention, the user must provide the serial number of the copy of the program which is being used. If this number is correct, the user must then enter his own personal user number. This personal number is configured "at the factory" at the request of the license holder or owner of the program.

To prevent the personal user number from being decoded by unauthorized persons, the numbers are scattered throughout Procedure Structures; Procedure Boxes with no Child Boxes are essentially meaningless, so their presence does not affect other data. For additional security, the Box Names can be stripped and stored in a Structure with stripped Box Names. By storing the identification numbers as unnamed Data Boxes among unnamed Procedure Boxes, only the most detailed search could uncover them. Even then, the shuffling of Boxes introduced by some of the automated tuning processes further thwarts any search by constantly changing the internal relationships.

7. Hardware for the Environment of the Present Invention

This section presents an overview of the Hardware which supplies the underlying functionality of the environment of the present invention. This section is not intended to provide a detailed schematic of the internal operation of the Hardware; rather, it provides an inventory of requirements for the Hardware.

7.1 Communication Between Devices

Before investigating the operation of various types of Hardware, the first step required is to define the data paths between them. These data channels are used to shuttle Bricks back and forth as required.

Channel circuitry can be devised to optimize the transmission of Bricks between Hardware components. For example, assuming binary Bricks with 11 30-bit pointers, a parallel channel can be built with 330 parallel connections to allow an entire Brick to be passed in the same instant. The same Brick can be transmitted serially, but at the expense of additional transmission time.

The bandwidth of a parallel channel can be increased by employing bit-slice technology. For example, an expansion board can be devised which adds 11 more connections (bits) to a channel, thereby increasing its bandwidth so that it can transmit Bricks of eleven 31-bit pointers rather than 30-bit pointers. Adding or removing these channel expansion boards easily permits the widening or narrowing of the bandwidth of a channel as determined by the needs of the devices being interfaced.

7.2 Memory Devices of the Present Invention

The Bricks which form Structures and Values are required to have permanent addresses. This means that each Brick has a specific location on a specific physical storage device where it can be found. Thus, any memory devices can be designed around the form of the Brick, as with channels.

An ideal memory device would be capable of storing or retrieving a given Brick in one instant, such as with the parallel connections used in channels. For example, a disk drive with 330 rotating surfaces could store all of the bits of a 330-bit Brick by assigning one bit to each surface. In this way, if one bit is accessed, all bits are accessed.

This style of memory architecture allows for simple interfacing of a memory device to a channel. For example, each bit of the channel can interface directly to each rotating surface on a disk drive or to each track on a magnetic tape or drum. Even punched cards or tape can be used, but their bandwidth could be limited because of their physical fragility.

Any memory device used in the present invention would perform its functions in a manner analogous to a subroutine. The function of the "subroutine" is to read or write a certain Brick to or from its permanent address. When another device makes a request to access a Brick in a memory device, the requested Brick number is sent across the channel; the memory device then responds by returning the Brick to the requester. An updated Brick is returned to permanent storage in a similar manner.

7.3 Peripheral Devices in the Present Invention

One of the main functions of any peripheral device, used in the present invention, is to translate Bricks into a form that is consistent with the nature of the device. For example, a video terminal converts keystrokes to Bricks; it also converts Bricks to visual images. A modem, used in the present invention, converts Bricks to and from electrical impulses. A printer, used in the present invention, converts Bricks to paper or celluloid images. In all of these examples, the Brick remains the standard of communication.

In practical usage, a peripheral device can be tested by connecting its channel directly to another peripheral; a Brick sent out by one is received by the other. In this way, no central processing unit is required for peripherals, used in the present invention, to communicate the intelligence in the device and the in channel suffices. The first device translates its input to a Brick, the Brick is sent over the channel, and the receiving peripheral translates the Brick back again without the intervention of any other device.

In order for any peripheral device to be able to perform its specific translation, it needs to know the Pre-defined Bricks. Also, for several peripheral devices to operate in conjunction meaningfully, they would need to have identical copies of the Pre-defined Bricks in the proper order. Thus, when first powered up, every peripheral used in the present invention would require a downloaded copy of the Pre-defined Bricks to perform its specific translation. To remove the need for the download process, the numbers of the Pre-defined Bricks can be kept in the device's firmware.

Because many peripheral devices utilize only the Pre-defined Bricks, the bandwidth of their channels can be made extremely narrow. For example, if a device uses just the first 100 Pre-defined Bricks, then a 7-bit channel would suffice. Unlike the channel bandwidth associated with memory devices, the bandwidths of these channels would never be increased. For example, a terminal will never have new keys on its keyboard; once it has been built, it will never change. Thus, the channel which connects to the peripheral can be designed with a small bandwidth.

7.4 Central Processing Unit Hardware

Although any devices, used in the present invention, can be interconnected via channels, the heart of the Hardware remains in the central processing unit (CPU). In executing Procedure Structures, the CPU initiates and orchestrates the interchange of Bricks among the interconnected devices.

Inside the CPU, relatively few functions need to be performed. Since only Bricks are passed back and forth, being hooked and unhooked, the only functions needed are: Get a Brick, Send a Brick, Hook a Brick, and Unhook a Brick.

The choice of which Brick to Get is determined by the executing Context. For example, in executing Procedure, the Hardware must know how to "Get" the next brick in hierarchical sequence. It must also know how to walk the Links to "Get" the next, prior, first or last Brick of a specific Link.

The choice of which Brick to Send is also controlled by the executing Context, such as when a Brick is sent to a peripheral device or is being returned to its permanent address.

Hooking and Unhooking Links are also performed at the request of an executing Context. However, in order for the Hooking or Unhooking to occur, two Bricks need to be available simultaneously so that the Links can be adjusted in each Brick. This can be done by employing a Bricksized "register" (i.e., extremely fast memory) which holds an entire Brick. Several of these registers can be incorporated into a CPU so that a single Brick and each of its immediate neighbor Bricks can be held at once. Based on three Links per Brick, there are up to nine possible neighbor. Bricks for any Brick, requiring a total of ten registers for one processor.

Based on the register approach to the architecture of the processor, the definition of Get a Brick is made more precise; instead of "Get a Brick", the operation becomes "Get a Brick into a certain register" so that Hook and Unhook can function on it. This also makes the definitions of Hook and Unhook more precise; instead of just "Hook a Brick", the operation becomes "Hook this Brick as that Brick's Value Occurrence".

Thus, the full set of operations which are performed by the CPU are expanded from the four basic ones into several subcategories of the four. By using these primitive functions and registers, a Context can be executed on a single, simple processor.

7.5 Multiple-CPU Hardware

The environment of the present invention is uniquely suited to take advantage of multiple-processor technology. Because all execution takes place inside of a Context and because any Context is independent of any other, a Context can be assigned to execute in its own processor. This means that all of the resources of a single processor are dedicated to the execution of that one Context. The only constraint is that all of the processors have access to common memory devices to facilitate the passing of Argument Boxes among them. Since channels can provide this facility, Contexts can run simultaneously.

For critical operations requiring exclusive control, a Context can be introduced which provides that control. For example, many clones of a Context can provide read-only access while only one provides update capability. Or, an additional Context can serve as a scheduler, handling read-only requests directly, but queuing update requests to another Context to be performed on a first-in, first-out basis.

Contexts are usually small and uncomplicated. Large systems are only a collection of small Contexts. Allocating a single Context to a single processor makes that system run more quickly because the execution load is spread over more executing processors. A system composed of fifty Contexts can be spread over fifty processors. Extra copies of the most frequently-used Contexts can be loaded into additional processors to help spread the load. An additional processor can serve as a scheduler and load-leveler, supplying execution requests to each waiting clone Context.

When ordering the purchase of multiprocessor hardware, forecasting the number of required processors can be made more accurately; by knowing the number of Contexts, an estimate of the number of required processors could be made. For example, an environment containing 5,000 Contexts would need approximately 5,000 processors for the highest possible execution speed.

Thus, because of its Context-based processing mode, the environment of the present invention would best execute in an environment with a large number of exceedingly simple processors.

8. Applications of the Present Invention

This section provides qualitative descriptions of several applications which are more easily suited to the environment of the present invention, due to its inherent properties. These applications are broadly grouped into two areas: applications within the environment itself, and applications built using this environment.

8.1 The Invention Inside Its Own Environment

The next several topics include examples of how the environment of the present invention can be used in some existing fields of data processing. They describe possible applications and also advance lines of research which can be pursued using the invention as a guide.

8.1.1 The Spreadtree

Applying the infinite expandability of the environment of the present invention to the world of spreadsheets can change its functionality drastically. Merely by replacing the "cells" of the spreadsheet with Boxes, many new features are available. For example:

- Since a cell is really a Box, the cell would have no limit to the size of its contents.
- The same cell can exist in two locations on the same spreadsheet (or on other spreadsheets).
- Cells can now be Contexts with other cells serving as Argument Boxes, thus allowing for the execution of Procedures against the Data Values associated with the Data Boxes in the spreadsheet.
- Since alternate means of addressing cells exist, Cartesian coordinates can be eliminated. Users can make any number of cells "adjacent" to a given cell by Linking to other Boxes.
- Since a single Box can own all of the Boxes/cells of the spreadsheet, each cell can conceivably become its own spreadsheet. Spreadsheets can become children of spreadsheets which can become children of spreadsheets; hence the name "spreadtree".

The interconnections which the environment of the present invention provides would thus greatly increase the functionality of any simple spreadsheet program. For example, instead of formulas based on cells, there are Contexts based on Boxes; this allows spreadtree Boxes to be executed by other applications outside of the spreadtree. Instead of relative coordinates linking cells, Links are used instead. And all of the integration, device independence, and universality of the environment of the present invention are supplied to the spreadtree user.

8.1.2 Artificial Intelligence Application

Because of its self-referential abilities, the environment of the present invention is ideally suited to artificial intelligence applications. Infinitely recursive structures, rule-based inference (via Contexts), and associative linkage can all be accomplished simply and quickly.

8.1.3 Nanotechnology Applications

Nanotechnology, the science of ultra-miniature processors, is another ideal application for the environment of the present invention. Using nanotechnology, computers can be created out of millions of exceedingly tiny, exceedingly simple building blocks. Because of the intrinsic simplicity and "sameness" of the environment of the invention, the invention can be used to provide the specification for the tiny, simple processors. Bricks, too, can be implemented easily because of their identical natures; they, too can serve as specifications to store data and procedure.

Biological computers, that is, groups of living organisms that interact to provide data processing functions, are another form of nanotechnology. These biological computers can also be designed using the present invention as a model. While much research would be necessary before such a machine could be fashioned, the environment of the invention can be used to define the capabilities of the components of any nanotechnology devices, thereby indicating the direction that the research could take.

8.1.4 Hypertext Applications

Another state-of-the-art function which comes easily in the environment of the present invention is hypertext. Using hypertext, portions of a word processing document can be stored in another portion of a system; the hypertext capability links the pieces of text together into a single whole. A Data Structure alone performs this task, with Box Names holding the text. Rather than using custom hardware to perform the linking, this feature is merely one facet of the capabilities inherent in the environment of the present invention.

8.1.5 Varying the Appearance of the Present Invention

The visual format of the Structures in the environment of the present invention are not the only possible representation of database set connections. Many other forms are possible. The next sections detail some of these forms.

8.1.5.1 Automated Flowcharting

Any Procedure Structure can be converted to flowchart format on an automated basis. Rather than using a complicated algorithm to draw branchings and functions, the environment of the present invention simply extracts the lowest-level Procedure Boxes and represents them as rectangular flowchart boxes. Diamond-shaped decision boxes can be directly constructed from the Enumeration Lines that appear in the Procedure Structure. The flowchart lines which connect the various flowchart components can be determined by simply connecting them in the order that they are encountered in the Procedure Structure when it is traversed hierarchically.

This automated flowchart produces a chart that is much more precise than a conventional flowchart, in that it shows the actual data involved. However, since a flowchart cannot show data in a disciplined way, Data Structures cannot be converted to flowcharts.

8.1.5.2 Top-down Viewing

Any Structure of the present invention can be viewed in a top-down manner. This means that only one Box is ever displayed on the Editor screen rather than many. To view the Child Boxes, a "View Next Level" Command can be used; this expands the currently-displayed Box to include the Child Boxes as Boxes nested within the Owner's Box. A subsequent issuance of the Command displays the Child Boxes of the Child Box, nested within that Child Box.

A disadvantage of this method is the increased crowding of Box Names on the screen.

8.1.5.3 Representing Procedures in Outline Format

Another method of representing Procedure Boxes can be employed, specifically, a pseudo-code form can be adopted. This form abandons the graphic viewpoint of a Structure for a lexical format. One such lexical format has already been used throughout this document, namely, representing Box Names within brackets, such as [[Maintain] [Name] in [List]]. In this manner, Data and Procedure Structures can be written in outline format by using indenting to show Owner/Child relationships.

The relationship between the form of the invention presented above and the lexical version can be shown by representing the Data Structure from the Phone List example from Section 5 lexically. This is presented in FIG. 77.

Such a lexical representation was avoided in the description of the present invention, because of the possible confusion introduced by incorrect nesting levels; omitting just one level of nesting can change the entire meaning of a Data Structure. This can be counterproductive. It also introduced reserved words, such as "[", "]", and "many", an undesirable curtailment of Box naming conventions.

8.1.6 Automatic Data Maintenance Utilities

One powerful advantage of the architecture of the environment of the present invention is its inherent ability to automate routine data maintenance utilities.

If Values are to be assigned automatically to a Data Structure, the environment of the present invention can "walk the Structure" to the lowest-level Boxes, the Data Enumerations. Since the environment knows all the Enumerants, a human operator can be prompted to choose one of them as the Value to be assigned.

For example, if test data is to be added to [Character], the user is prompted to select one of the possible [Character]s. Higher-level Boxes can cause prompts for Values for each of its Child Boxes which prompt for Values from among their Enumerants. This same reasoning can be applied to any Data Structure. Or, rather than prompting, random Values can be automatically selected by the environment to generate a full range of test values.

8.1.7 Non-textual Box Names

Another powerful feature of the environment of the present invention is its ability to use anything as a Box Name. Foreign alphabets, video pictures, mechanical drawings, screen maps, or literally any pattern possible can be included as a Box Name.

To provide simplicity of access, any non-textual Box Name should have an Owner Box whose Box Name is textual. In this way, the text serves as a tag for the non-textual Box. Since both the text and the non-text are of the same data type, the tag Box Name can be used in its place anywhere.

The possible range of non-textual Boxes is only limited by the peripheral devices connected to the environment of the present invention.

8.2 Outside the Environment of the Invention

The Boxes and Lines of the environment of the present invention can serve purposes beyond their use as data processing tools. Several different aspects of project management can be addressed by the product just as it stands. The next several sections outline some of these capabilities.

8.2.1 Program Documentation

The environment of the present invention can be used to design and build documentation for existing systems. This can be accomplished without using Contexts or Data Values. Instead, the Box Names themselves form the chapter headings as well as the text of the document.

For example, by using functional decomposition, a [Software Product] document can be designed which has an [Introduction], a [Theory] section, then a section on [Syntax], a well-described [Sample Context], then the [Internal Architecture of the Product]. After a discussion of the [hardware], a list of some [Applications] can be used as a summary. Together, these seven Child Boxes of [Software Product] completely describe the contents of the document.

This decomposition can be continued by adding Child Boxes to each of these seven Child Boxes, and so on. At the lowest level, the Box Name can be the text of a section of the document; higher-level Box Names serve as chapter headings. Changes can be quickly made to the document by moving Boxes around or changing the Box Names. In this way, an entire document can be written as it is being designed in order to form a more integrated, logically structured document.

8.2.2 Project Control

Just as documents can be designed and built as a Structure, virtually any project can be built and managed. By using similar techniques, a project can be unambiguously defined in terms of what needs to be performed, what it is a part of, and how long it will take.

A project, such as [Get a New house] can involve many subprojects, such as [Find a New House], [Find the Money] and [Exchange Money for a New House]. The details of [Find a New Blouse] include [Reading Newspapers], [Hiring an Agency], etc. Any facet of house hunting/buying/mortgaging/etc. can be added to the Structure as they are identified. As with documentation, the name of the task to perform or item to obtain is entered into the Structure as a Box Name. After this process has been used, the project becomes easier to manage because it has been factored into smaller, easily-grasped details.

As the design of the project grows, more and more Child Boxes are added. Details such as [Closing Date], [Mortgage Rate], and [Change Locks] are added to the appropriate Owner Boxes to which they apply. By continuing in this manner, random thoughts on any subject can be grouped together into a rational whole.

Once the Structure of the project seems reasonably complete, that is, once no more Child Boxes seem appropriate to the subject, an estimate of the time and resources involved can be made.

To estimate the time required to complete a project, look first at the bottom-level Child Boxes. Since each Box represents a small task to be performed or a single item to be acquired, that very smallness insures that its true scope is easy to grasp. By assigning a probable duration of the time required to address each of the lowest-level Boxes, the total duration of the Owner Box can next be determined.

Once the lowest-level Boxes have been assigned probable durations, their immediate Owner Boxes'durations can be calculated. This is done by adding the durations of all the Child Boxes together to determine the duration of their Owner. The durations can be summed for the Owners of the Owners and for their Owners until a total duration is determined for the entire structure.

Where a firm duration cannot be assigned, a probable range of durations can be. For example, [Looking at One House] can take from 1 to 3 hours. When adding these durations, two totals are kept: a low estimate and a high one. Thus, (Looking at Three Houses] would require 3 to 9 hours. The durations of the three Child Boxes [Looking at One House] are added together to determine the probable duration of their Owner Box.

A wide range such as this can be narrowed, if desired. Since things seldom all go smoothly, the 3 hour duration is probably too low to be realistic. Conversely, since things seldom all go slowly, 9 hours is probably too high. To provide a firmer estimate for the Owner's duration, an average duration can be used instead. In the case of [Looking at Three Houses], the average duration is 6 hours. However, a range of durations near to the average duration of 6 hours, such as 5 to 7 hours, is most likely the best estimate, because the width of the range, 2 hours, matches the largest width of the range of any Child Box.

Continuing this addition of durations or ranges of durations eventually leads to the top Box of the project's Structure. In this way, the duration of the total project can be rationally estimated with greater accuracy.

8.2.3 System Design

Just as documentation and projects can be designed, estimated, and built, entire data processing systems can also be designed, estimated, and built. Simply begin with a project plan as described in the previous section. Once the plan is complete, all bottom-level Boxes are then treated as Contexts to be executed.

For example, a [Ledger System] has a Child Box called [Payroll System] which has a Child Box called [Print Paychecks]. When designing a project Structure, [Print Paychecks] is at the bottom level. But when the system is designed and implemented, one first develops the Context called [Print Paychecks], and then the Data Structure [Paycheck] is included along with the Procedure required to format and print the checks. Thus, the bottom level Boxes of the project design Structure become Contexts.

Not all of the bottom-level Boxes in a project plan Structure can be converted into Contexts. Some functions, such as [Insert a Diskette into the A: Drive] cannot easily be accomplished in software. These unautomatable Contexts indicate the man-machine interface between the system and the user. When designing a system, these unexecutable Contexts define the positions which must be filled by humans in order for the system to function. But those Contexts which can be automated are actually built using the Pre-defined Procedure and Data Boxes.

In this way, an entire system, from the initial project plan to the major subsystems to the smaller functions to the actual coded Contexts are all integrated together, including the humans who participate in the system.

To summarize, in the environment of the present invention, the system specification, system design, and the actual executable code form a single entity, all built from one basic building block: the database set connection.

The invention should not be deemed limited to the specific embodiments described above. The database set connections can be accomplished and represented in many different ways. Icons other than boxes and lines can be used. The primitive commands and built-in procedures can be defined in varying ways, provided that they have equivalent capabilities to those described above. These and other modifications should be deemed within the spirit and scope of the following claims.

What is claimed is:

1. A method of storing a textual document on a computer, the computer having a memory, the method comprising the steps of:

a) selecting a name for the document, b) dividing the document into at least two sections, each section being assigned a name, each name being represented as a box, each box being connected by a line to the name of the document, each box being disposed alongside another box, c) repeating step (b) for each box established in step (b), by establishing one or more "child" boxes corresponding to each box previously established, each child box containing at least some of the text of the document, wherein this step is repeated until all of the boxes established together contain all the text of the document, d) defining a plurality of nodes stored in the memory of the computer, each node having a unique identifier within the memory, each node corresponding to one of said boxes, and e) storing within each node at least one pointer, each pointer comprising only an identifier of another node, each pointer corresponding to one of said lines, wherein each node contains no application data elements other than said pointers, and wherein all information stored in the memory of the computer is stored only as a pattern of said pointers.

2. A method of storing a representation of a project on a computer, the method comprising the steps of:

a) selecting the name of the project and representing that name by a box, b) dividing the project into subprojects, and representing each subproject by a "child" box, each child box being connected to the box established in step (a) by a line, each child box being located along side another child box, the child boxes being arranged in the order in which the subprojects are to be performed, c) repeating step (b) for each child box, thereby dividing each subproject into further subprojects, each subproject being arranged in the order in which it is to be performed, wherein step (c) is repeated until there are no more subprojects to be established, wherein there are a plurality of said lines connecting each of said boxes to another of said boxes, d) defining a plurality of nodes stored in the memory of the computer, each node having a unique identifier within the memory, each node corresponding to one of said boxes, and e) storing within each node at least one pointer, each pointer comprising only an identifier of another node, each pointer corresponding to one of said lines, wherein each node contains no application data elements other than said pointers, and wherein all information stored in the memory of the computer is stored only as a pattern of said pointers.

3. The method of claim 2, wherein the boxes which have no child boxes are called lowest-level boxes, and wherein a box having a child box is called the owner box of the child box, the method further comprising the step of assigning, to each lowest-level box, an estimate of the time required to perform the subproject represented by that box, adding the estimates for each lowest-level box of a given owner box to obtain an estimate of the total time needed for completion of the project represented by that owner box, and adding the estimates so obtained for all such owner boxes to obtain a similar estimate for the owner boxes of the owner boxes, and repeating this procedure until one obtains an estimate of the total time required to complete the project.

4. The method of claim 3, wherein the estimate of time for each lowest-level box is expressed as a minimum and a maximum, and wherein all estimates are obtained by adding the minima and maxima, thereby obtaining a final estimate of the minimum and maximum time for completion of the project.

5. A method of using a computer to create a computer program, the computer having a memory, the method comprising the steps of:

a) dividing the program into a plurality of subtasks, each subtask being capable of being further subdivided into further subtasks, each subtask being represented by a box, the boxes depending from a given box being called the child boxes of that box, and the box from which a child box depends being called the owner box of that box, all boxes which have no child boxes being called "lowest-level" boxes, b) connecting the boxes together with lines to define a particular order in which the subtasks represented by the boxes are to be performed, c) wherein the lowest-level boxes represent pre-defined procedures, stored within the memory of the computer, d) defining a plurality of nodes stored in the memory of the computer, each node having a unique identifier within the memory, each node corresponding to one of said boxes, and e) storing within each node at least one pointer, each pointer comprising only an identifier of another node, each pointer corresponding to one of said lines, wherein each node contains no application data elements other than said pointers, and wherein all information stored in the memory of the computer is stored only as a pattern of said pointers.

6. The method of claim 5, further comprising the step of creating a data structure on which the program is to operate, the creating step being performed by using steps (a) and (b) to create said data structure and by using steps (d) and (e) to store the data structure in the memory of the computer.

* * * * *